US007883574B2

(12) United States Patent
Carlini et al.

(10) Patent No.: US 7,883,574 B2
(45) Date of Patent: *Feb. 8, 2011

(54) METHODS OF MAKING NANOSIZED PARTICLES OF BENZIMIDAZOLONE PIGMENTS

(75) Inventors: Rina Carlini, Oakville (CA); Darren Andrew Makeiff, St. Albert (CA)

(73) Assignee: Xerox Corporation, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 12/509,161

(22) Filed: Jul. 24, 2009

(65) Prior Publication Data

US 2010/0004360 A1 Jan. 7, 2010

Related U.S. Application Data

(63) Continuation-in-part of application No. 12/405,079, filed on Mar. 16, 2009, now abandoned, which is a continuation of application No. 12/044,613, filed on Mar. 7, 2008, now Pat. No. 7,503,973.

(51) Int. Cl.
*C09B 67/10* (2006.01)
*C09B 67/20* (2006.01)
*C07D 235/00* (2006.01)
*C07D 235/02* (2006.01)

(52) U.S. Cl. .................... 106/496; 106/498; 548/301.7; 548/302.7; 548/304.4; 548/305.4; 977/773; 977/775; 977/788

(58) Field of Classification Search ................. 106/496, 106/498; 548/301.7, 302.7, 304.4, 305.4; 977/773, 775, 788

See application file for complete search history.

(56) References Cited

U.S. PATENT DOCUMENTS

| | | | |
|---|---|---|---|
| 4,138,568 | A | 2/1979 | Hari et al. |
| 5,278,020 | A | 1/1994 | Grushkin et al. |
| 5,290,654 | A | 3/1994 | Sacripante et al. |
| 5,308,734 | A | 5/1994 | Sacripante et al. |
| 5,344,738 | A | 9/1994 | Kmiecik-Lawrynowicz et al. |
| 5,346,797 | A | 9/1994 | Kmiecik-Lawrynowicz et al. |
| 5,364,729 | A | 11/1994 | Kmiecik-Lawrynowicz et al. |
| 5,370,963 | A | 12/1994 | Patel et al. |
| 5,403,693 | A | 4/1995 | Patel et al. |
| 5,418,108 | A | 5/1995 | Kmiecik-Lawrynowicz et al. |
| 5,679,138 | A | 10/1997 | Bishop et al. |
| 6,706,864 | B1 | 3/2004 | Vincent et al. |
| 7,160,380 | B2 | 1/2007 | Maeta et al. |
| 7,312,011 | B2 | 12/2007 | Patel et al. |
| 7,335,453 | B2 | 2/2008 | Sacripante et al. |
| 7,358,022 | B2 | 4/2008 | Farrugia et al. |
| 7,371,870 | B2 | 5/2008 | Hosaka et al. |
| 7,402,371 | B2 | 7/2008 | Sacripante et al. |
| 7,419,753 | B2 | 9/2008 | Vanbesien et al. |
| 7,425,398 | B2 | 9/2008 | Nosella et al. |
| 7,429,443 | B2 | 9/2008 | Patel |
| 7,442,740 | B2 | 10/2008 | Patel et al. |
| 7,503,973 | B1 | 3/2009 | Carlini |
| 7,524,599 | B2 | 4/2009 | Vanbesien et al. |
| 7,547,499 | B2 | 6/2009 | Veregin et al. |
| 2005/0109240 | A1 | 5/2005 | Maeta et al. |
| 2005/0176726 | A1 | 8/2005 | Wang et al. |
| 2006/0063873 | A1 | 3/2006 | Lin et al. |
| 2007/0012221 | A1 | 1/2007 | Maeta et al. |

FOREIGN PATENT DOCUMENTS

| | | |
|---|---|---|
| JP | A-2003-082256 | 3/2003 |
| WO | WO 2006/005536 | 1/2006 |
| WO | WO 2006/132443 | 12/2006 |

OTHER PUBLICATIONS

E. Cole et al., "Oxidations with Lead Tetraacetate. Oxidations of Benzimidazoles, Benzoxazoles, and Benzothiazoles," *Australian J. Chem.*, 1986, vol. 39, pp. 295-301.
K. Balakrishnan et al., "Effect of Side-Chain Substituents on Self-Assembly of Perylene Diimide Molecules: Morphology Control," *J. Am. Chem. Soc.*, vol. 128, pp. 7390-7398 (2006).
K. Hunger et al., "Uber die Molekul- und Kristallstruktur gelber Mono-"azo"-Pigmente," *Farbe+Lack*, vol. 88, pp. 453-458 (1982).
R. Clark et al., "Synthesis of Some Substituted Benzimidazolones," *J Am. Chem. Soc.*, Apr. 5, 1958, vol. 80, pp. 1657-1662.
Hideki Maeta et al., "New Synthetic Method of Organic Pigment Nano Particle by Micro Reactor System," http://aiche.confex.com/aiche/s06/preliminaryprogram/abstract_40072.htm (date unknown).
E.F. Paulus, "Molecular and crystal structure of C.I. Pigment Red 208, 12514, n-butyl-2-[2-oxo-3-[N-(2-oxo-2,3-dihydro-5-benzimidazolyl)-carbamoyl]-naphthylidenhydrazino]-benzoat (PV-Rot HF2B),"; Zeitschrift fur *Kristallographie*, vol. 160, pp. 235-243 (1982).
J. van de Streek, et al., "Structures of six industrial benzimidazolone pigments from laboratory powder diffraction data," Acta Crystallographica Section B, Structural Science, 2009, vol. B65, pp. 200-211.
U.S. Appl. No. 12/405,079, filed Mar. 16, 2009.
U.S. Appl. No. 12/581,510, filed Oct. 19, 2009.
U.S. Appl. No. 12/581,488, filed Oct. 19, 2009.
U.S. Appl. No. 12/581,420, filed Oct. 19, 2009.

*Primary Examiner*—Anthony J Green
(74) *Attorney, Agent, or Firm*—Oliff & Berridge, PLC

(57) ABSTRACT

Nanoscale particles of benzimidazolone pigments are made by providing one or more organic pigment precursor(s) to a benzimidazolone pigment, providing a solution or suspension of a sterically bulky stabilizer compound that associates non-covalently with a benzimidazolone moiety on one of the pigment precursors, wherein the sterically bulky stabilizer compound is selected from the group consisting of substituted pyridine derivatives, alkylated benzimidazolone compounds, alkylated derivatives of aromatic acids, and mixtures thereof, and carrying out a coupling reaction to form a benzimidazolone pigment composition, whereby one or more functional moieties on the benzimidazolone pigment is non-covalently associated with the sterically bulky stabilizer, so as to limit an extent of particle growth and aggregation and results in nanoscale pigment particles.

34 Claims, 4 Drawing Sheets

METHODS OF MAKING NANOSIZED PARTICLES OF BENZIMIDAZOLONE PIGMENTS

This application is a continuation-in-part of U.S. patent application Ser. No. 12/405,079 filed Mar. 16, 2009, now abandoned, which is a continuation of U.S. patent application Ser. No. 12/044,613 filed Mar. 7, 2008, now U.S. Pat. No. 7,503,973. The entire disclosures of these prior applications are incorporated herein by reference.

PARTIES TO A JOINT RESEARCH AGREEMENT

This application is a result of activities undertaken within the scope of a joint research agreement between Xerox Corporation and National Research Council of Canada that was in effect on or before the date the research leading to this application was made.

TECHNICAL FIELD

This disclosure is generally directed to nanoscale benzimidazolone pigment particle compositions, and methods for producing such compositions. More specifically, this disclosure is directed to nanoscale pigment particle compositions comprising benzimidazolone molecules associated with a sterically bulky stabilizer compound, wherein the sterically bulky stabilizer compound comprises a pyridine-2,6-dicarboxylic acid derivative, an alkylated benzimidazolone compound, or an aromatic acid derivative, and methods for producing such compositions. Such particles are useful, for example, as nanoscopic colorants for such compositions as inks, toners, resins, paints and coatings, optical filters, and the like.

CROSS-REFERENCE TO RELATED APPLICATIONS

Disclosed in commonly assigned U.S. patent application Ser. Nos. 12/405,079 filed Mar. 16, 2009, now abandoned, and 12/044,613 filed Mar. 7, 2008, now U.S. Pat. No. 7,503,973, both to Rina Carlini et al. is a nanoscale pigment particle composition, comprising: a benzimidazolone pigment, and a sterically bulky stabilizer compound associated non-covalently with the benzimidazolone pigment; wherein presence of the stabilizer limits an extent of particle growth and aggregation, to afford nanoscale pigment particles. Also disclosed is a process for preparing nanoscale particles of benzimidazolone pigments, comprising: providing one or more organic pigment precursors to a benzimidazolone pigment comprising a benzimidazolone moiety, providing a solution or suspension of a sterically bulky stabilizer compound that associates non-covalently with the benzimidazolone moiety on one of the pigment precursors, and carrying out a chemical reaction to form a benzimidazolone pigment composition comprising nanoscale pigment particles, whereby the pigment precursors are incorporated with the benzimidazolone pigment and one or more functional moieties on the benzimidazolone pigment is non-covalently associated with the steric stabilizer, so as to limit the an extent of particle growth and aggregation and result in nanoscale pigment particles.

The entire disclosures of the above-mentioned applications are totally incorporated herein by reference.

BACKGROUND

Pigments are a type of insoluble colorant that are useful in a variety of applications such as, for example, paints, plastics, xerographic toners and a variety of inks, including inkjet printing inks Dyes are readily soluble colorants and have typically been the colorants of choice for applications such as inkjet printing inks. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photo-oxidation from light (leads to poor lightfastness), dye diffusion from the ink into paper or other substrates (leads to poor image quality and showthrough), and the ability for the dye to leach into another solvent that makes contact with the image (leads to poor water-/solvent-fastness). In certain situations, pigments have the potential to be a better alternative as colorants for inkjet printing inks since they are insoluble and cannot be molecularly dissolved within the ink matrix, and in most cases do not experience colorant diffusion or color degradation. Pigments can also be significantly less expensive than dyes, and so are attractive colorants for use in all types of printing inks.

Key challenges with using pigments for inkjet inks are their large particle sizes and wide particle size distribution, the combination of which can pose critical problems with reliable jetting of the ink; that is, inkjet nozzles are easily blocked. Pigments are rarely obtained in the form of single crystal nanoparticles, but rather as larger micron-sized aggregates of crystals often having a wide distribution of aggregate sizes. The color characteristics of the pigment can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention for smaller nanoscale pigment particles that minimize or avoid the problems associated with conventional larger-sized pigment particles. There further remains a need for processes for making and using such improved nanoscale pigment particles as colorant materials. The present nanoscale pigment particles are useful in, for example, paints, coatings and inks (e.g., inkjet printing inks) and other applications where pigments can be used such as colorized plastics and resins, optoelectronic imaging components and optical color filters, photographic components, and cosmetics among others.

The following documents provide background information;

Hideki Maeta et al., "New Synthetic Method of Organic Pigment Nano Particle by Micro Reactor System," in an abstract available on the American Institute for Chemical Engineers website, which describes a new synthetic method of an organic pigment nanoparticle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Pat. No. 7,160,380 describes a method of producing a fine particle of an organic pigment, containing the steps of:

flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale benzimidazolone pigment particle compositions, and methods for producing such compositions.

In an embodiment, the present disclosure provides a process for preparing nanoscale particles of benzimidazolone pigments, comprising:

providing one or more organic pigment precursor to a benzimidazolone pigment, providing a solution or suspension of a sterically bulky stabilizer compound that associates non-covalently with a benzimidazolone moiety on one of the pigment precursors, wherein the sterically bulky stabilizer compound is selected from the group consisting of substituted pyridine derivatives, alkylated-benzimidazolone compounds, alkylated derivatives of aromatic acids, and mixtures thereof, and carrying out a coupling reaction to form a benzimidazolone pigment composition, whereby the pigment precursors are incorporated within the benzimidazolone pigment and one or more functional moieties on the benzimidazolone pigment is non-covalently associated with the sterically bulky stabilizer, so as to limit an extent of particle growth and aggregation and result in nanoscale-sized pigment particles.

In one embodiment, the chemical coupling reaction comprises:

adding a solution comprising a coupling component precursor to the benzimidazolone pigment, to the solution or suspension of the sterically bulky stabilizer compound, to form a first medium;

optionally adjusting a pH of the first medium to an acidic pH;

adding a solution comprising a diazo component precursor to the benzimidazolone pigment, to the first medium; and causing or allowing a coupling reaction to occur between the coupling component and the diazo component in the presence of the sterically bulky stabilizer compound.

In another embodiment, the chemical coupling reaction comprises:

adding (1) a solution comprising a coupling component precursor to the benzimidazolone pigment, and (2) a solution comprising a diazo component precursor to the benzimidazolone pigment, to the solution or suspension of the sterically bulky stabilizer compound; and causing or allowing a coupling reaction to occur between the coupling component and the diazo component in the presence of the sterically bulky stabilizer compound.

DETAILED DESCRIPTION OF EXEMPLARY EMBODIMENTS

Figure 1:
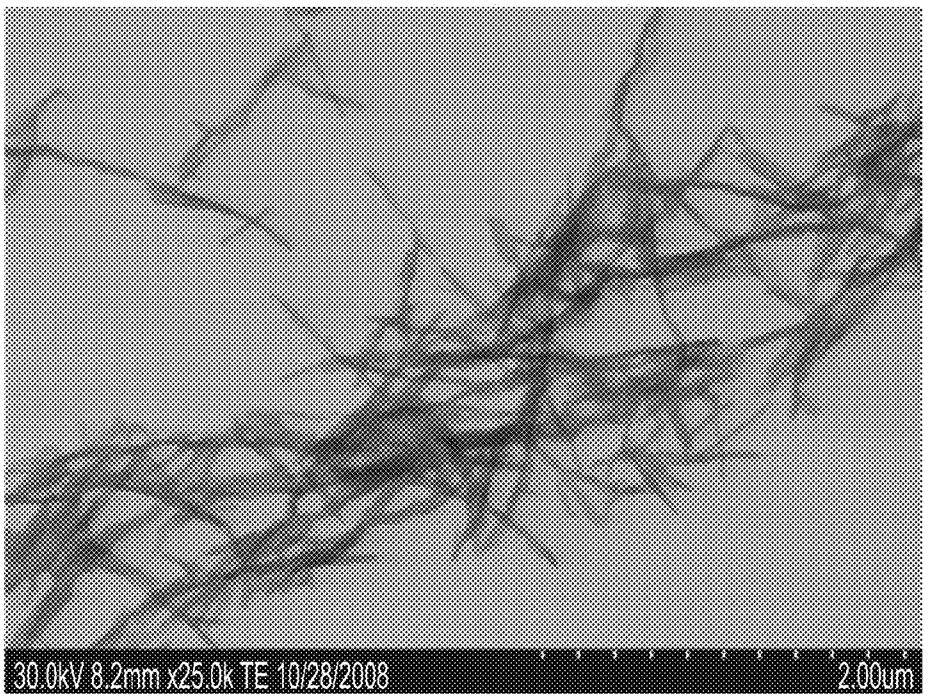
FIG. 1 is a Scanning Transmission Electron Microscopy (STEM) image of finely suspended CCI coupling component (scale bar is 2.00 micron=2000 nm).

Embodiments of the present disclosure provide nanoscale benzimidazolone pigment particle compositions and methods for producing such compositions. The nanoscale pigment particle compositions generally comprise an organic benzimidazolone pigment having at least one functional moiety that associates non-covalently with a functional group from a sterically bulky stabilizer compound, where the sterically bulky stabilizer compound comprises a pyridine carboxylic acid derivative, an alkylated benzimidazolone compound, or an aromatic acid derivative. The presence of the associated sterically bulky stabilizer limits the extent of particle growth and aggregation, to afford nanoscale particles.

Benzimidazolone pigments in this disclosure are of the azo-benzimidazolone class of organic pigments, which are generally derived from a substituted aromatic amine as the diazonium salt precursor (or, diazo component) and a coupling component that contains a benzimidazolone functional moiety. Azo-benzimidazolone pigments are known to provide colors with hues ranging from yellow to red to brownish-red, depending primarily upon the chemical composition of the coupling component.

The structure of azo-benzimidazolone pigments disclosed herein can be represented with the general structure in Formula 1, comprised of a diazo component denoted as group $G_{DC}$, and a nucleophilic coupling component group which is denoted as group $G_{CC}$, where these two groups are linked together with an azo functional moiety (N=N). Either or both of the diazo and coupling groups can contain within their structures the benzimidazolone functional moiety shown in Formula 2, wherein the substituents $R_x$, $R_y$, and $R_z$ are most typically hydrogen, halogen, alkoxyl groups, but can also include small aliphatic groups of less than 6 carbon atoms, small arene or heterocyclic arene group of less than 10 carbon atoms, or derivatives of carbonyl compounds such as aldehydes, ketones, ester, acids, anhydrides, urethanes, ureas, thiol esters, thioesters, xanthates, isocyanates, thiocyanates, or any combination of these substituents.

Formula 1

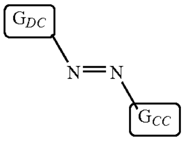

-continued

Formula 2

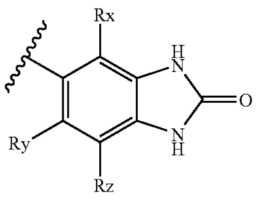

The diazo group $G_{DC}$ can be derived from a variety of substituted aniline or naphthylamine compounds, and while they can have many possible structures, the pigment compositions of this disclosure include the general diazo group compositions labeled $DC_1$ to $DC_7$ shown below:

$DC_1$

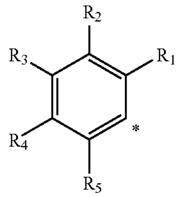

$DC_2$

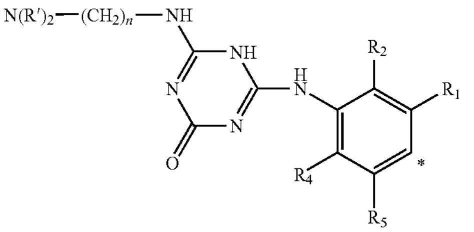

$DC_3$

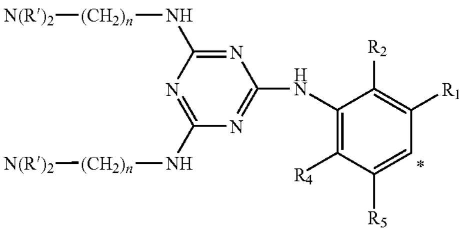

$DC_4$

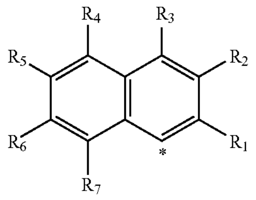

$DC_5$

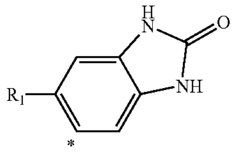

$DC_6$

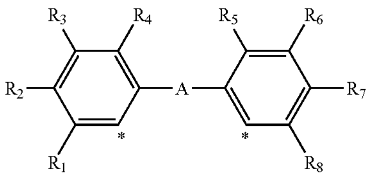

and

-continued

DC$_7$

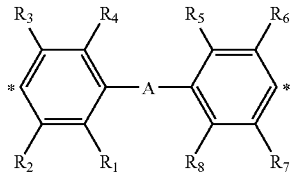

In such structures, the asterisk (*) indicates the point of attachment to the amino group (—$NH_2$) in the diazo precursor structure, as well as the point of attachment to the azo functional moiety (—N═N—) in the final pigment structure. $R_1$ to $R_8$ independently represent H; halogens such as F, Cl, Br, I; $(CH_2)_nCH_3$ where n=0-6; OH; alkoxyl groups —OR' where R' represents H, $(CH_2)_nCH_3$, or $C_6H_5$, and n represents a number of from 1 to about 6; $CO_2H$; $CO_2CH_3$; $CO_2(CH_2)_n CH_3$ wherein n=0-5; $CONH_2$; (CO)R' wherein R' can independently represent H, $C_6H_5$, $(CH_2)_nCH_3$ wherein n=0-12, or they can represent $(CH_2)_nN(CH_3)_2$ wherein n=1-6; $OCH_3$; $OCH_2CH_2OH$; $NO_2$; $SO_3H$; or any of the following structural groups:

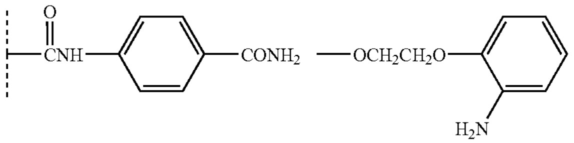

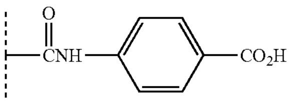 and

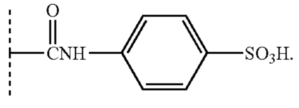

In DC$_2$ and DC$_3$, R' represents H, $CH_3$, $(CH_2)_nCH_3$, or $C_6H_5$, and n represents a number from 1 to 6. In some instances, the diazo group precursor can be a substituted aniline compound that possesses the benzimidazolone functional moiety of Formula 2, as for example in the structure of DC$_5$. In the dimeric diazo precursors DC$_6$ and DC$_7$, the linking group A can represent —$(CH_2)_n$— where n=0-6; alkylenedioxy groups —[O—$(CH_2)_n$—O]— where n=0-6, and —[O—$CH_2CHR)_n$]— where n=0-6 and R═H or $CH_3$; —(C═O)—; atoms such as O, S; acyl groups such as —$(CH_2)_n$—(C═O)— where n=1-6; diacyl groups such as —(C═O)—$(CH_2)_n$—(C═O)— where n=1-6, and the like.

It is the coupling component group ($G_{CC}$) which typically contains the benzimidazolone functional group (Formula 2), and is generally an amide of 5-aminobenzimidazolone. There are two common classes of amides used as the coupling component when making azo-benzimidazolone pigments, acetoacetamides of 5-aminobenzimidazolones (denoted as CC 1) and 3-hydroxy-2-naphthamides of 5-aminobenzimidazolones (denoted as CC 2):

CC1

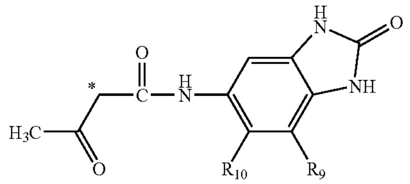

CC2

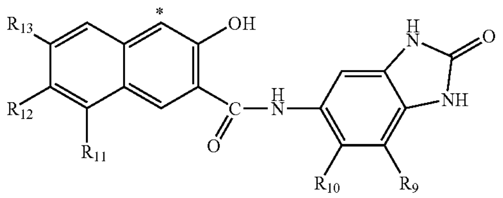

In such structures, the asterisk (*) indicates the point of attachment to the azo functional moiety (—N═N—) formed in the pigment structure, and $R_9$, $R_{10}$, $R_{11}$, $R_{12}$, and $R_{13}$ are independently H, Br, Cl, I, F, $CH_3$, or $OCH_3$. It is known that the structure of the coupling component for these pigments will determine the range of colors produced by the pigments. For instance, azo-benzimidazolone pigments produced with coupling components that have general structure CC 1 will exhibit yellow to orange hues, whereas use of coupling components having the general structure CC 2 will exhibit red to brown (or maroon) hues.

As with many azo class pigments that provide yellow or red or brown hues, the structure of the azo-benzimidazolone pigments can adopt more than one tautomeric form due to the presence of strong intra-molecular hydrogen bonding between the N atoms of the azo group and the H atom of a vicinal heteroatom substituent on the coupling component group $G_{CC}$. For example, the composition of Pigment Red 208 (Color Index No. 12514) shown in Formula 3 depicts the extensive intra-molecular hydrogen bonding with the hashed partial bonds in both the "azo" tautomer (3a) and the "hydrazone" tautomer (3b). It is also understood that the general structure in Formula (1) is understood to denote both such tautomeric structural forms.

Pigment Red 208 (C.I. No. 12514)

Formula 3

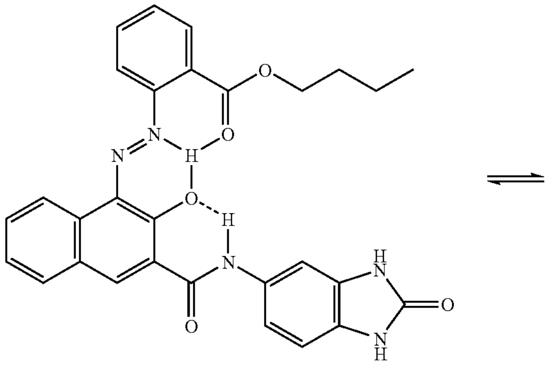

azo tautomer
(a)

-continued

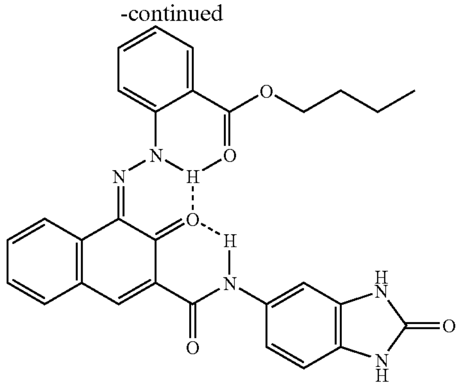

hydrazone tautomer
(b)

In addition to intra-molecular hydrogen bonding, it is also known that azo-benzimidazolone pigments are capable of forming one-dimensional, extended network structures due to strong inter-molecular hydrogen bonding. Evidence has been found in the X-ray diffraction patterns of such pigments, where the large intermolecular spacings have suggested that pairs of pigment molecules associate strongly together via inter-molecular H bonds to form a microstructural assembly of one-dimensional bands or ribbons. As examples, see the published crystal structures for various azo-benzimidazolone pairs reported in 1) K. Hunger, E. F. Paulus, D. Weber; *Farbe+Lack*; (1982), 88, 453, 2) E. F. Paulus; *Kristallogr.* (1982), 160, 235, and more recently in 3) J. van de Streek, et al. in *Acta Cryst.* (2009). *B*65, 200, the entire disclosures of which are incorporated herein by reference; for the latter reference 3) the authors have provided modeled crystal structures based on the actual X-ray diffraction data which illustrate the inter-molecularly hydrogen-bonded network, such as for example Pigment Yellow 151, in Formula 4.

Furthermore, the existence of these reinforcing intra- and inter-molecular hydrogen bonds provide further proof for the enhanced performance properties of azo-benzimidazolone pigments, such as high thermal stability, high lightfastness, high color-migration resistance and high solvent fastness. The benzimidazolone functional moiety in these pigments is a key structural element that enables the formation of inter-molecular hydrogen bonds and helps to provide the enhanced robustness properties. Given the propensity of this moiety to readily partake in single-point and double-point hydrogen bonding, it is conceivable that another compound having either the same or different functional moiety, is capable of associating non-covalently, such as through inter-molecular hydrogen bonds, with azo-benzimidazolone pigments and will therefore have a high binding affinity for such pigments. Such compounds are included in a group of compounds which herein are referred to as "stabilizers", which function to reduce the surface tension of the pigment particle and neutralize attractive forces between two or more pigment particles or structures, thereby stabilizing the chemical and physical structure of the pigment. In addition to these stabilizer compounds having a "pigment-affinic" functional moiety, they also possess one or more hydrophobic groups, such as long alkyl hydrocarbon groups, or alkyl-aryl hydrocarbon groups, or polymeric and/or oligomeric chains with alkyleneoxy groups, wherein the alkyl groups can be linear, cyclic or branched in structure and have at least 6 or more carbons in total. The presence of the additional hydrophobic groups in such stabilizers can serve several functions: (1) to compatibilize the pigment for better dispersability in the targeted vehicle or matrix; and (2) to provide a sterically bulky layer surrounding the pigment particle, thereby preventing or limiting the approach of other pigment particles or molecules that results in uncontrolled crystal aggregation, and ultimately particle growth. Compounds having both a pigment-affinic functional moiety that associates noncovalently with Formula 4

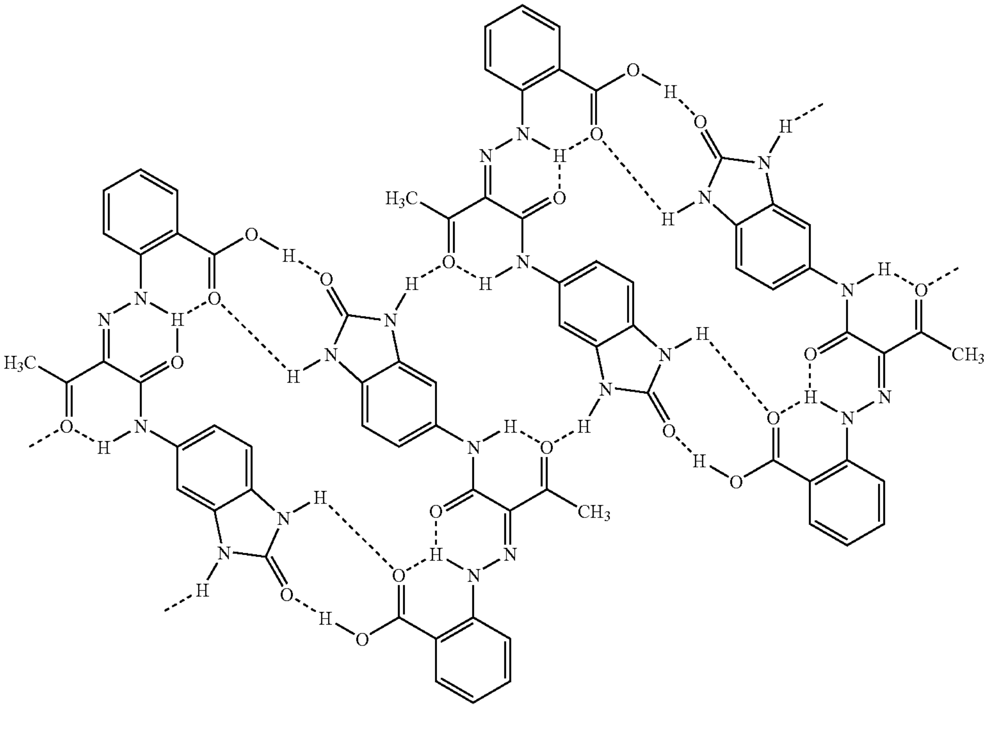

the pigment, as well as one or more sterically bulky hydrocarbon groups that provide a surface barrier to other pigment particles, are referred to as "steric stabilizers" and have been used in various ways to alter the surface characteristics of conventional pigments and other particles requiring stabilization (for example, latex particles in paints, metal oxide nanoparticles in robust coatings, among others).

The term "precursor" as used in "precursor to the benzimidazolone pigment" can be any chemical substance that is an advanced intermediate in the total synthesis of a compound (such as the benzimidazolone pigment). In embodiments, the precursor to the azo-benzimidazolone pigment may or may not be a colored compound. In embodiments, where the azo-benzimidazolone pigment and the precursor have a structural moiety or characteristic in common, the phrase "benzimidazolone pigment/pigment precursor" is used for convenience rather than repeating the same discussion for each of the pigment and the pigment precursor.

The benzimidazolone pigment/precursor in embodiments can form one or more hydrogen bonds with selected stabilizer compounds, per benzimidazolone unit or molecule. For example, in embodiments, the benzimidazolone pigment/precursor can form one, two, three, four, or more hydrogen bonds with selected stabilizer compounds, per benzimidazolone. Thus, for example in the benzimidazolone functional moiety of Formula 2, a hydrogen atom from the —NH group and/or an oxygen atom in the carbonyl (C═O) group can form hydrogen bonds with complementary oxygen, nitrogen and/or hydrogen atoms located on selected stabilizer compounds. In the same way, the hydrogen atoms from the —NH groups in the benzimidazolone moiety can form one or more distinct hydrogen bonds with complementary oxygen or nitrogen atoms found on the stabilizer functional groups. Of course, other combinations are also possible and encompassed herein.

The stabilizer can be any compound that has the function of limiting the self-assembly of colorant molecules during pigment synthesis, and/or limiting the extent of aggregation of primary pigment particles, so as to produce predominantly nanoscale pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is hydrogen bonded to the pigment/precursor surface, occupies a 3-dimensional spatial volume that effectively prevents the approach or association of other chemical entities (e.g. colorant molecules, primary pigment particles or small pigment aggregates) toward the pigment/precursor surface. Thus, the stabilizer should have its hydrocarbon moiety large enough so that as several stabilizer molecules become non-covalently associated with the pigment/pigment precursor (for example, by hydrogen bonding, van der Waals forces, aromatic pi-pi interactions, or other), the stabilizer molecules act as surface agents for the primary pigment particles that effectively shields them, thereby limiting the growth of the pigment particles and affording predominantly nanoparticles of the pigment. As examples, for azo-benzimidazolone pigments Pigment Red 175 and Pigment Yellow 151, the following hydrocarbon moieties on the stabilizers are considered to have adequate "steric bulk" so as to enable the stabilizer to limit the extent of pigment self-assembly or aggregation and mainly produce pigment nanoscale particles:

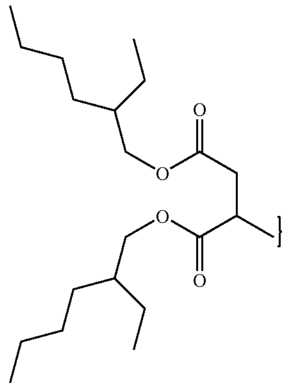

and

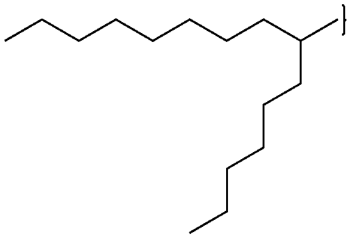

Suitable stabilizer compounds are preferably those that are amphiphilic; that is, they have a hydrophilic or a polar functional group with available heteroatoms for hydrogen bonding with the pigment/pigment precursor, as well as a non-polar or hydrophobic sterically bulky group that has at least 6 carbons and not more than 100 carbons and is predominantly aliphatic (or fully saturated) but can include some ethylenically unsaturated groups and/or aryl groups. Classes of suitable stabilizer compounds include the following core compounds that are substituted with mono- and dicarboxylic acids, mono- and diesters, and mono- and/or diamide derivatives: benzoic acid, phthalic acid or anhydride, isophthalic acid, trimesic acid, trimellitic acid or anhydride, pyridine, piperidine, piperazine, morpholine and pyrroles; monoalkyl pyridine, piperazine, piperidine, morpholine, pyrrole, imidazole, benzimidazole and benzimidazolones, thiazole, thiazoline, and thiazolone, and their cationic salts, wherein the alkyl substituent is a long-chain aliphatic hydrocarbon or branched aliphatic hydrocarbon such as the long-branched "Guerbet-type" hydrocarbon; poly(vinyl pyrrolidone) and copolymers of poly(vinyl pyrrolidone) with α-olefins or other ethylenically unsaturated monomer compounds, such as for example poly(vinyl pyrrolidone-graft-1-hexadecane) and poly(vinyl pyrrolidone-co-eicosene) and the like; poly(vinyl imidazole) and copolymers of poly(vinyl imidazole) with α-olefins or other ethylenically unsaturated monomer compounds; poly(vinyl pyridine) and copolymers of poly(vinyl pyridine) with α-olefins or styrene, or other ethylenically unsaturated monomer compounds; long-chain or branched aliphatic primary amides and amidines, including primary amides and amidines with branched alkyl groups; semicarbazones and hydrazones of long, linear and/or branched aliphatic aldehydes and ketones; mono-substituted ureas and N-alkyl-N-methyl ureas, wherein the substituent is a long, linear and/or branched aliphatic hydrocarbon; mono-substituted monosubstituted guanidines and guanidinium salts, wherein the substituent is a long, linear and/or branched aliphatic hydrocarbon; mono- and di-substituted succinimides, such as 2-alkyl- and 2,3-dialkyl-succinimides, and mono- and di-substituted succinic acids or their esters, wherein one or more alkyl substituent is comprised of a long, linear and/or branched aliphatic hydrocarbon having between 6 and 100 carbon atoms; or mixtures thereof.

Representative examples of such suitable stabilizer compounds include, but are not limited to, the following compounds:

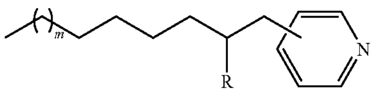

m = 0-12

R = H, $CH_3$, $(CH_2)_nCH_3$ where n = 0-5

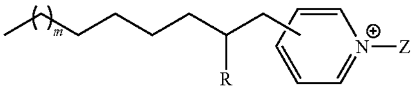

(optional)

Z = H, or $CH_3$

X = Cl, Br, I, $SO_4^{2-}$, $MeSO_4^-$, $O_3S$-p-$(C_6H_4)CH_3$

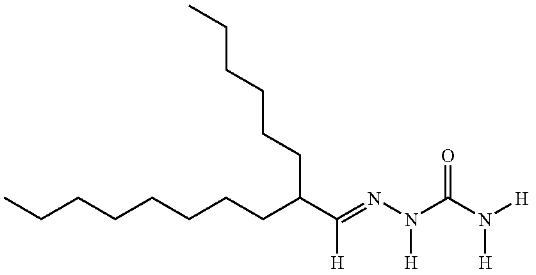

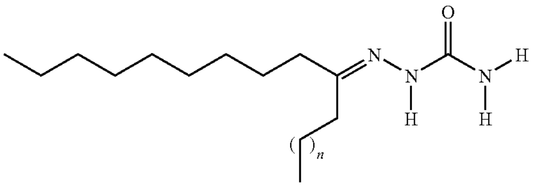

n = 0-10

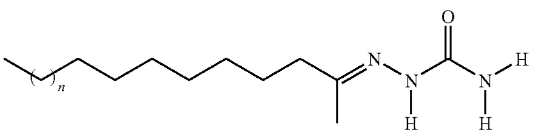

n = 0-25

As the stabilizer for use in particular embodiments, there can be used substituted pyridine derivatives as in general Formula 5, particularly monosubstituted and disubstituted pyridine derivatives; alkylated-benzimidazolone compounds as Formula 6; alkylated derivatives of aromatic acids such as benzoic, naphthoic, phthalic and isophthalic acids and the like as in Formula 7; or mixtures thereof.

Formula 5

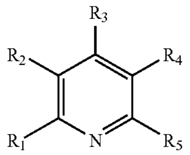

Formula 6

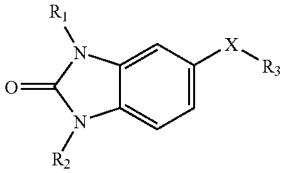

Formula 7

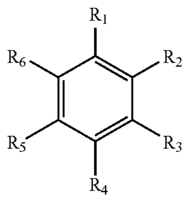

In embodiments, the pyridine derivatives of general Formula 5 have substituents $R_1$ to $R_5$ that can be the same or different. Suitable examples of functional groups for $R_1$ to $R_5$ it Formulas 5-7 may include H, amide groups (—NH—(C═O)—R') and (—(C═O)—NH—R'); amine groups (—NH—R'); urea groups (—NH—(C═O)—NH—R'); carbamate or urethane groups (—NH—(C═O)—O—R') and (O—(C═O)—NH—R'); ester groups (—(C═O)—O—R') or (—O—(C═O)—R'); branched or linear alkyleneoxy chains such as oligo- or poly-[ethyleneglycol] and the like; and alkoxyl groups (—OR'), wherein the group R' in all the various functional groups is predominantly a linear or branched alkyl or cycloaliphatic group, and which may contain hetero atoms such as O, S, or N within the alkyl groups.

These disubstituted pyridine derivatives are desirably amphiphilic compounds. That is, the compounds include a pigment-affinic group, such as for example 2,6-pyridine dicarboxylate ester or dicarboxamide moiety that is capable of H-bonding with the benzimidazolone functional moiety of the pigment. This H-bonding can potentially interfere with the pigment's intermolecular H-bonding network, to thereby prevent or limit particle growth and aggregation. The compound also includes bulky aliphatic groups that provide a steric barrier layer on the pigment surface, which also helps to limit or disperse other colorant molecules from approaching and form larger crystals.

Representative examples of substituted pyridine derivatives include, but are not limited to, the following compounds in Table 1:

TABLE 1
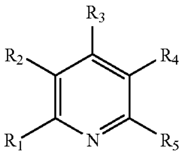
| | $R_1$ | $R_2$ | $R_3$ | $R_4$ | $R_5$ |
|---|---|---|---|---|---|
| 1 | 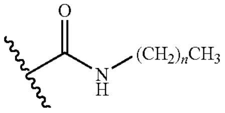 n = 17 | H | H | H | H |
| 2 | 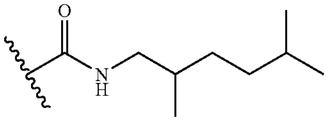 | H | H | H | H |
| 3 | 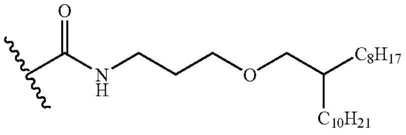 | H | H | H | H |
| 4 | 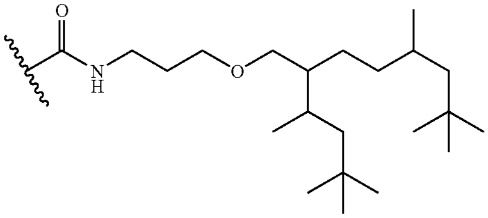 | H | H | H | H |
| 5 | 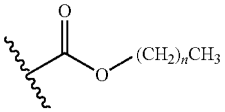 n = 5, 11, 21 | H | H | H | H |
| 6 | 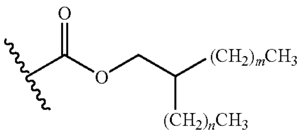 m = 3, n = 1<br>m = 3, n = 5<br>m = 7, n = 5<br>m = 11, n = 9 | H | H | H | H |
| 7 | 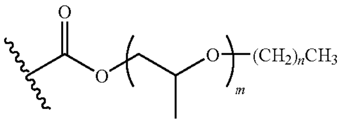 m = 2, n = 3<br>m = 3, n = 3 | H | H | H | H |
| 8 | 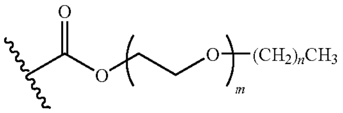 m = 1, n = 3<br>m = 2, n = 3 | H | H | H | H |

TABLE 1-continued
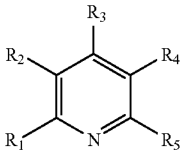
| | $R_1$ | $R_2$ | $R_3$ | $R_4$ | $R_5$ |
|---|---|---|---|---|---|
| 9 | 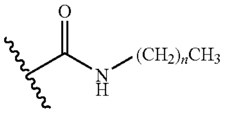 n = 17 | H | H | H | H |
| 10 | 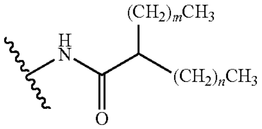 m = 11, n = 9<br>m = 7, n = 5<br>m = 5, n = 3 | H | H | H | H |
| 10 | 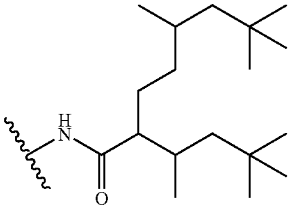 | H | H | H | H |
| 12 | 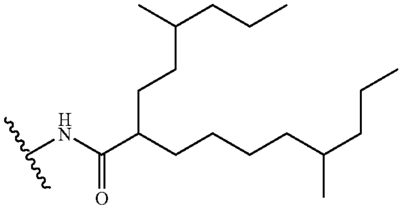 | H | H | H | H |
| 13 | 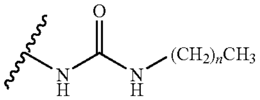 n = 17 | H | H | H | H |
| 14 | 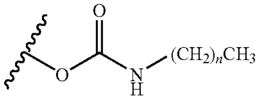 n = 17 | H | H | H | H |
| 15 | 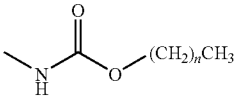 n = 17 | H | H | H | H |
| 16 | 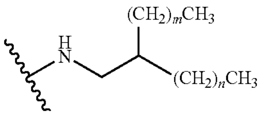 m = 9, n = 7 | H | H | H | H |

TABLE 1-continued
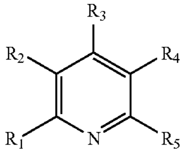
| | $R_1$ | $R_2$ | $R_3$ | $R_4$ | $R_5$ |
|---|---|---|---|---|---|
| 17 | 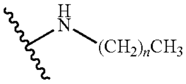 n = 12 | H | H | H | H |
| 18 | 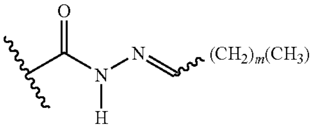 m = 17 | H | H | H | H |
| 19 | 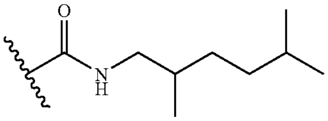 | H | H | H | 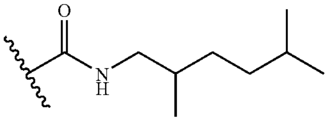 |
| 20 | 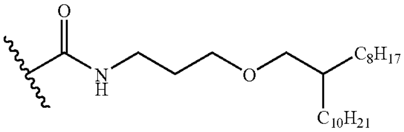 | H | H | H | 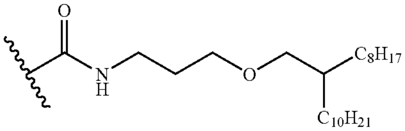 |
| 21 | 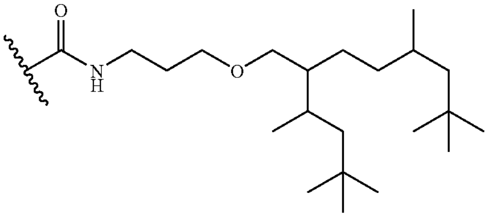 | H | H | H | 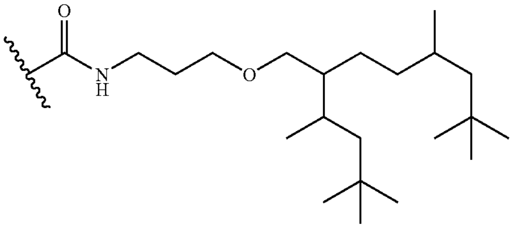 |
| 22 | 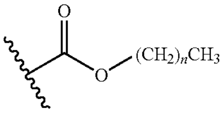 n = 5, 11, 21 | H | H | H | 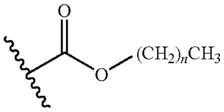 n = 5, 11, 21 |
| 23 | 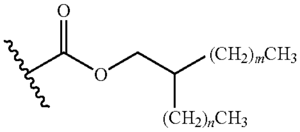 m = 3, n = 1<br>m = 3, n = 5<br>m = 7, n = 5<br>m = 11, n = 9 | H | H | H | 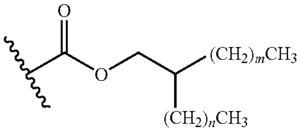 m = 3, n = 1<br>m = 3, n = 5<br>m = 7, n = 5 |
| 24 | 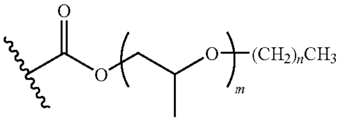 m = 2, n = 3<br>m = 3, n = 3 | H | H | H | 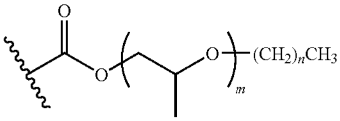 m = 2, n = 3<br>m = 3, n = 3 |

TABLE 1-continued
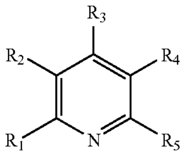
| | $R_1$ | $R_2$ | $R_3$ | $R_4$ | $R_5$ |
|---|---|---|---|---|---|
| 25 | 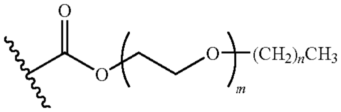<br>m = 1, n = 3<br>m = 2, n = 3 | H | H | H | 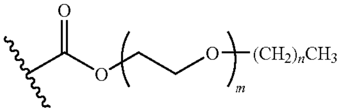<br>m = 1, n = 3<br>m = 2, n = 3 |
| 26 | 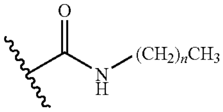<br>n = 17 | H | H | H | 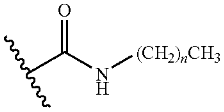<br>n = 17 |
| 27 | 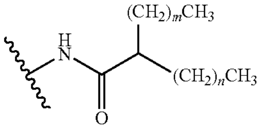<br>m = 11, n = 9<br>m = 7, n = 5<br>m = 5, n = 3 | H | H | H | 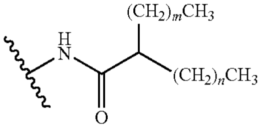<br>m = 11, n = 9<br>m = 7, n = 5<br>m = 5, n = 3 |
| 28 | 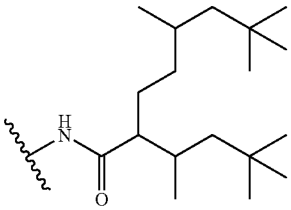 | H | H | H | 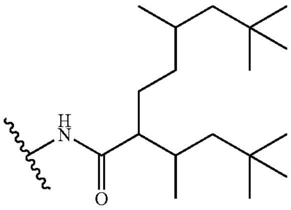 |
| 29 | 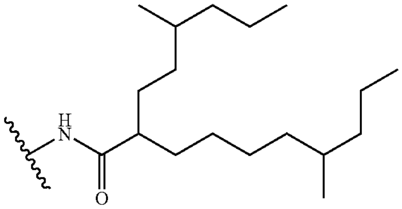 | H | H | H | 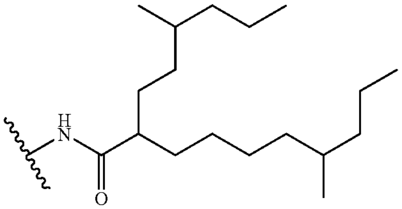 |
| 30 | 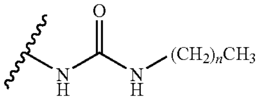<br>n = 17 | H | H | H | 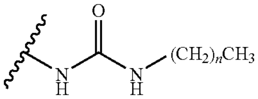<br>n = 17 |
| 31 | 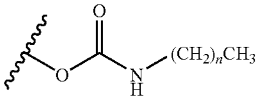<br>n = 17 | H | H | H | 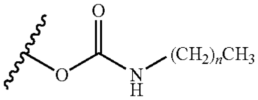<br>n = 17 |
| 32 | 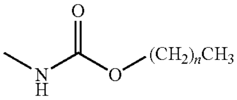<br>n = 17 | H | H | H | 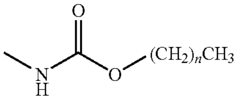<br>n = 17 |

TABLE 1-continued

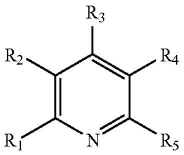

| | $R_1$ | $R_2$ | $R_3$ | $R_4$ | $R_5$ |
|---|---|---|---|---|---|
| 33 | 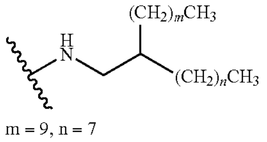 m = 9, n = 7 | H | H | H | 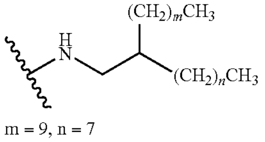 m = 9, n = 7 |
| 34 | 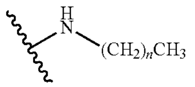 n = 12 | H | H | H | 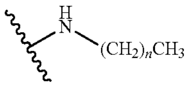 n = 12 |

The functional group Z situated at position 2 of the substituted pyridine derivatives are prepared from commercially available materials using known chemical transformations. As an example, for the synthesis of a 2,6-disubstituted pyridine where both positions 2 and 6 are carboxylated functional groups such as amides [Pyridyl]-(C═O)—NHR or esters [Pyridyl]-(C═O)—OR, the first step involves conversion of 2,6-pyridinedicarboxylic acid to the corresponding acyl chloride using a suitable reagent such as oxalyl or thionyl chloride in the presence of a catalytic amount of N,N-dimethylformamide (DMF) in a suitable organic solvent (i.e., tetrahydrofuran, THF, or dichloromethane, $CH_2Cl_2$). In the second step, the acid chloride groups are then reacted with the appropriate sterically bulky primary or secondary alkyl amine or alcohol in the presence of an acid scavenging, non-nucleophilic base such as triethylamine.

The reverse 2-monoamido or diamido pyridine derivatives are also prepared from commercially available materials using known chemical transformations. As an example, 2,6-diaminopyridine is reacted with one or more equivalents of an appropriate alkanoic acid chloride in the presence of a non-nucleophilic base such as triethylamine, to provide the desired 2,6-diamido pyridine compound where both positions 2 and 6 are the reverse carboxyl amides, such as [Pyridyl]-NH—(C═O)—R. If the alkanoic acid chloride is not commercially available, it is readily prepared by converting the corresponding alkane carboxylic acid with a suitable halogenating reagent, such as oxalyl or thionyl chloride, in the presence of a catalytic amount of N,N-dimethylformamide (DMF) in a suitable organic solvent (i.e., tetrahydrofuran, THF, or dichloromethane, $CH_2Cl_2$).

The alkylated benzimidazolone stabilizer compounds generally have the structure:

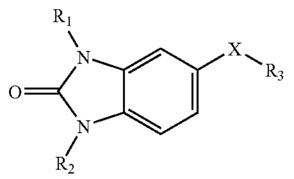

where X represents a linking group and each of $R_1$, $R_2$, and $R_3$ independently represent H or substituted or unsubstituted alkyl groups, provided that at least one of $R_1$, $R_2$, or $R_3$ represents H.

The linking group X can be any suitable functional group that tethers the sterically bulky group to the benzimidazolone moiety. Examples of suitable linking groups include amide groups (—NH—(C—O)—) and (—(C═O)—NH—), amine groups (—NH—), urea groups (—NH—(C═O)—NH—), carbamate or urethane groups (—NH—(C═O)—O—) and (O—(C═O)—NH—), ester groups (—(C═O)—O—) or (—O—(CO)—), groups of the formula,

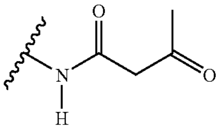 and 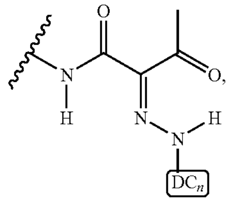

and groups of the formula,

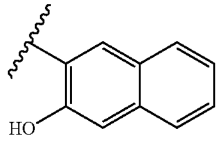 and 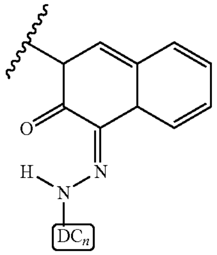

wherein the symbol n of a diazo moiety $DC_n$ in the above formulae refers to the labels 1-7 (as in $DC_1$, $DC_2$, . . . $DC_7$) described previously.

The groups $R_1$, $R_2$, and/or $R_3$ can be any suitable alkyl group that can provide a sterically bulky layer surrounding the pigment particle, thereby preventing or limiting the approach of other pigment particles or molecules that leads to uncontrolled aggregation and particle growth. Examples of suitable sterically bulky groups include the various non-polar or hydrophobic sterically bulky groups described previously. Specific examples of the sterically bulky alkyl groups include straight or branched alkyl groups of 1 to 100, such as 1 to 50 or 6 to 30 carbon atoms, and including large linear, branched and/or cyclic aliphatic groups like those of the general formulae:

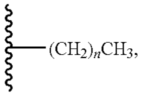

where n = 0-49

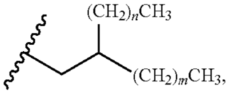

where m = 0-49
and n = m or m + p
and p = 1-10

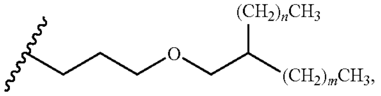

where m = 0-49
and n = m or m + p
and p = 1-10

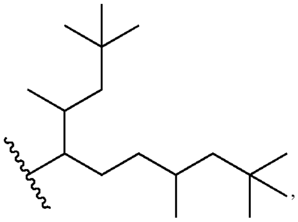

, and

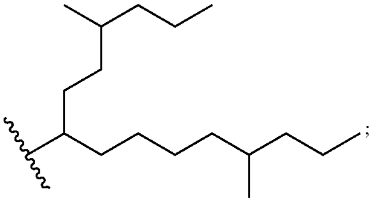

;

and also includes substituted straight or branched alkyl groups of 1 to 50, such as 1 to 40 or 6 to 30 carbon atoms, including those of the formula —CO—$(CH_2)_n$—$CH_3$, where n is from 0 to 30; and the like. Other useful $R_3$ groups may include aliphatic hydrocarbons with higher degrees of branching, cyclic hydrocarbons, as well those that may contain heteroatoms such as O, S, N, including linear or branched alkyleneoxy chains such as oligo- or poly-[ethyleneglycol] and the like. The latter are bulky hydrophilic groups, which may facilitate mixing in aqueous media such as the medium used to perform diazonium coupling during the synthesis of benzimidazolone pigment nanoparticles. $R_3$ groups can also be difunctional structures that bridge two or more benzimidazolone groups, as illustrated in the general formula,

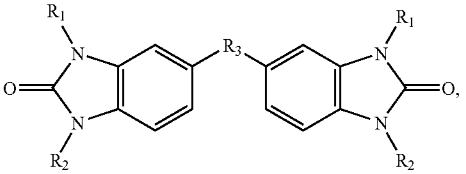

where examples of suitable difunctional groups $R_3$ include —$(CH_2)_n$; —X—$(CH_2)_n$X; —[$(XCH_2CH_2)_n$]X—; —[(C═O)—$(CH_2)_n$—(C═O)]—; —X—[(C═O)—$(CH_2)_n$—(C═O)]—X—; —X—[(C═O)—X—$(CH_2)$—X—(C═O)]—X—; —[(C═O)—X—$(CH_2)_n$—X—(C═O)]—, wherein X is defined as O, S, or NH and integer n is 1 to 50; and also large branched alkylated functional groups such as:

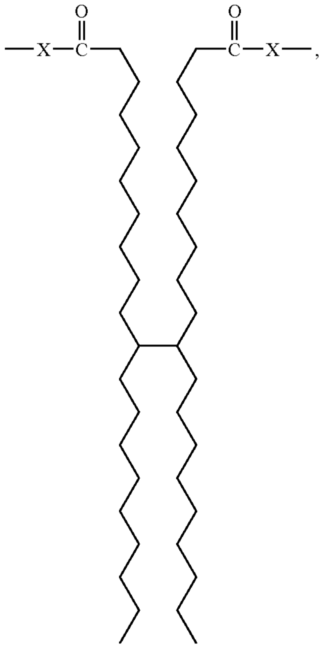

and

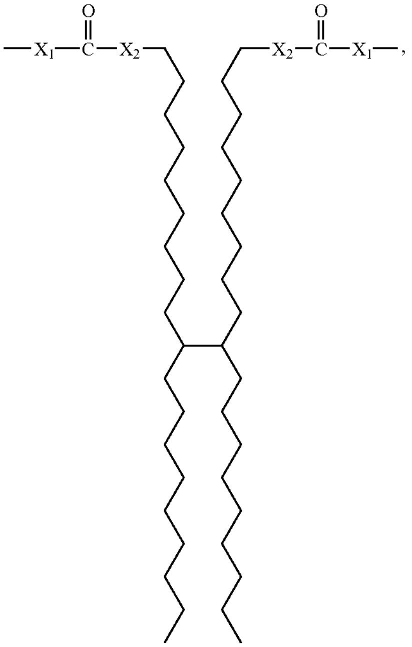

wherein X, $X_1$ and $X_2$ are defined as being either O, S, or NH, and $X_1$ and $X_2$ may or may not be the same.

These alkylated benzimidazolone compounds are desirably amphiphilic compounds. That is, the compounds include a pigment-affinic group (the benzimidazolone moiety) that is capable of H-bonding with the benzimidazolone group of the pigment, and which can potentially interfere with the pigment's intermolecular H-bonding network to thereby inhibit pigment aggregation and particle growth. The compound also includes bulky aliphatic groups that provide a steric barrier layer on the pigment surface, which also helps to limit or disperse away other colorant molecules from approaching and form larger crystals.

Specific examples of the alkylated benzimidazolone compounds thus include, but are not limited to, those in the following Table 2:
TABLE 2
| Position 5 functional moiety | X | Sterically Bulky Group(s) R1 | R2 | R3 |
|---|---|---|---|---|
| | | 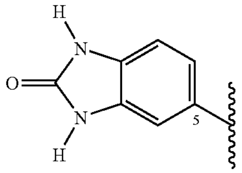 | | |
| 1 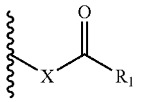 | NH | $(CH_2)_nCH_3$<br>n = 2, 11, 17 | — | — |
| 2 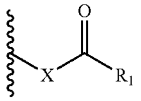 | NH | 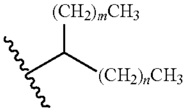<br>m = 5, n = 3<br>m = 7, n = 5<br>m = 11, n = 9 | — | — |
| 4 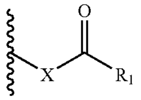 | NH | 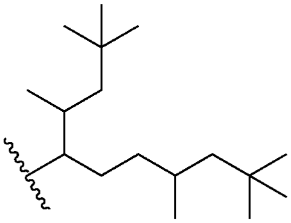 | — | — |
| 5 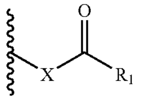 | NH | 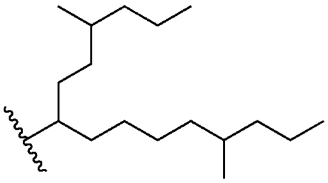 | — | — |
| 6 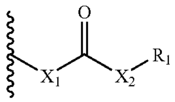 | $X_1 = X_2 =$ NH | $(CH_2)_nCH_3$<br>n = 11, 17 | — | — |

TABLE 2-continued
| Position 5 functional moiety | X | Sterically Bulky Group(s) R1 | R2 | R3 |
|---|---|---|---|---|
| 8 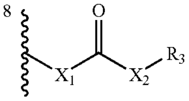 | $X_1 = X_2 =$ NH | — | — | 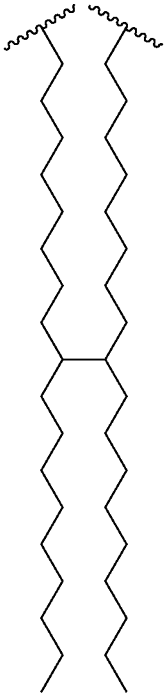 |
| 9 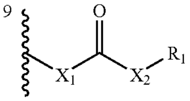 | $X_1 = O$ $X_2 = NH$ | $(CH_2)_nCH_3$ n = 11, 17 | — | — |
| 11 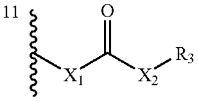 | $X_1 = O$ $X_2 = NH$ | — | — | 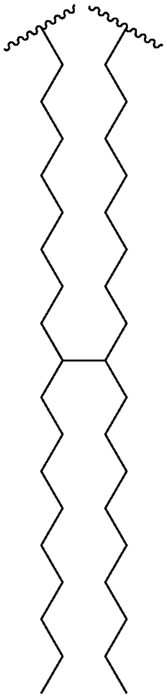 |

TABLE 2-continued
| Position 5 functional moiety | X | Sterically Bulky Group(s) R1 | R2 | R3 |
| --- | --- | --- | --- | --- |
| 12 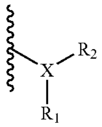 | N | H | $(CH_2)_nCH_3$<br>n = 1, 17 | — |
| 13 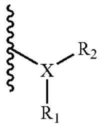 | N | H | 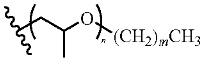<br>m = 3, n = 2<br>m = 3, n = 3 | — |
| 14 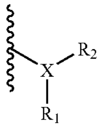 | N | $(CH_2)_nCH_3$<br>n = 3, 11, 17 | $(CH_2)_nCH_3$<br>n = 3, 11, 17 | — |
| 15 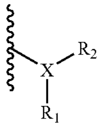 | N | 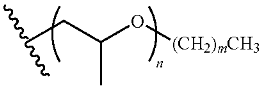<br>m = 3, n = 2<br>m = 3, n = 3 | 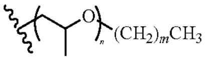<br>m = 3, n = 2<br>m = 3, n = 3 | — |
| 16 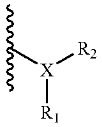 | N | 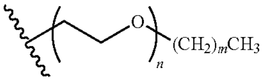<br>m = 1, n = 3 | 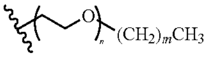<br>m = 1, n = 3 | — |
| 17 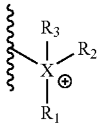 | N | $(CH_2)_nCH_3$<br>n = 1, 17 | $(CH_2)_nCH_3$<br>n = 1, 17 | $(CH_2)_nCH_3$<br>n = 1, 17 |
| 18 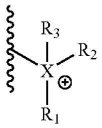 | N | 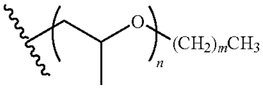<br>m = 3, n = 2<br>m = 3, n = 3 | 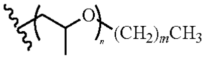<br>m = 3, n = 2<br>m = 3, n = 3 | 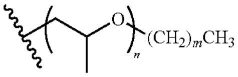<br>m = 3, n = 2<br>m = 3, n = 3 |
| 19 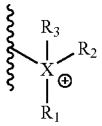 | N | 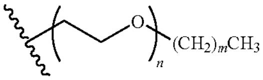<br>m = 1, n = 3 | 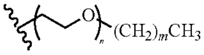<br>m = 1, n = 3 | 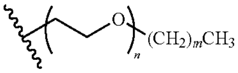<br>m = 1, n = 3 |

TABLE 2-continued

| Position 5 functional moiety | X | Sterically Bulky Group(s) | | |
|---|---|---|---|---|
| | | R$_1$ | R$_2$ | R$_3$ |
| | | 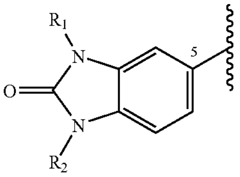 | | |
| 20 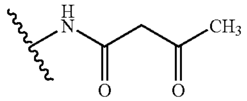 | — | H | —$(CH_2)_nCH_3$ n = 1, 17 | — |
| 21 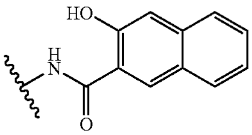 | — | —$(CH_2)_nCH_3$ n = 1, 17 | H | — |
| 22 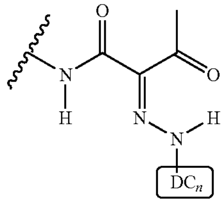 group DCn is n = 1-6 | — | H | H | — |
| 23 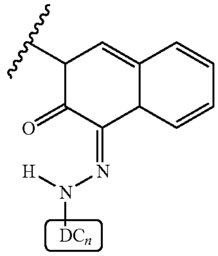 group DCn is n = 1-6 | — | H | H | — |

The N-alkylated 5-amidobenzimidazolone compounds in Table 2 (as examples, see entries 1-5) are prepared from 5-aminobenzimidazolone and an appropriate alkanoic acid chloride using known chemical transformations. A suitable procedure for this transformation requires the reaction of, for example, 5-aminobenzimidazolone and the appropriate alkanoic acid chloride, present in a nearly 1:1 molar ratio of the respective reactants. The alkanoic acid chloride reactant can be obtained from commercial sources or alternatively, is prepared from the corresponding alkanecarboxylic acid precursor by reacting this precursor with either oxalyl or thionyl chloride in the presence of a catalytic amount of N,N-dimethylformamide (DMF), dissolved in a suitable solvent such as anhydrous tetrahydrofuran or dichloromethane. The subsequent amide formation reaction is typically carried out by adding a solution of the alkanoic acid chloride in anhydrous THF dropwise to a stirring mixture of 5-aminobenzimidazolone in a suitable organic solvent, preferably a dipolar, aprotic solvent such as N-methylpyrrolidinone (NMP) at 0° C., The product is obtained in satisfactory purity after an extractive workup and an optional recrystallization or precipitation step.

The preparation of N-alkylated 5-ureidobenzimidazolones, as in entries 6-8 in Table 2, are prepared by conventional methods from alkylisocyanate reactants, whereby a cooled solution of the 5-alkylated aminobenzimidazolone reactant dissolved in polar aprotic organic solvent such as N,N'-dimethylformamide (DMF) is treated at 0° C. with the dropwise addition of an appropriate alkylisocyanate. The product is obtained in very high purity simply by precipitation with water, followed by washing and drying. N-Alkylated carbamates or urethanes of entries 9-12 in Table 2 are prepared readily by reaction of 5-hydroxybenzimidazolone with an alkyl isocyanate or polyisocyanate, such as octadecyl isocyanate (obtained from Sigma-Aldrich) or the di-isocyanate derivative of C-36 dimer hydrocarbon acid (obtained from Henkel Corp. as DDI 1410™), in the presence of a catalytic amount of dibutyltin dilaurate and with mild heating. The reactant 5-hydroxybenzimidazolone is prepared by various methods reported previously in the literature which are totally incorporated herein by reference, such as for example U.S. Patent Application No. 2005/0176726 involving demethylation of 5-methoxybenzimidazolone, or as described in *Australian J. Chem.*, 1986, 39(2), 295-301 by the over-oxidation of benzimidazole with lead tetraacetate, or by the methods reported in *J. Am. Chem. Soc.* 1958, 80, 1657-1662 and in U.S. Pat. No. 4,138,568, which describe the reaction between 5-hydroxy-1,2-phenylene diamine with phosgene in aqueous hydrochloric acid or molten urea gives 5-hydroxybenzimidazolone in good yields.

The preparation of substituted amino or ammonium groups at position 5 of the benzimidazolone compounds, such as entries 13-20 of Table 2, are also produced in one step by an alkyl substitution reaction (or, alkylation reaction) between 5-aminobenzimidazolone and 1.0-3.0 molar equivalents of a suitable alkylating reagent such as an alkyl halide, wherein the halogen is selected from F, Cl, Br, I; or a suitable alkyl ester of an alkanesulfonate or arenesulfonate reagent such as alkyl methanesulfonates (commonly known as alkyl mesylates, or alkyl para-toluenesulfonates (commonly known as alkyl tosylates), or alkyl trifluoromethanesulfonate (commonly known as alkyl triflates) wherein the corresponding leaving group is the mesylate, tosylate or triflate anion; or, a suitable alkyl ester of a carboxylic acid, such as alkyl acetate, alkyl formate, alkyl propionate and the like, wherein the leaving group that is displaced is the acetate, formate, propionate, etc. A suitable polar aprotic solvent for such substitution reactions include N,N-dimethylformamide, N,N-dimethylacetamide, N-methyl-2-pyrrolidinone, dimethylsulfoxide, sulfolane, acetone, methyl ethyl ketone, tetrahydrofuran, dimethoxyethane, and other such polar aprotic solvents. Alkylation reactions are conducted at suitable temperatures such as from about 0° C. to about 120° C., or preferably from about 25° C. to about 100° C., depending on the extent of alkylation desired, the leaving group of the alkylating agent, and the reaction solvent employed, although the reaction temperatures can also be outside of the above ranges. Catalysts may optionally be used to speed up the rate of substitution reaction, and suitable catalysts include halide salts such as potassium iodide or sodium iodide, and the like.

The aromatic acid derivatives as stabilizer compounds have the general structure:

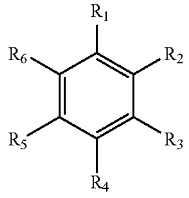

where at least one of $R_1$ to $R_6$, represents-COOH or —$CONH_2$, and at least one of $R_1$ to $R_6$ is hydrogen, and provided that at least one of $R_1$ to $R_6$ represents a sterically bulky functional group. Thus, for example, the aromatic acid derivatives can be benzoic acid derivatives (where $R_1$ is —COOH and $R_2$ to $R_6$ comprise H and at least one sterically bulky group), benzamide derivatives (where $R_1$ is —$CONH_2$ and $R_2$ to $R_6$ comprise H and at least one sterically bulky group), isophthalic acid derivatives (where $R_1$ and $R_3$ are —COOH, $R_2$ is H, and $R_4$ to $R_6$ comprise H and at least one stoically bulky group), isophthalamide derivatives (where $R_1$ and $R_3$ are —$CONH_2$, $R_2$ is H, and $R_4$ to $R_6$ comprise H and at least one sterically bulky group), or phthalic acid derivatives (where $R_1$ and $R_2$ are —COOH, and $R_3$, to $R_6$ comprise H and at least one sterically bulky group). These aromatic acid derivative compounds are desirably amphiphilic compounds, with a pigment-affinic group, such as for example the carboxylic acid or primary amide moieties and the like, that associate non-covalently with the functional groups of the pigment, primarily by hydrogen bonding and/or aromatic pi-stacking interactions.

Any of the sterically bulky groups $R_1$ to $R_6$ can be a suitable aliphatic group that provides a sterically bulky layer or barrier that prevent or limit aggregation of pigment particles or molecules which leads to pigment particle growth. Examples of suitable sterically bulky aliphatic groups include all of the various non-polar or hydrophobic, sterically bulky groups described above. Specific examples of the functional moieties that are part of the sterically bulky groups include those of the formula —COOR, —NHCOR, —OR, and —CONHR, where R is a substituted or unsubstituted alkyl group, including linear, branched and/or cyclic alkyl groups of 1 to 100, such as 1 to 50 or 6 to 30 carbon atoms, including those of the formulae:

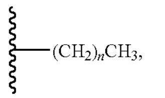

where n = 0-49

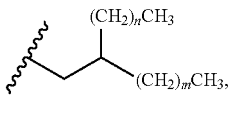

and where m = 0-49
and n = m or m + p
and p = 1-10

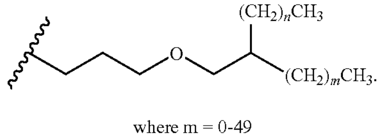

where m = 0-49
and n = m or m + p
and p = 1-10

Other useful groups may include aliphatic hydrocarbons with higher degrees of branching, cyclic hydrocarbons, as well as linear or branched alkyleneoxy chains such as oligo- or poly-[ethyleneglycol] and the like.

Specific examples of the aromatic acid derivatives thus include, but are not limited to, those in the following Table 3:

TABLE 3
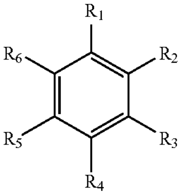
$R_4$ and $R_6$ = H
| | $R_1$ | $R_2$ | $R_3$ |
|---|---|---|---|
| 1 | —COOH | H | 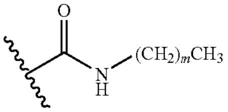 m = 17 |
| 2 | —COOH | H | 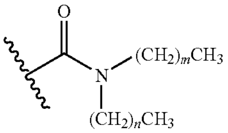 m = 11, n = 9 |
| 3 | —COOH | H | 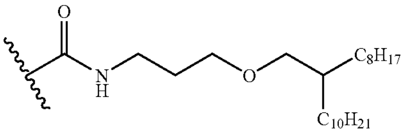 |
| 4 | —COOH | H | 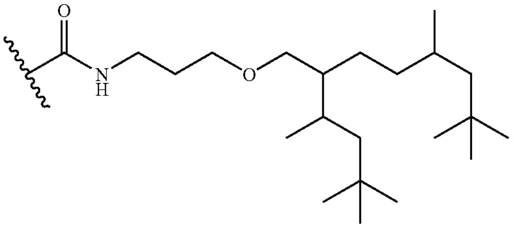 |
| 5 | —COOH | H | 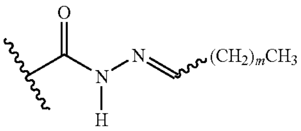 m = 17 |
| 6 | —COOH | H | 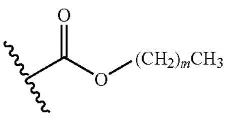 m = 17 |
| 7 | —COOH | H | 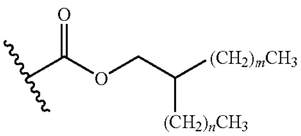 m = 9, n = 7 |

TABLE 3-continued
| | | | |
|---|---|---|---|
| 8 | —COOH | H | 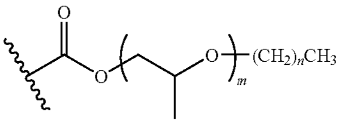<br>m = 2, n = 3<br>m = 3, n = 3 |
| 9 | —COOH | H | 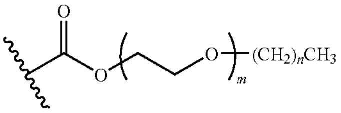<br>m = 1, n = 3<br>m = 2, n = 3 |
| 10 | —COOH | H | 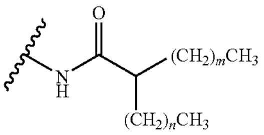<br>m = 11, n = 9<br>m = 7, n = 5<br>m = 5, n = 3 |
| 11 | —COOH | H | 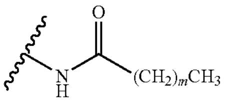<br>m = 17 |
| 12 | —COOH | H | 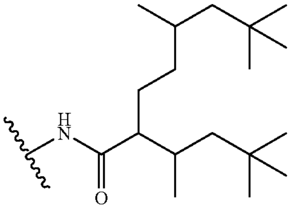 |
| 13 | —COOH | H | 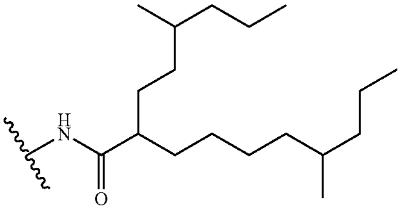 |
| 14 | —COOH | H | 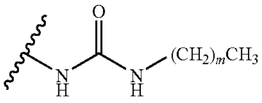<br>m = 17 |
| 15 | —COOH | H | 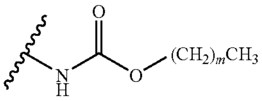<br>m = 17 |
| 16 | —COOH | H | 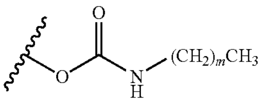<br>m = 17 |

TABLE 3-continued
| | | | |
|---|---|---|---|
| 17 | —COOH | H | 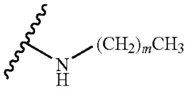<br>m = 17 |
| 18 | —COOH | H | 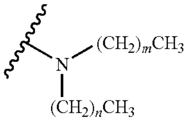<br>m = 17 |
| 19 | —COOH | H | 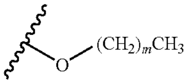<br>m = 17 |
| 20 | —COOH | H | 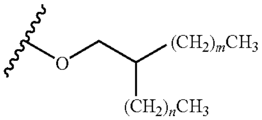<br>m = 9, n = 7 |
| 21 | —COOH | H | 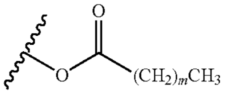<br>m = 17 |
| 22 | —COOH | H | 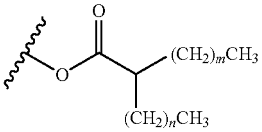<br>m = 11, n = 9<br>m = 7, n = 5<br>m = 5, n = 3 |
| 23 | —COOH | H | 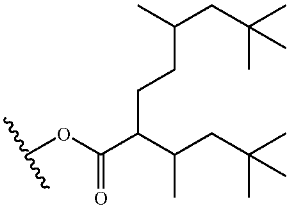 |
| 24 | —COOH | H | 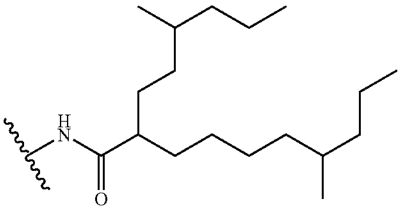 |
| 25 | —COOH | H | —COOH |
| 26 | —COOH | H | —COOH |
| 27 | —COOH | H | —COOH |
| 28 | —COOH | H | —COOH |
| 29 | —COOH | H | —COOH |
| 30 | —COOH | H | —COOH |
| 31 | —COOH | H | —COOH |
| 32 | —COOH | H | —COOH |
| 33 | —COOH | H | —COOH |
| 34 | —COOH | H | —COOH |
| 35 | —COOH | H | —COOH |
| 36 | —COOH | H | —COOH |
| 37 | —COOH | H | —COOH |

TABLE 3-continued
| | | | |
|---|---|---|---|
| 38 | —COOH | H | —COOH |
| 39 | —COOH | H | —COOH |
| 40 | —COOH | H | —COOH |
| 41 | —COOH | H | —COOH |
| 42 | —COOH | H | —COOH |
| 43 | —COOH | H | —COOH |
| 44 | —COOH | H | —COOH |
| 45 | —COOH | H | —COOH |
| 46 | —COOH | H | —COOH |
| 47 | —COOH | H | —COOH |
| 48 | —COOH | H | —COOH |
| 49 | —$CONH_2$ | H | 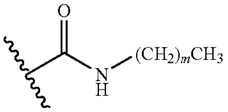 m = 17 |
| 50 | —$CONH_2$ | H | 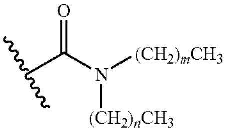 m = 11, n = 9 |
| 51 | —$CONH_2$ | H | 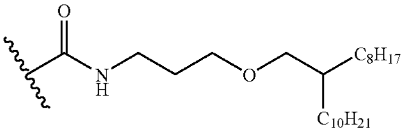 |
| 52 | —$CONH_2$ | H | 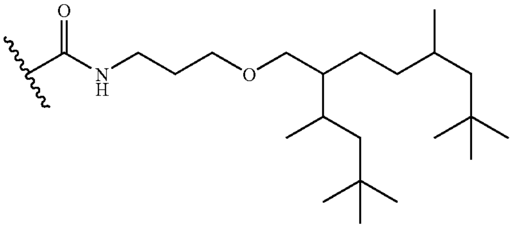 |
| 53 | —$CONH_2$ | H | 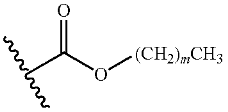 m = 17 |
| 54 | —$CONH_2$ | H | 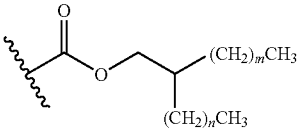 m = 9, n = 7 |
| 55 | —$CONH_2$ | H | 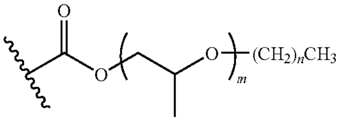 m = 2, n = 3<br>m = 3, n = 3 |
| 56 | —$CONH_2$ | H | 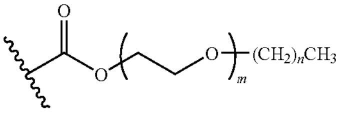 m = 1, n = 3<br>m = 2, n = 3 |

TABLE 3-continued
| | | | |
|---|---|---|---|
| 57 | —$CONH_2$ | H | 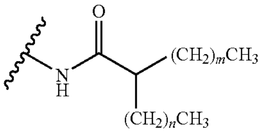<br>m = 11, n = 9<br>m =7, n = 5<br>m = 5, n = 3 |
| 58 | —$CONH_2$ | H | 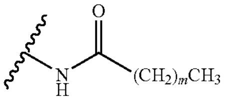<br>m = 16 |
| 59 | —$CONH_2$ | H | 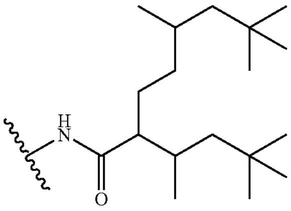 |
| 60 | —$CONH_2$ | H | 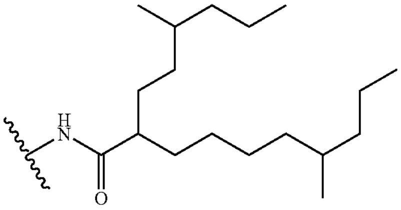 |
| 61 | —COOH | H | —COOH |
| 62 | —$CONH_2$ | H | 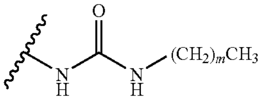<br>m = 17 |
| 63 | —$CONH_2$ | H | 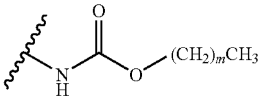<br>m = 17 |
| 64 | —$CONH_2$ | H | 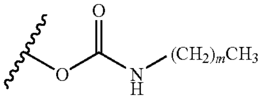<br>m = 17 |
| 65 | —$CONH_2$ | H | 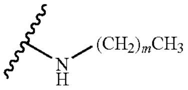<br>m = 17 |
| 66 | —$CONH_2$ | H | 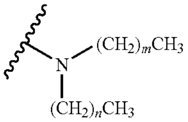<br>m = 17 |

TABLE 3-continued

| | | | |
|---|---|---|---|
| 67 | —$CONH_2$ | H | 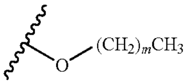 m = 17 |
| 68 | —$CONH_2$ | H | 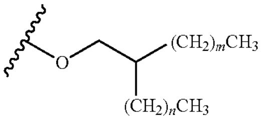 m = 9, n = 7 |
| 69 | —$CONH_2$ | H | 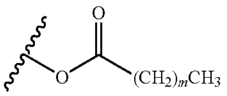 m = 17 |
| 70 | —$CONH_2$ | H | 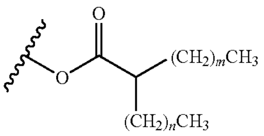 m = 11, n = 9<br>m = 7, n = 5<br>m = 5, n = 3 |
| 71 | —$CONH_2$ | H | 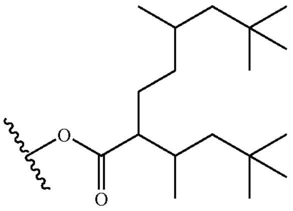 |
| 72 | —$CONH_2$ | H | 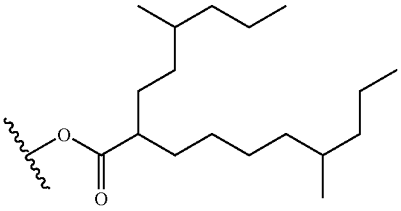 |
| 73 | —$CONH_2$ | H | —$CONH_2$ |
| 74 | —$CONH_2$ | H | —$CONH_2$ |
| 75 | —$CONH_2$ | H | —$CONH_2$ |
| 76 | —$CONH_2$ | H | —$CONH_2$ |
| 77 | —$CONH_2$ | H | —$CONH_2$ |
| 78 | —$CONH_2$ | H | —$CONH_2$ |
| 79 | —$CONH_2$ | H | —$CONH_2$ |
| 80 | —$CONH_2$ | H | —$CONH_2$ |
| 81 | —$CONH_2$ | H | —$CONH_2$ |
| 82 | —$CONH_2$ | H | —$CONH_2$ |
| 83 | —$CONH_2$ | H | —$CONH_2$ |
| 84 | —$CONH_2$ | H | —$CONH_2$ |
| 85 | —$CONH_2$ | H | —$CONH_2$ |
| 86 | —$CONH_2$ | H | —COOH |
| 87 | —$CONH_2$ | H | —$CONH_2$ |
| 88 | —$CONH_2$ | H | —$CONH_2$ |
| 89 | —$CONH_2$ | H | —$CONH_2$ |
| 90 | —$CONH_2$ | H | —$CONH_2$ |
| 91 | —$CONH_2$ | H | —$CONH_2$ |
| 92 | —$CONH_2$ | H | —$CONH_2$ |
| 93 | —$CONH_2$ | H | —$CONH_2$ |
| 94 | —$CONH_2$ | H | —$CONH_2$ |
| 95 | —$CONH_2$ | H | —$CONH_2$ |

TABLE 3-continued
| | | | |
|---|---|---|---|
| 96 | —COOH | —COOH | 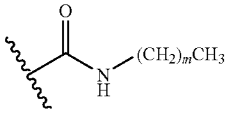<br>m = 17 |
| 97 | —COOH | —COOH | 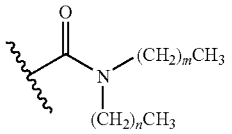<br>m = 11, n = 9 |
| 98 | —COOH | —COOH | 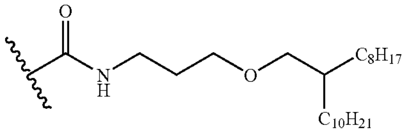 |
| 99 | —COOH | —COOH | 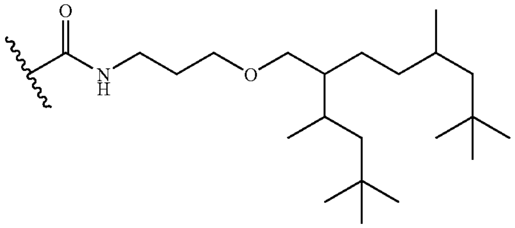 |
| 100 | —COOH | —COOH | 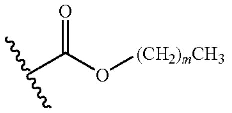 |
| 101 | —COOH | —COOH | 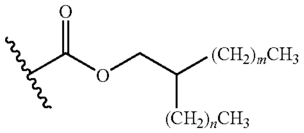<br>m = 9, n = 7 |
| 102 | —COOH | —COOH | 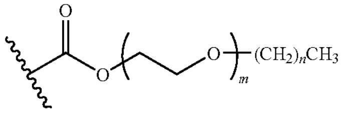<br>m = 2, n = 3<br>m = 3, n = 3 |
| 103 | —COOH | —COOH | 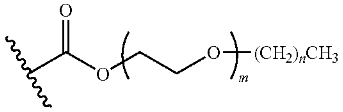<br>m = 1, n = 3<br>m = 2, n = 3 |

TABLE 3-continued
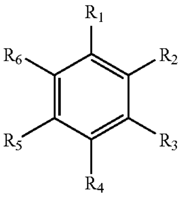
$R_4$ and $R_6$ = H
| | $R_5$ |
|---|---|
| 1 | 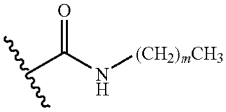 m = 17 |
| 2 | 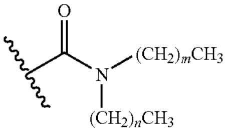 m = 11, n = 9 |
| 3 | 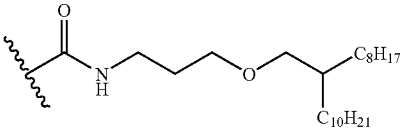 |
| 4 | 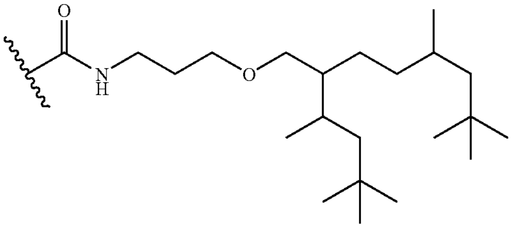 |
| 5 | 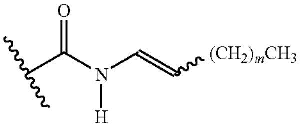 m = 17 |
| 6 | 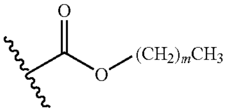 m = 17 |
| 7 | 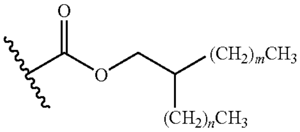 m = 9, n = 7 |

TABLE 3-continued
8 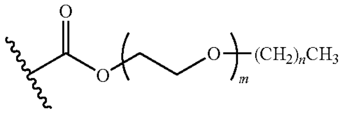
m = 2, n = 3
m = 3, n = 3
9 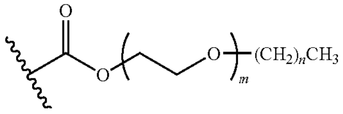
m = 1, n = 3
m = 2, n = 3
10 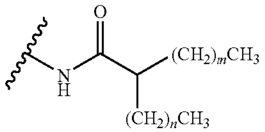
m = 11, n = 9
m = 7, n = 5
m = 5, n = 3
11 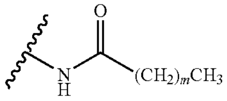
m = 17
12 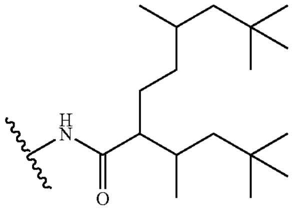
13 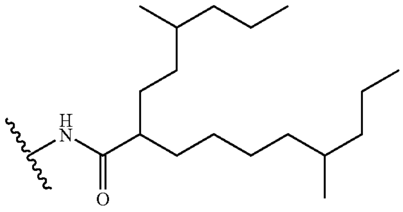
14 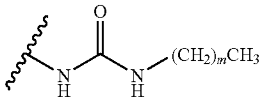
m = 17
15 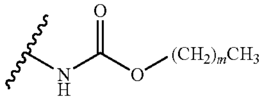
m = 17
16 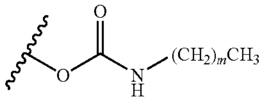
m = 17

TABLE 3-continued
17
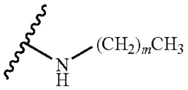
m = 17
18
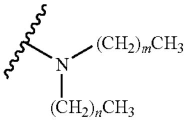
m = 17
19
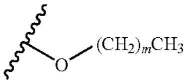
m = 17
20
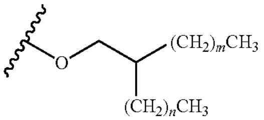
m = 9, n = 7
21
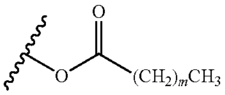
m = 17
22
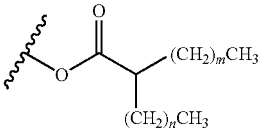
m = 11, n = 9
m = 7, n = 5
m = 5, n = 3
23
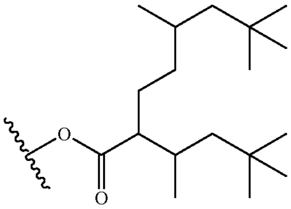
24
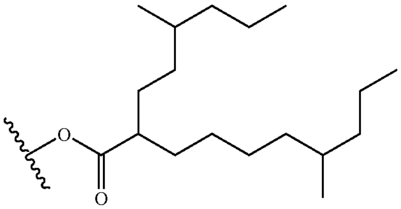
25
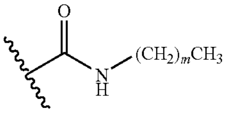
m = 17

TABLE 3-continued
26
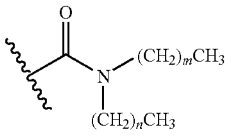
m = 11, n = 9
27
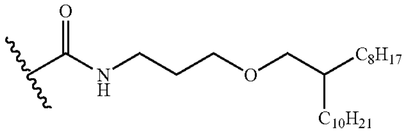
28
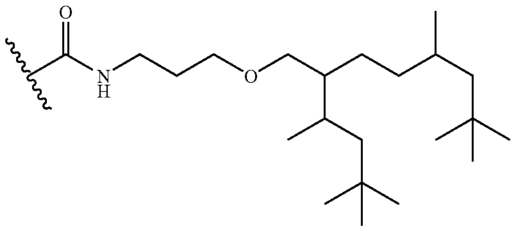
29
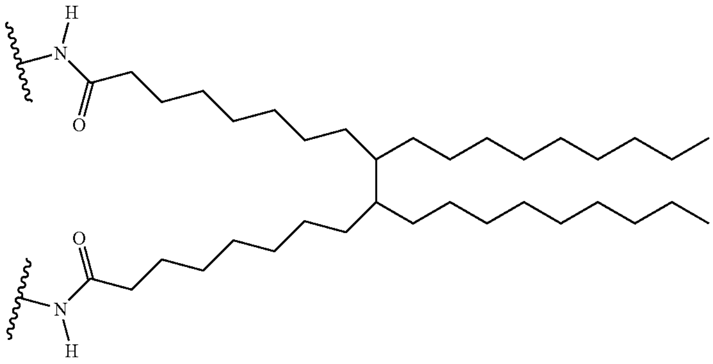
30
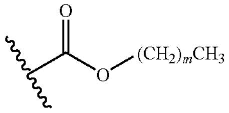
m = 15
31
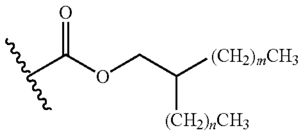
m = 9, n = 7
32
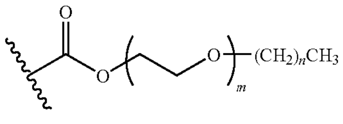
m = 2, n = 3
m = 3, n = 3
33
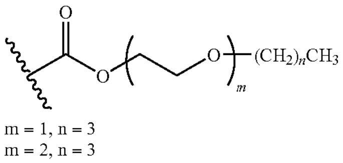
m = 1, n = 3
m = 2, n = 3

TABLE 3-continued
34
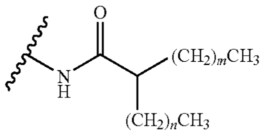
m = 11, n = 9
m = 7, n = 5
m = 5, n = 3
35
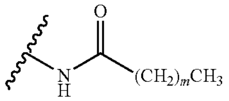
m = 15
36
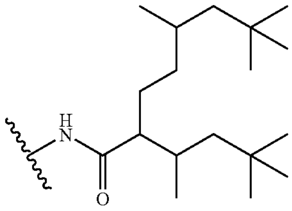
37
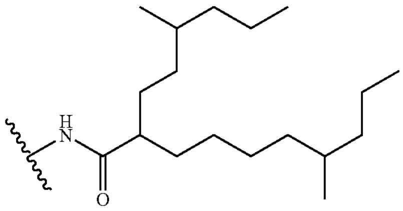
38
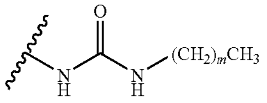
m = 17
39
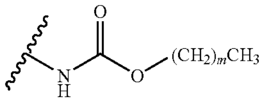
m = 17
40
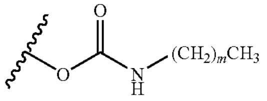
m = 17
41
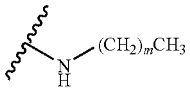
m = 17
42
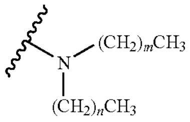
m = 17
43
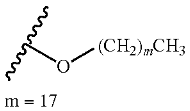
m = 17

TABLE 3-continued
44
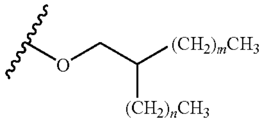
m = 9, n = 7
45
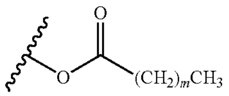
m = 17
46
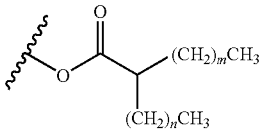
m = 11, n = 9
m = 7, n = 5
m = 5, n = 3
47
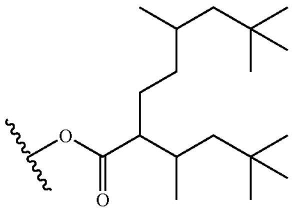
48
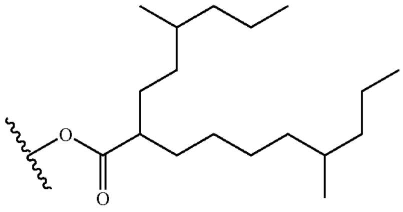
49
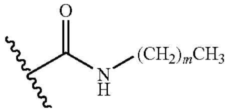
m = 17
50
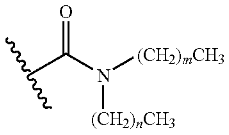
m = 11, n = 9
51
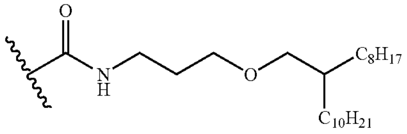

TABLE 3-continued
| | |
|---|---|
| 52 | 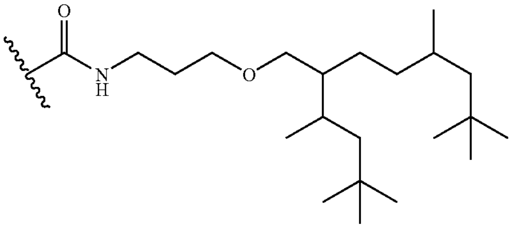 |
| 53 | 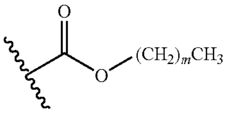<br>m = 17 |
| 54 | 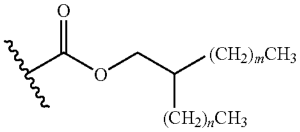<br>m = 9, n = 7 |
| 55 | 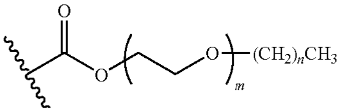<br>m = 2, n = 3<br>m = 3, n = 3 |
| 56 | 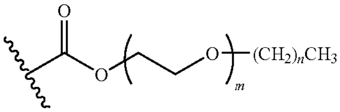<br>m = 1, n = 3<br>m = 2, n = 3 |
| 57 | 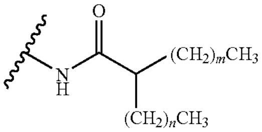<br>m = 11, n = 9<br>m = 7, n = 5<br>m = 5, n = 3 |
| 58 | 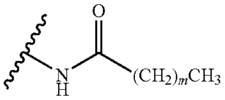<br>m = 17 |
| 59 | 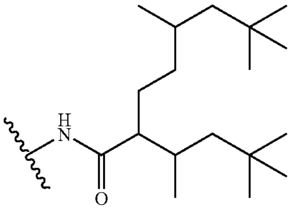 |

TABLE 3-continued
60
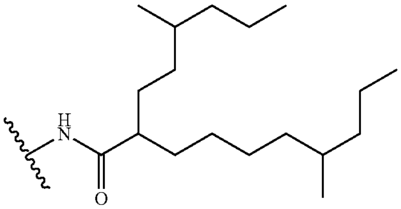
61
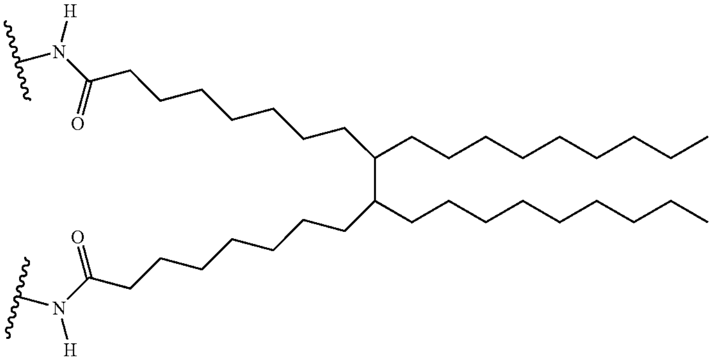
62
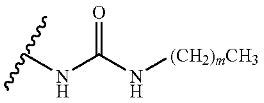
m = 17
63
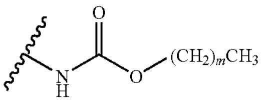
m = 17
64
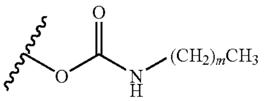
m = 17
65
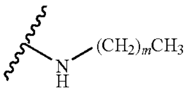
m = 17
66
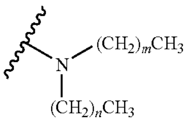
m = 17
67
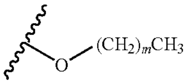
m = 17
68
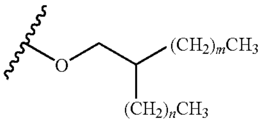
m = 9, n = 7

TABLE 3-continued
69
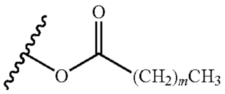
m = 17
70
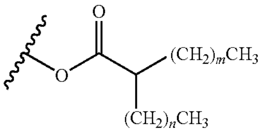
m = 11, n = 9
m = 7, n = 5
m = 5, n = 3
71
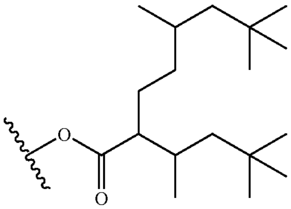
72
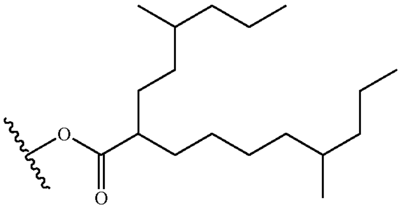
73
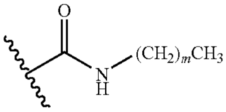
m = 17
74
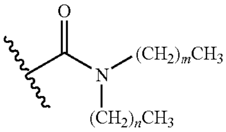
m = 11, n = 9
75
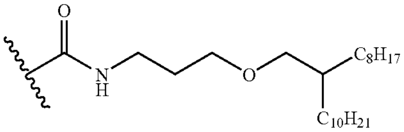
76
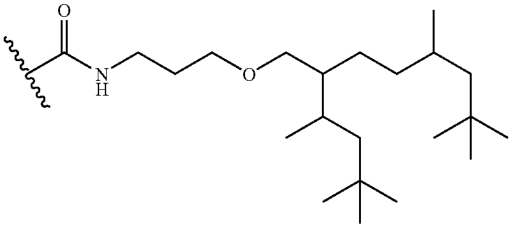

TABLE 3-continued
77
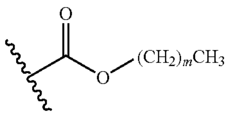
m = 15
78
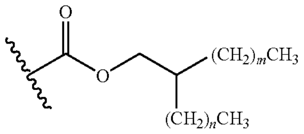
m = 9, n = 7
79
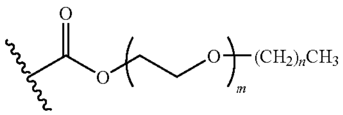
m = 2, n = 3
m = 3, n = 3
80
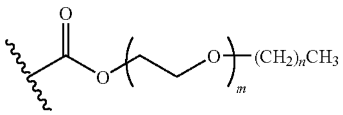
m = 1, n = 3
m = 2, n = 3
81
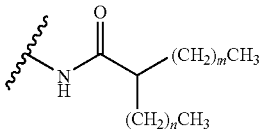
m = 11, n = 9
m = 7, n = 5
m = 5, n = 3
82
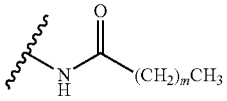
m = 15
83
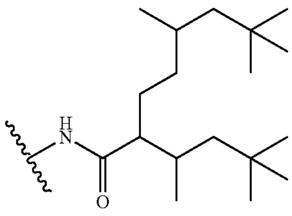
84
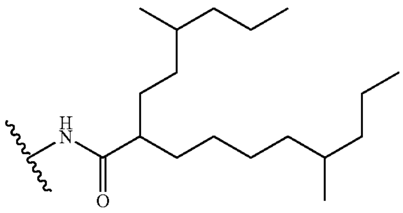
85
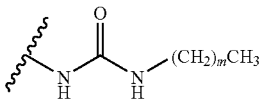
m = 17

TABLE 3-continued
86
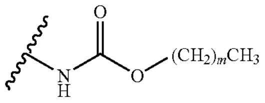
m = 17
87
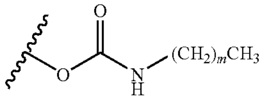
m = 17
88
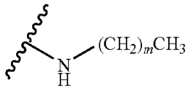
m = 17
89
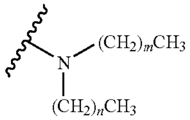
m = 17
90
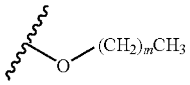
m = 17
91
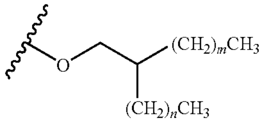
m = 9, n = 7
92
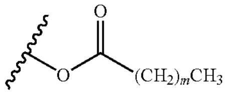
m = 17
93
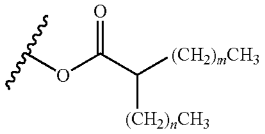
m = 11, n = 9
m = 7, n = 5
m = 5, n = 3
94
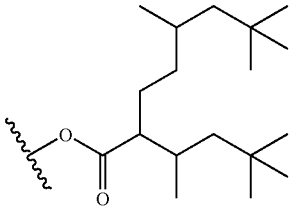
95
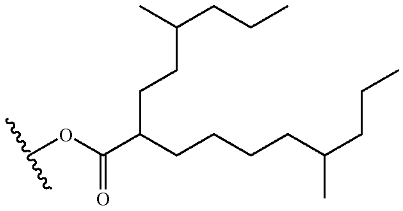

TABLE 3-continued

| | |
|---|---|
| 96 | H |
| 97 | H |
| 98 | H |
| 99 | H |
| 100 | H |
| 101 | H |
| 102 | H |
| 103 | H |

Benzoic and isophthalic acids that are derivatized with sterically bulky ester groups, as in [(benzene)-(C═O)—OR] moiety, are prepared by reacting 1,3,5-tricarbonylbenzene trichloride with about 0.5 to about 3.0 equivalents of an appropriate sterically bulky aliphatic alcohol in a suitable anhydrous solvent, such as tetrahydrofuran or dichloromethane in the presence of a hindered base such as a triethylamine or tertiary alkylamine, 2,2,6,6-tetramethylpiperidine, or 2,6-dimethylpyridine and the like. In a similar manner, the analogous substituted amides, as in [(benzene)-(C═O)—NHR] moiety, are formed from the same reaction of 1,3,5-tricarbonylbenzene trichloride with about 0.5 to about 3.0 equivalents of a sterically bulky alkylamine. Quenching the reaction with water at any point during the reaction converts any unreacted acid chloride groups to the corresponding carboxylic acid groups, while quenching the reaction with concentrated ammonia/ammonium hydroxide results in the formation of benzamide or isophthalamide groups.

Benzoic or isophthalic acids with aminoacyl groups, as in [(benzene)-NH(C—O)—R] moiety, are prepared using similar procedures involving reactions between the suitable aromatic amines, such as 3,5-diaminobenzoic acid methyl ester and dimethyl 5-aminoisophthalate, and suitable sterically bulky acid chlorides, wherein the reaction is carried out in an anhydrous solvent such as tetrahydrofuran or dichloromethane in the presence of a hindered base such as a triethylamine or tertiary alkylamine, 2,2,6,6-tetramethylpiperidine, or 2,6-dimethylpyridine and the like. 3,5-Alkoxy benzoic acid derivatives and 5-alkoxy isophthalic acid derivatives are prepared by an alkyl substitution (or, alkylation) reaction of 3,5-dihydroxylbenzoic acid methyl ester and dimethyl 5-hydroxyisophthalate, with a suitable sterically bulky alkylating reagent. Examples of such sterically bulky alkylating reagents include, for example, secondary alkyl halides, wherein the halogen is selected from F, Cl, Br, I; or the suitable alkyl ester of an alkanesulfonate or arenesulfonate reagent such as alkyl methanesulfonates (commonly known as alkyl mesylates, or alkyl para-toluenesulfonates (commonly known as alkyl tosylates), or alkyl trifluoromethanesulfonate (commonly known as alkyl triflates) wherein the corresponding leaving group is the mesylate, tosylate or triflate anion; or a suitable alkyl ester of a carboxylate, such as alkyl acetate, alkyl formate, alkyl propionate and the like, wherein the leaving group that is displaced is the acetate, formate, propionate, etc. A suitable polar solvent for this reaction includes, n-butanol, N,N-dimethylformamide, N,N-dimethylacetamide, N-methyl-2-pyrrolidinone, dimethylsulfoxide, acetone, methyl ethyl ketone, tetrahydrofuran, dimethoxyethane, and other such solvents. Alkylation reactions are conducted in the presence of a mild base such as sodium or potassium carbonate, and at temperatures such as from about 0° C. to about 120° C., or preferably from about 25° C. to about 100° C., depending on the extent of alkylation desired, the leaving group of the alkylating agent, and the reaction solvent employed, although the reaction temperatures can also be outside of the above ranges. Following the alkylation reaction, the methyl ester groups are converted to the corresponding free carboxylic acid groups by reaction with sodium or potassium hydroxide in warm methanol. Analogous benzamides and isophthalamides are subsequently prepared from the corresponding carboxylic acids by first conversion to their acid chloride group using standard procedures described earlier, following by quenching with concentrated ammonia/ammonium hydroxide.

The ester and amide derivatives of phthalic acids containing the sterically bulky aliphatic groups were prepared by reacting commercially available trimellitic anhydride acid chloride with a suitable sterically bulky alkylamine or alkanol in a suitable anhydrous solvent such as tetrahydrofuran or dichloromethane in the presence of hindered base such as triethylamine. The anhydride was subsequently converted to the resulting phthalic acid group by hydrolysis with either NaOH or KOH in methanol.

In additional embodiments, other stabilizer compounds having different structures than those described previously may be used in addition to the sterically bulky stabilizer compounds of this invention, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such branched alcohols, non-ionic surfactants including long-chain or branched hydrocarbon alcohols, such as for example 2-ethylhexanol, lauryl alcohol, and stearyl alcohol, and alcohol ethoxylates; acrylic-based polymers such as poly(acrylic acid), poly(methyl methacrylate), styrene-based copolymers such as poly(styrene sodio-sulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate). Any one of the above stabilizers, and combinations thereof, can be used in the preparation of the nanoscale pigment particles, at an amount that ranges from about 0.5 wt % to about 50 wt %, such as from about 1 wt % to about 25 wt %, although the amount can also be outside of these ranges.

The types of non-covalent chemical bonding that can occur between the pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the pigment.

The "average" pigment particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size data, which is sometimes expressed as Z-avg can be measured by methods that use light scattering such as Dynamic Light Scattering to infer particle size. The term "particle diameter" as used herein refers to the length of an anisotropic pigment particle at the longest dimension (in the case of acicular shaped particles) as derived from images of the particles generated by Transmission Electron Microscopy (TEM). The term "nanoscale", "nanoscopic", or "nano-sized" pigment particles refers to either an average particle size, $d_{50}$ or Z-avg, or an average particle length of less than about 150 nm, such as of about 1 nm to about 120 nm, or about 10 nm to about 100 nm. Geometric standard deviation is a unitless number that typically estimates a population's dispersion of a given attribute (for instance, particle size) about the median value of the population and is derived from the exponential value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln\mu_g)^2}{n}}$$

In embodiments, the nanoparticles of azo-benzimidazolone pigments are generally synthesized in one or more process steps. The pigment nanoparticles are produced directly in the reaction medium during the synthesis, however optional post-synthesis refinement is possible to tailor surface chemistry for the intended use of such pigment nanoparticles. In one method, the bulk azo-benzimidazolone pigment is synthesized in a first process by using diazotization and coupling reactions, and then the pigment solids transformed into nanoparticle form using a second process step, such as by a pigment reprecipitation method. In a reprecipitation step, the crude bulk pigment is molecularly dissolved using a good solvent, followed by a pigment precipitation that is triggered by the controlled addition of an appropriate nonsolvent. However, for most manufacturable and economical purposes, a direct synthesis of azo-benzimidazolone pigment nanoparticles by a diazotization and coupling process is more desirable. These processes are shown generally in schemes 1 and 2 below:

Scheme 1:

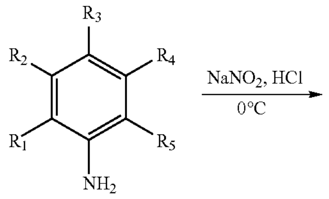

-continued

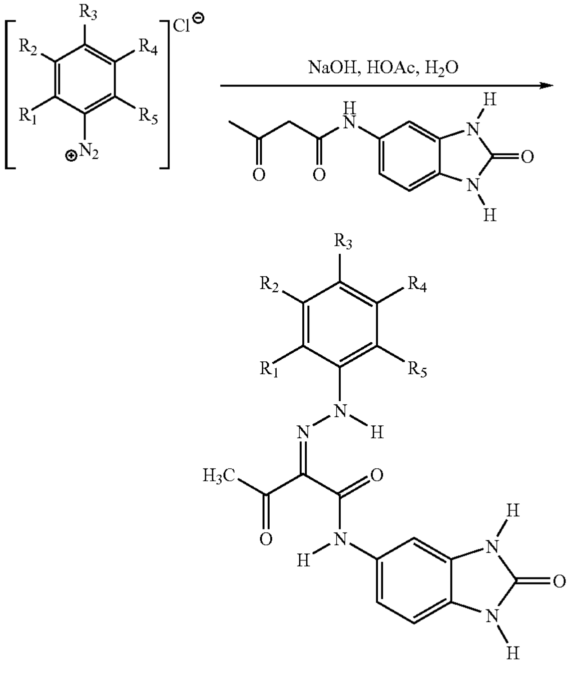

Scheme 2:

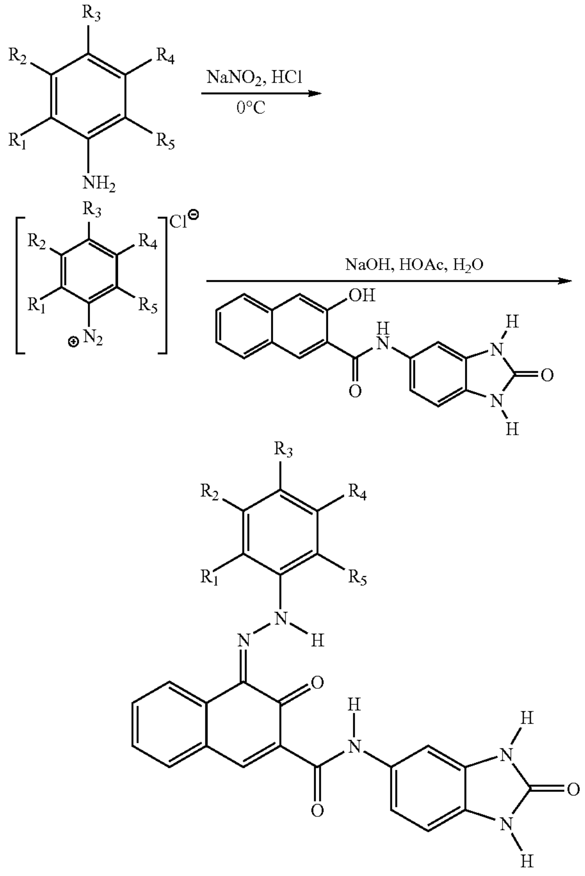

The method of making nanoscale particles of azo-benzimidazolone pigments (herein referred to as simply, benzimidazolone pigments) such as those illustrated in the general reactions in Schemes 1 and 2 above, is a direct synthesis process that involves at least one or more reactions. Diazotization is a key reaction step wherein a suitably substituted aromatic amine or aniline precursor is converted, either directly or indirectly, to its corresponding diazonium salt. The conventional reaction procedures involve treating an aqueous solution of the precursor with an effective diazotizing agent such as nitrous acid $HNO_2$ (which is generated in situ by the reaction of sodium nitrite with dilute acid solution such as hydrochloric acid), or alternatively in some cases, using nitrosyl sulfuric acid (NSA), which is commercially available or can be prepared by mixing sodium nitrite in concentrated sulfuric acid. The diazotization reaction is typically carried out in acidic aqueous solutions and at cold temperatures so as to keep the diazonium salt thermally stable, but in some cases may be carried out at room temperatures. The reaction results in forming a diazonium salt which is either dissolved in the medium, or is finely suspended as solid particles in the medium.

CC1

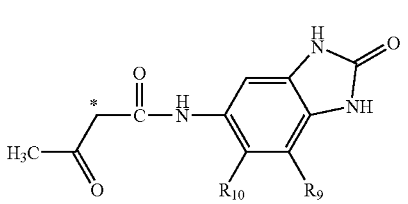

CC2

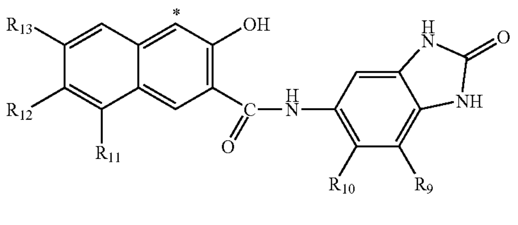

A second solution or solid suspension is prepared by either dissolving or suspending the benzimidazolone coupling component (most commonly the structures CC1 or CC2 as shown above) into aqueous medium, typically an alkaline solution to aid dissolution and then subsequently treated with acids and/or bases to render the benzimidazolone coupling component into a buffered acidic aqueous solution or a buffered fine suspension, which is required for reaction with the diazonium salt solution. Suitable acids, bases and buffers include, for example, sodium or potassium hydroxide, acetic acid, and sodium acetate. The solution or fine suspension of the coupling agent may optionally contain other liquids such as an organic solvent (for example, iso-propanol, tetrahydrofuran, methanol, N-methyl-2-pyrrolidone, N,N-dimethylacetamide, dimethylsulfoxide, or the like) as a minor co-solvent, The second solution additionally contains any surface active agents, and includes the sterically bulky stabilizer compounds such as those described previously. This second solution is charged into a larger vessel in order to carry out the final reaction step, which is the coupling reaction involving the controlled addition of the diazonium salt solution at ambient or other suitable temperatures that can range from about 10° C. to about 75° C., thereby producing the pigment solids as a suspended precipitate in the aqueous slurry. As one will expect, there are several chemical and physical processing parameters that will affect the quality and characteristics of the pigment particles—such as average crystallite size, particle shape and particle distribution—and these process parameters include (but are not limited to): the relative stoichiometries of the starting diazo and coupling components as reactants, the order and the rate of reactant addition, the type and relative amount (loading) of any surface active agents and/or steric stabilizer compounds that are used in the synthesis, the relative concentrations of chemical species in the liquid medium, pH of liquid medium, temperature during coupling reaction, agitation rate, the performance of any post-synthesis processing steps such as heating to increase tinctorial strength, and also the methods for recovering and drying of the final particles.

As a general matter for the preparation of azo-benzimidazolone pigments comprising a single azo group, the starting diazo and coupling components are provided in an approximately stoichiometric (or 1:1 molar) ratio. In embodiments, the coupling component may have limited solubility in the coupling medium whereas the diazo component is generally soluble, in which case it is beneficial to use a very small excess of the diazo component, ranging from about 0.01 to about 0.25 molar equivalents, such as from about 0.01 to about 0.10 molar equivalents of excess diazo component relative to the moles of coupling component. By having a slight molar excess of diazo component, it is ensured that all of the insoluble coupling component is completely converted to pigment product. The excess diazo component would then be removed by washing of the final product. In contrast, if an excess of the insoluble coupling component were to be used, then any unreacted coupling component would remain in the final product mixture since it will be difficult to remove by washing, and may affect the properties of the nanoscale pigment.

The reaction conditions can also influence the quality and characteristics of the pigment particles. As a general matter for the diazotization reaction, the liquid medium in embodiments should be maintained such that the concentration of the diazo component, or diazonium salt reactant, does not exceed about 0.1 M to about 1.0 M, such as from about 0.2 M to about 0.80 M, or from about 0.30 M to about 0.60 M, although the concentration of the diazo component/diazonium salt in the liquid diazotization medium can also be outside these ranges. The amount of diazotizing reagent, which in embodiments is desirably a water-soluble and acid-miscible reagent such as sodium nitrite or nitrosyl sulfuric acid, should be approximately stoichiometric (or, 1:1 molar ratio) with the molar quantity of diazo component that is used, although a very small excess of the diazotizing reagent may also be used in the range of about 0.005 to about 0.20 molar equivalents of excess diazotizing reagent relative to the moles of diazo component precursor. The type of acid that can be used can include any suitable mineral acid such as hydrochloric acid and sulfuric acid, as well as organic acids such as acetic acid and proprionic acid, or various combinations of mineral and organic acids. In general for diazotization reactions used in the synthesis of colorants, the acid reactant is delivered as an aqueous solution to solubilize the reactive nitrosylating species and the resultant diazonium salt that is formed in the reaction. In embodiments, the concentrations of acid reactant is used in an excess amount relative to the moles of diazo precursor (the limiting reagent), and this amount can range from about 1.5 to about 5.0 excess molar equivalents, such as from about 2.0 to about 4.0 excess molar equivalents of acid relative to moles of diazo precursor; however, the actual excess amount can also be outside of these ranges if the case requires it.

The diazotization reaction is typically conducted at low temperatures in order to ensure that the resulting diazonium salt product is thermodynamically stable. In embodiments, the diazotization reaction is performed at temperatures ranging from −10° C. to about 5° C., such as from about −5° C. to about 3° C., or from about −1° C. to about 2° C. The nitrosylating reagent is typically added in aqueous solution so as to provide a total diazonium salt concentration as disclosed above, and the rate at which this aqueous solution of nitrosylating reagent is slowly added can vary depending on the scale of the reaction; however, typically the addition rate is controlled by maintaining the internal temperature throughout the course of the diazotization reaction to between −10° C. and 5° C., such as between about −1° C. to about 2° C. Following the complete addition of the nitrosylating reagent, the diazotization reaction mixture is stirred for an additional period of time that can vary from 0.25 hr to about 2 hr, again depending on the scale of the reaction.

In embodiments, the synthesis of benzimidazolone pigments that provide yellow and red colorants such as those represented in Schemes 1 and 2, involves a heterogeneous reaction between the diazonium salt solution, prepared according to the specifications disclosed above, and coupling component (for example, CC1 or CC2) which is reacted as a finely suspended mixture. The coupling component, such as for example CC1, is insoluble in the weak acid medium required that is required for the coupling reaction with the diazonium salt (step 2 illustrated in Schemes 1 and 2). Although the coupling component is generally found to be soluble at alkaline pH solutions, these conditions are not favorable for the coupling reaction with a diazonium salt, since the latter can form the trans- (or, "anti") diazoacetate ions instead of diazonium cations in alkaline media which do not react with coupling agents.

Due to the heterogeneity of the coupling reaction step, controlling the particle growth of the benzimidazolone pigment while it is being synthesized is a significant challenge. Imaging of the finely suspended coupling component CC1 using both Scanning Electron Microscopy (SEM) and Transmission Electron Microscopy (TEM) reveals elongated rod-like particles (see FIG. 1) having widths between 10-150 nm and considerably longer particle lengths ranging from about 100 to about 2000 nm, resulting in large aspect ratios (length:width) of about 5:1 to about 50:1, This evidence suggests that the formation of nanoparticles of the benzimidazolone pigment, for example Pigment Yellow 151, by the heterogeneous coupling reaction with a suitable diazonium salt is a more complex process than that which involves the reaction of two completely soluble pigment precursors.

An additional challenge is that many of the sterically bulky stabilizer compounds disclosed in embodiments also have the poor solubility characteristics of the coupling components and/or pigments, since they are amphiphilic structures with polar hydrogen-bonding groups and also long alkyl chains which generally resist solubilization in aqueous media. Therefore for a successful coupling reaction step, effective wetting and mixing of at least two sparingly soluble or insoluble components—the coupling component and a sterically bulky stabilizer—needs to be ensured. and preferably before the addition of the diazonium salt solution. Furthermore, by having good miscibility and wetting in the coupling component mixture prior to reaction with the diazonium salt, the preformation of hydrogen-bonding interactions between the steric stabilizer and the coupling agent would be facilitated, and additionally may favorably influence the particle size and morphology of the finely suspended coupling component, which in turn can benefit the control of particle size and properties of the resulting benzimidazolone pigment nanoparticles that will be formed.

The coupling component mixture of embodiments is comprised of the appropriate coupling component for synthesis of benzimidazolone pigment, a sterically bulky stabilizer compound, an alkaline base component, at least one acid buffer component, and an optional organic solvent. The amount of coupling component that is used is generally stoichiometric (or, 1:1 molar ratio) with the diazo component, as explained previously. However in embodiments, the coupling component may have limited solubility in the coupling medium whereas the diazo component is generally soluble, in which case it is desirable to use a very small excess of the diazo component, ranging from about 0.01 to about 0.25 molar equivalents, such as from about 0.01 to about 0.10 molar equivalents of excess diazo component relative to the moles of coupling component. By having a slight molar excess of diazo component, it is ensured that all of the insoluble coupling component is completely converted to pigment product. The alkaline base component is used to first solvate the coupling component into aqueous solution, and is generally selected from inorganic bases such as sodium or potassium hydroxide, or may also be selected from organic, non-nucleophilic bases such as tertiary alkyl amines that include, for example, triethylamine, triethanolamine, diethylaminoethanol, Dytek series of amines, DABCO (1,8-diazobicyclo [2.2.2]octane), and the like. An excess amount of alkaline base component is normally used, ranging from about 2.0 to about 10.0 molar equivalent excess, such as from about at 3.0 to about 8.0 molar equivalent excess of base, relative to moles of coupling component that are used, although the amount of actual base used may also be outside of these ranges if it is required. The acid component is used to neutralize both the base component and the coupling component so as to cause the fine reprecipitation of the coupling component in a buffered aqueous medium. It is typical to use common inorganic and organic acids for this purpose, such as hydrochloric acid or acetic acid, and the amount of acid used is approximately stoichiometric (or, 1:1 molar ratio) to the total amount of alkaline base component used for preparing the coupling component mixture, which provides a weakly acidic buffer medium.

The steric stabilizer compound can be introduced directly into the coupling mixture in the form of a solid or liquid, depending on the nature of the selected stabilizer, or more optionally it may be introduced as a solution in organic solvent. The amount of steric stabilizer compound that is added to the coupling component mixture, for effectiveness in stabilizing and controlling the nanoparticle size of the resulting benzimidazolone pigment, can range from about 0.01 wt % to about 50 wt %, such as from about 0.5 wt % to about 25 wt %, or from about 5 wt % to about 10 wt % based on the final yield (mass) of benzimidazolone pigment to be produced. The concentration of steric stabilizer in the solvent can vary greatly, so long as the steric stabilizer is rendered into a dispersed, emulsified or soluble form in the organic solvent. Any suitable organic solvent may be used, with the provision that it does not react with the diazonium salt reactant or any residual nitrosylating species. Suitable organic solvents are those that are water-miscible, including aliphatic alcohols such as methanol, ethanol, isopropanol, n-butanol, isobutanol, sec-butanol, hexanol, cyclohexanol, dimethyl sulfoxide, ethyl methyl sulfoxide, N,N-dimethyl formamide, N,N-dimethylacetamide, N-methylpyrrolidinone, tetrahydrofuran, dimethoxyethane, alkylene glycols such as ethylene glycol, diethylene glycol, propylene glycol, dipropylene glycol, Dowanol®, and their mono- or di-alkyl ethers, and the like. Particularly suitable solvents in embodiments include aliphatic alcohols such as methanol, ethanol, isopropanol, and n-butanol, dimethyl sulfoxide, and tetrahydrofuran, or combinations thereof. If desired, the amount of optional organic solvent that is used for dispersing steric stabilizer can range from about 0 to about 50 volume %, and preferably from about 2 to about 20 volume % based on total liquid volume of the coupling component mixture.

It is desired to either pre-disperse or emulsify the sterically bulky stabilizer compound in the coupling medium prior to addition of the diazonium salt precursor. The coupling component mixture can be prepared in several ways, but certain aspects of the process are essentially the same. For example, the coupling component is generally first solubilized into an aqueous solution of the alkaline base. It may also be desirable to solubilize or disperse the steric stabilizer either directly into the same alkaline solution of the coupling component, or optionally into an organic solvent, or into another solution which is then transferred into the coupling component mixture. It may be desirable to use heating, or high-shear mixing, to facilitate dispersion, emulsification or solubilization of a stabilizer compound, even in the presence of an optional organic solvent. In particular embodiments, it is also advantageous to incorporate the stabilizer into the aqueous coupling medium at a temperature ranging from 10-100° C. in order to achieve good dispersion. The stabilizer can also be introduced to the aqueous coupling medium at a pH that ranges from moderately acidic to strongly basic (that is, a pH range from about 3 to 12). The pH of the coupling medium to which the steric stabilizer is added may depend on the stability of that particular stabilizer to acid or base, and the pH can range from about 1 to 14. In embodiments, it is desired that the stabilizer is added to a coupling mixture at a pH ranging between 2-9, such as between 4-7, although it can also potentially be added to a solution having pH outside of these ranges. The stabilizer can be added to the coupling mixture at any suitable rate, so long as adequate mixing and dispersion is allowed to occur.

The most critical process conditions used to ensure an effective coupling reaction with the diazonium salt solution (that is, one that will provide nanoscale particles of benzimidazolone pigment) include, but are not limited to, the following parameters: 1) the order of reactant addition for preparing the coupling component mixture, and 2) order of addition of the reactants in the coupling reaction (i.e. diazonium salt, coupling component, and steric stabilizer). Other process parameters, such as agitation rate, pH and temperature during the coupling reaction step, are also important to ensure effective formation of pigment nanoparticles, however are less critical than the selected order of reactant addition.

In the preparation of the coupling component mixture, the order of addition of the reactants can be carried out by several suitable processes, such as by: 1) adding the steric stabilizer (either neat or in organic solvent) directly into the alkaline solution of coupling component, and thereafter adding the acid component to cause the fine reprecipitation of the coupling component in a buffered acidic medium; or, 2) separately and sequentially adding the alkaline solution of coupling component and the steric stabilizer (either neat or in organic solvent) to a prepared aqueous solution of the acid component, the result of which causes the fine reprecipitation of the coupling component in the presence of steric stabilizer compound under acidic conditions. In both these processes, the coupling component is rendered as a fine particle suspension with non-covalently associated steric stabilizer compound.

Figure 2:
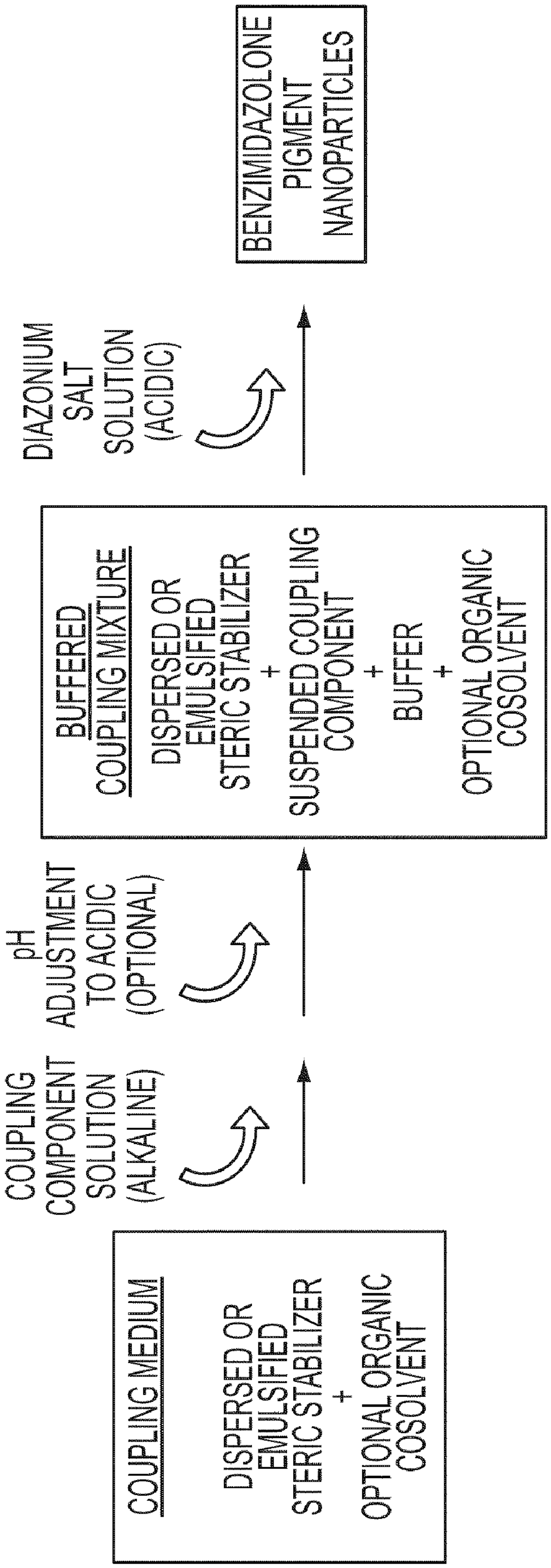
FIG. 2 represents a method comprising consecutive addition of pigment precursors.

For the final coupling reaction of the diazonium salt solution and the coupling component, the order and rate of addition of these key reactants in the presence of steric stabilizer, can have profound effects on physical and performance characteristics of the final benzimidazolone pigment particles. In embodiments, two different general methods were developed to form the benzimidazolone pigment nanoparticles of the present invention, which are herein referred to as "Consecutive Addition" (Method A in FIG. 2) and "Simultaneous addition" (Method B in FIG. 4). Method A, or Consecutive Addition, involves steps that are more commonly practiced in industrial pigment manufacturing, wherein the two pigment precursors (diazo and coupling components) are added consecutively at different times to a final reaction mixture that already contains the dispersed or emulsified steric stabilizer compound, in order to perform the final coupling reaction.

Figure 3:
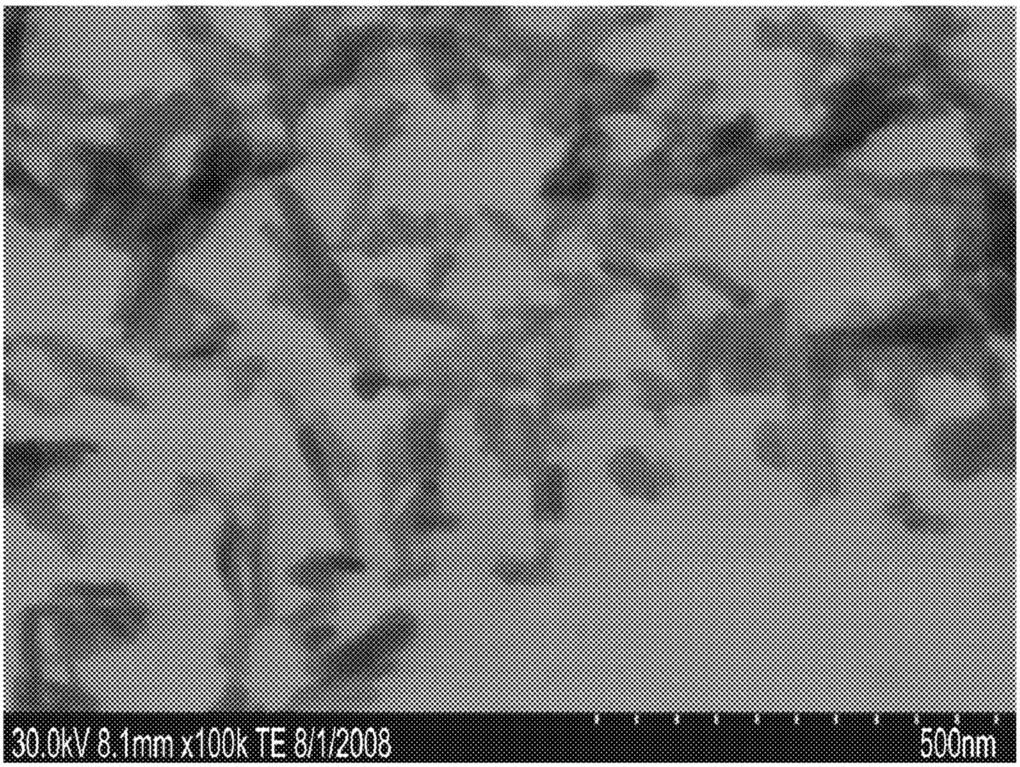
FIG. 3 is a Scanning Transmission Electron Microscopy (STEM) image of Pigment Yellow 151 nanoparticles (scale bar is 500 nm).

In the Consecutive Addition method (A), the coupling reaction between the finely suspended coupling component and the solution of diazo component is heterogeneous; that is, one of the pigment precursors (often the coupling component) is present as a solid phase, while another pigment precursor (the diazonium salt) is completely soluble. The sterically bulky stabilizer compound is introduced into the coupling mixture preferably prior to the addition of the diazonium salt solution. The physical form of the steric stabilizer additive may or may not play a role in the reaction kinetics of this heterogeneous coupling reaction; however it was evident that the presence of the steric stabilizer as a hydrogen-bonding surface active agent in the reaction mixture resulted in the formation of pigment nanoparticles. For example, in the synthesis of Pigment Yellow 151 nanoparticles according to Method A and using the steric stabilizer compound #23 in Table 1 where m=11 and n=9, the particles that formed were observed by SEM/STEM imaging to be shortened rod-like primarily particles and aggregates as shown in FIG. 3, having length:width aspect ratios ranging from about 2 to about 5, and had average particle sizes measured by dynamic light scattering that ranged from about 50 nm to about 200 nm, more typically from about 75 nm to about 150 nm.

Figure 4:
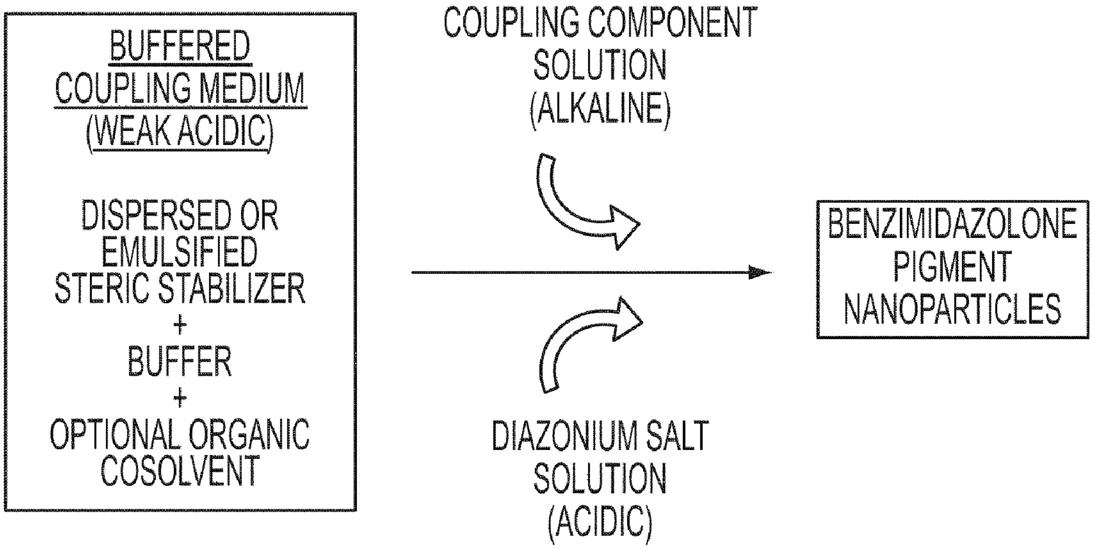
FIG. 4 represents a method comprising simultaneous addition of pigment precursors.

An alternative second method for making benzimidazolone pigment nanoparticles can also be used, which is herein referred to as "Simultaneous Addition" or Method B. Method B is shown in FIG. 4. This second method involves the addition of homogeneous solutions of both the diazo component (acidic) and the coupling component (which is alkaline) as the key pigment precursors added simultaneously into a final reaction mixture that contains the pre-dispersed or emulsified steric stabilizer compound.

An advantage of the Simultaneous Addition method (B) is that the homogeneous solutions of the two pigment precursors are ideally mixed under more controllable and dilute conditions and without the need for large volumes of buffer solutions in the coupling medium, provided that the rate of coupling reaction is faster than the rate of mixing of the two components. In this method, the pigment product is formed as nanoparticles which precipitate in the reaction medium. The pigment nanoparticles are recoverable by standard operations such as vacuum or crossflow filtration or centrifugation, and dried by non-heating methods such as freeze-drying. FIG. 4 is a SEM image of Pigment Yellow 151 nanoparticles synthesized by the Simultaneous Addition method (B) in the presence of steric stabilizer compound #31 of Table 3, which reveals shortened platelet nanoparticles and agglomerates having length:width aspect ratios ranging from about 2 to about 5, and an average particle size measured by dynamic light scattering that ranged from about 75 nm to about 150 nm.

Throughout the coupling reaction step, the rate of addition of the reactant streams are kept constant and can range from about 1.0 mL/min to about 5 mL/min, depending on the scale of the reaction and the ability to regulate the internal temperature, pH and low viscosity, which ensures good reactivity.

The internal temperature of the coupling reaction mixture can range from about 10° C. to about 60° C., such as from about 15° C. to about 30° C., in order to produce an aqueous slurry of the desired benzimidazolone pigment nanoparticles. An internal temperature of greater than 30° C. may cause the final pigment particle size to increase undesirably. While the advantages of heating a chemical reaction include faster reaction times and development of the final product, in particular color development of benzimidazolone pigments in general, heating is also known to facilitate aggregation and coarsening of particles, which is not desirable for the applications of this invention. The reaction medium is desirably maintained at a suitable acidic pH that allows the coupling reaction to proceed. For example, the ph can be maintained in a range of about 2 to about 7, or about 3.5 to about 6.5. If the pH is outside this range, side reactions may occur resulting in the formation of undesirable byproducts that may be difficult to remove and which may alter the properties of the final product.

An alternative to increasing the internal temperature to speed reaction is to increase the agitation rate. During this reaction, as the pigment is formed, the mixtures thickens considerably, requiring strong mechanical agitation to achieve sufficient mixing. In certain situations, it is possible to lower the viscosity of the slurry by adding in a very small quantity of surface active agent, such as a few droplets of 2-ethylhexanol, which also can provide a beneficial defoaming effect, particularly at larger scales of this reaction. The shear forces exerted while vigorously stirring the reaction mixture, in combination with the benefit of the surface active agent for controlling viscosity and foaming, may also offer a synergistic benefit to reducing the size and size distribution of the pigment nanoparticles.

Both Methods A and B offer different and yet advantageous processing attributes that, in combination with the use of a suitable sterically bulky stabilizer compound and an optional co-solvent, enables one to control particle size and size distribution, so that the desired pigment nanoparticles are formed. In the absence of the sterically bulky stabilizer and optional co-solvent, neither method A (Consecutive Addition) nor method B (Simultaneous Addition) would produce a predominance of nanoparticles of benzimidazolone pigments, but instead produce a broad distribution of elongated rod-like pigment particles and aggregates that range in average size (Z-avg, measured by dynamic light scattering) from sub-micron sizes of about 150 nm to microscale particle sizes that approach or exceed 1000 nm.

In embodiments, the slurry of pigment nanoparticles is not treated nor processed any further, such as performing additional heating, but instead is isolated immediately by vacuum filtration or centrifugal separation processes. For example, contrary to prior art processes that required boiling of the product in concentrated acetic acid in order to aid color development, such subsequent processes are not required in embodiments where the sterically bulky stabilizer compounds are used. The pigment solids can be washed copiously with deionized water to remove excess salts or additives that are not tightly associated or bonded with the pigment particle surface. The pigment solids are preferably dried by freeze-drying under high vacuum, or alternatively, by vacuum-oven drying at low temperatures, such as from about 25-50° C., so as to prevent fusing of primary nanoparticles during bulk drying with heat. The resulting pigment consists of predominantly nanoscale primary particles and nanoscale particle aggregates that are loosely agglomerated and of high quality, which when imaged by TEM (Transmission Electron Microscopy), exhibit rod-like nanoparticles having lengths of from about 50 nm to about 150 nm, and predominantly from about 75 nm to about 125 nm. When these particles were measured for average particle size, Z-avg or $d_{50}$ as colloidal dispersions in n-butanol by Dynamic Light Scattering technique, the values ranged from about 80 nm to about 200 nm, and predominantly from about 100 nm to about 150 nm. (Here it must be mentioned that average particle size, $d_{50}$ or Z-avg, is measured by Dynamic Light Scattering, which an optical technique that measures the hydrodynamic radius of non-spherical pigment particles gyrating and translating in a liquid dispersion via Brownian motion, by measuring the intensity of the incident light scattered from the moving particles. As such, the $d_{50}$ or Z-avg particle size metric obtained by Dynamic Light Scattering technique is always a larger number than the actual particle dimensions (length, width) observed by SEM or TEM imaging.)

The shape of the nanoscale benzimidazolone pigment particles using the above methods of preparation are generally rod-like, but can be one or more of several other morphologies, including platelets, needles, prisms or nearly spherical, and the aspect ratio of the nanoscale pigment particles can range from 1:1 to about 10:1, such as having aspect ratio between 1:1 and 5:1; however the actual metric can lie outside of these ranges.

Pigment particles of benzimidazolone pigments such as Pigment Yellow 151 and Pigment Red 175 that have smaller particle sizes could also be prepared by the above method in the absence of using sterically bulky stabilizers and with the use of surface active agents alone (for example, using only rosin-type surface agents), depending on the concentrations and process conditions employed, but the pigment product will not predominantly exhibit nanoscale particles nor will the particles exhibit regular morphologies. In the absence of using the sterically bulky stabilizer compound, the methods described above generally produce a broad distribution of elongated rod-like particle aggregates, ranging in average particle diameter from 150 to greater than 1000 nm and with large (length:width) aspect ratios exceeding about 5:1. Such particles are very difficult to either wet and/or disperse into a matrix for coating applications, and will generally give poor coloristic properties. In embodiments, the combined use of a suitable sterically bulky stabilizer compound with optionally a minor amount of suitable surface active agent, such as rosin-type surfactants or alcohol ethoxylates, using the synthesis methods described previously would afford the smallest pigment particles having nanoscale dimensions, more narrow particle size distribution, and low aspect ratio of less than about 5:1.

The advantages of this process include the ability to tune particle size and composition for the intended end-use application of the benzimidazolone pigment, such as toners and inks and coatings, which include phase-change, gel-based and radiation-curable inks, solid and non-polar liquid inks, solvent-based inks and aqueous inks and ink dispersions. For the end-use application in piezoelectric inkjet printing, nanoscale particles are advantageous to ensure reliable inkjet printing and prevent blockage ofjets caused by pigment particle agglomeration. In addition, nanoscale pigment particles are advantageous for offering enhanced color properties in printed images.

The formed nanoscale pigment particle compositions can be used, for example, as coloring agents in a variety of ink compositions, such as in liquid (aqueous or non-aqueous) ink vehicles, including inks used in conventional pens, markers and the like, liquid ink jet ink compositions, solid or phase change ink compositions, and the like. For example, the colored nanoparticles can be formulated into a variety of ink vehicles, including solid and phase-change inks with melt temperatures of about 60 to about 130° C., solvent-based liquid inks or radiation-curable such as UV-curable liquid inks, and even aqueous inks.

In addition to ink compositions, the nanoscale benzimidazolone pigment particle compositions can be used in a variety of other applications, where it is desired to provide a specific color to the composition. For example, the compositions can also be used as colorants for paints, resins, lenses, optical color filters, printing inks, and the like according to applications thereof. By way of example only, the compositions of embodiments can be used for toner compositions, which include polymer particles and nanoscale pigment particles, along with other optional additives, that are formed into toner particles and optionally treated with internal or external additives such as flow aids, charge control agents, charge-enhancing agents, filler particles, radiation-curable agents or particles, surface release agents, and the like. The toner composition of the present invention can be prepared by a number of known methods including extrusion melt blending of the toner resin particles, nanoscale pigment particles and other colorants and other optional additives, followed by mechanical commination and classification. Other methods include those well known in the art such as spray drying, melt dispersion, extrusion processing, dispersion polymerization, and suspension polymerization. Further, the toner compositions can be prepared by emulsion/aggregation/coalescence processes, as disclosed in references U.S. Pat. Nos. 5,290,654, 5,278,020, 5,308,734, 5,370,963, 5,344,738, 5,403,693, 5,418,108, 5,364,729, 5,346,797, 7,547,499, 7,524,599, 7,442,740, 7,429,443, 7,425,398, 7,419,753, 7,402,371, 7,358,022, 7,335,453, and 7,312,011, the entire disclosures of which are incorporated herein by reference, The toner particles can in turn be mixed with carrier particles to form developer compositions. The toner and developer compositions can be used in a variety of electrophotographic printing systems.

In addition, nanoscale particle compositions of the benzimidazolone pigments, along with other classes of organic and inorganic pigments, can be used in a variety of other applications that make use of photo- or electronically conductive materials and devices. For example, organic photoconducting materials are used as imaging members in photoreceptor layered devices. Such devices generally comprise a charge generator layer, which may consist of organic pigments and dyes such as quinacridone-type pigments, polycyclic pigments such as dibromoanthanthrone pigments, benzimidazolone-type pigments, perylene-type and perinone-type diamines, polynuclear aromatic quinones, azo pigments including bis-, tris- and tetrakis-azo; quinoline-type pigments, indigo and/or thioindigo-type pigments, in addition to amorphous films of inorganic materials such as selenium and its alloys, hydrogenated amorphous silicon and compounds of silicon and germanium, carbon, oxygen, nitrogen. The charge generator layer may also comprise phthalocyanine pigments, quinacridone pigments, lake pigments, azo lake pigments, oxazine pigments, dioxazine pigments, triphenylmethane pigments, azulenium dyes, squalium dyes, pyrylium dyes, triallylmethane dyes, xanthene dyes, thiazine dyes, cyanine dyes, and the like dispersed in a film forming polymeric binder and fabricated generally by solvent coating techniques. In many cases, the crystal forms of these pigments, particularly organic pigments, have a strong influence on photon-induced charge generation.

Nanoscale particle compositions of the benzimidazolone pigments, along with other classes of organic and inorganic pigments, could be used as organic photo conducting materials in (dye-sensitized) solar cells. Solar cells are typically multi-layer devices in which each layer in the structure provides a specific function (i.e., light harvesting, electron/hole transporting. The nanopigments may be incorporated independently or in combination with other materials into a layer that functions as a light receiving layer that generates electron-hole pairs when receiving light. Pigments can be used in place of dyes for these applications, where pigments with nanoscale particle sizes would be preferred due to easier processability and dispersion within the photoconductive layer. In addition, such nanoscale materials in some cases have display size-tunable optical and electronic properties when particle sizes are in the nanoscale dimensions. Other classes of nanopigments besides benzimidazolones may be employed in these devices as well.

Other applications of benzimidazolone nanoparticles include their use in sensors for biological/chemical detection. Organic nanoparticles have been demonstrated to have size-tunable optical and electronic properties. Thin films of benzimidazolone nanoparticles may serve as simple, useful sensor platforms using transduction schemes based on changes in the optical and/or electronic properties of the nanoparticles. For example, benzimidazolone pigments are highly colored. The coloristic properties of the nanoparticles may be affected by the presence of certain chemical analytes such as volatile organic compounds. Also, the hydrogen bonding groups of the benzimidazolone molecules also may provide potential molecular recognition sites for nanoscale biological entities with complementary hydrogen bonding groups. Binding events between the nanoparticles and nanoscale biological entities, such as DNA, RNA, proteins, enzymes, may be detectable using optical spectroscopic techniques such as UV-Vis, FT-IR, Raman, and/or fluorescence spectroscopies.

Examples are set forth herein below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Comparative Example 1

Synthesis of Pigment Yellow 151, Using the Method of German Patent DE 3140141

2.0 g (14.5 mmol) of Anthranilic acid, 35 mL of deionized water, and 8.5 mL of 5 M hydrochloric acid are mixed with magnetic stirring into a round bottom flask equipped with a thermometer. The clear solution was cooled to below 0° C., after which a solution of $NaNO_2$ (1.058 g, 15.33 mmol) dissolved into 6 mL of deionized water was slowly to the reaction mixture at a rate that maintained the internal temperature below 0° C. The cold diazonium salt solution was maintained for an additional 1 hr, prior to reaction with the coupling agent mixture below. 5-acetoacetylamino-2-benzimidazolone (3.473 g, 14.9 mmol, obtained from TCI America) was first dissolved into a solution of 1.715 g NaOH in 10 mL deionized water to give a pale yellow solution. In a separate 500 mL resin kettle was charged in the following order, deionized water (195 mL), glacial acetic acid (6 mL), and NaOH (2.29 g), and the mixture stirred to dissolution. The alkaline solution of coupling agent was then transferred dropwise under vigorous mechanical stirring to the buffer solution in the resin kettle, which formed a fine white suspension of precipitated coupling agent.

Into this white suspension was slowly added, at room temperature and under vigorous mechanical stirring, the cold diazonium salt solution, which formed a yellow slurry. After stirring at room temperature for several hours, the yellow solid was collected by vacuum filtration using a 0.8 micron pore size Versapor® filter membrane (obtained from Pall Corp.), and was washed with deionized water until the filtrate had pH of 6.0. The yellow wetcake was reslurried into deionized water and freeze dried for 48 hrs, which afforded 4.60 g (83% yield) of a bright yellow powder. TEM microscopy of the pigment showed elongated rods with average particle diameter (length) ranging from 100-400 nm.

Comparative Example 2

Synthesis of Pigment Yellow 151 (in Presence of Non-Ionic Surface Agent)

Into a 250 mL round bottom flask is charged anthranilic acid (3.0 g, available from Sigma-Aldrich, Milwaukee, Wis.), deionized water (40 ml) and 5M HCl aqueous solution (10 mL). The mixture is stirred at room temperature until all solids are dissolved, then cooled to 0° C. A solution of sodium nitrite (1.6 g) is dissolved in deionized water (5 mL) and then is added dropwise into the solution of anthranilic acid at a rate that maintains the internal temperature range in the mixture of 0-5° C. Once diazotization is complete, the solution is stirred an additional 0.5 hr. A second mixture for the coupling component is prepared by charging deionized water (40 mL) and sodium hydroxide (2.8 g) into a 250-mL vessel, stirring to dissolution, then adding 5-(acetoacetamido)-2-benzimidazolone (5.25 g, available from TCI America, Portland, Oreg.) into this solution while vigorously stirring, followed after with 2-ethylhexanol as a non-specific surface agent (4 mL, available from Sigma-Aldrich, Milwaukee, Wis.). A separate solution containing glacial acetic acid (7.5 mL), 5M NaOH solution (15 mL) and deionized water (80 mL) is then added dropwise into the alkaline solution of coupling component while stirring vigorously, after which the coupling component is precipitated as a white suspension of particles, and the mixture is weakly acidic. The cold diazotization mixture is slowly added dropwise into the suspension of coupling component, while stirring vigorously, to produce a dark yellow slurry of pigment solids, which is stirred at room temperature for another 2 hours, after which time the pigment is a lighter yellow color. The pigment solids are collected by vacuum-filtration, rinsing with three volumes of deionized water (200 mL each), then methanol (50 mL), and a final rinse with deionized water (50 mL), and lastly is freeze-dried. Bright yellow granules of pigment are obtained, and TEM images show aggregates of smaller rod-shaped particles, with particle diameters ranging from about 100 nm to about 250 nm.

Example 1

Synthesis of Steric Stabilizer #20 in Table 1

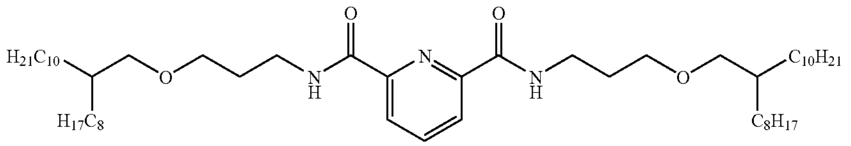

Step A: Bis Acid Chloride Synthesis

A 100 mL round bottom flask is charged with 1.02 g (6.09 mmol) of pyridine-2,6-dicarboxylic acid (available from Sigma-Aldrich, Milwaukee, Wis.), which is suspended in 20 mL anhydrous THF with stirring under inert atmosphere at room temperature 2.2 mL (0.0252 mol) of oxalyl chloride is then added slowly dropwise before adding 3 drops of N,N-dimethylformamide. After 10 min. the solid is completely dissolved and stirring at room temperature is continued for an additional 1 h. The solvent is then removed by rotary evaporation and dried in vacuo.

Step B: Amide Formation

A 250 mL round bottom flask is charged with 4.10 g (0.0115 mol) of 9-(3-aminopropyloxy)-octadecane (obtained from Tomah3 products, a division of Air Products Ltd.) and is purged with inert atmosphere gas ($N_2$ or Ar). 40 mL of anhydrous THF is then added and the solution is cooled to 0° C. A chilled solution of 2,6-pyridinedicarboxylic acid dichloride (step A) in 20 mL anhydrous THF is then added slowly dropwise to the solution containing the amine. 2.5 mL (0.0179 mol) of triethylamine is added and the reaction is allowed to slowly warm to room temperature. After 12 hr stirring, 10 mL of deionized water and 40 mL of ethyl acetate are added. The bottom aqueous layer is separated and the organic layer is washed with two 20 ml aliquots of water. The solvent is then removed by rotary evaporation, and the product is dried in vacuo to give the steric stabilizer product #20 of Table 1, as a viscous amber oil (4.85 g, 95%).

Example 2

Synthesis of Steric Stabilizer #23 of Table 1 (m=7, n=9)

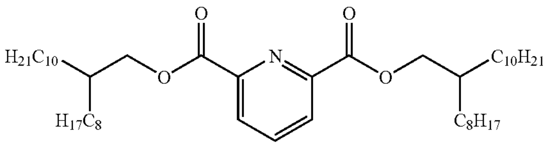

Step A: Bis Acid Chloride Synthesis

A 100 mL round bottom flask was charged with 1.04 g (0.00623 mol) pyridine-2,6-dicarboxylic acid (available from Sigma-Aldrich, Milwaukee, Wis.), which is suspended in 20 mL anhydrous THF with stirring under inert atmosphere at room temperature. 2.2 mL (0.0252 mol) of oxalyl chloride is then added slowly dropwise before adding 4 drops of N,N-dimethylformamide. After 15 min. the solid is completely dissolved and stirring a room temperature is continued for an additional 1 hr. The solvent is then removed by rotary evaporation and dried in vacuo.

Step B: Ester Formation

In a 100 mL round bottom flask, 2,6-pyridinedicarboxylic acid dichloride (from Step A) is dissolved into 5 mL of dry THF with stirring under inert atmosphere. 6 mL of a 2.49 M solution of 2-octyldodecanol (obtained as ISOFOL 20 from Sasol America, Tex.) in anhydrous THF is then added to the acid chloride solution, before heating the reaction to reflux for 1.5 hr. The reaction is cooled to room temperature and a small amount of water is added to quench any unreacted acid chloride. The excess solvent is removed by rotary evaporation to give the steric stabilizer product #23 of Table 1 (m=7, n=9), as a viscous yellow oil (4.54 g, 100%).

Example 3

Synthesis of Steric Stabilizers #8 and #31 of Table 3

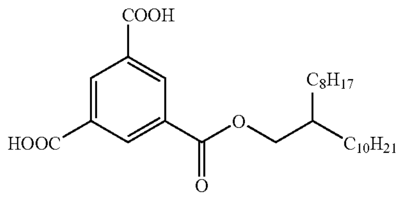

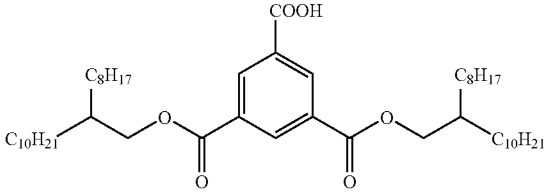

A 50 mL round bottom flask equipped with a condenser is charged with 562 mg (1.28 mmol) of 1,3,5-benzenetricarbonyl trichloride (available from Sigma-Aldrich, Milwaukee, Wis.), and 631 mg (2.58 mmol) of 2-octyldodecanol (available as ISOFOL 20 from Sasol America, Tex.). 2 mL of THF is then added with stirring under inert atmosphere to give a clear solution. The reaction is heated at reflux for 40 min., then is cooled to room temperature, and the solvent is then removed by rotary evaporation. The resulting crude white solid is purified by silica gel chromatography eluting with a gradient of 0-100% ethyl acetate in hexanes. After purification, 600 mg of steric stabilizer compound #8 is isolated as a waxy solid (58%), and 158 mg of steric stabilizer compound #31 as a byproduct also is also isolated in the form of a viscous oil (19%).

Example 4

Synthesis of Pigment Yellow 151 Nanoparticles (with Stearamide as Steric Stabilizer)

Into a 250 mL round bottom flask is charged anthranilic acid (3.0 g, available from Sigma-Aldrich, Milwaukee, Wis.), deionized water (40 mL) and 5M HCl aqueous solution (10 mL). The mixture is stirred at room temperature until all solids are dissolved, then cooled to 0° C. A solution of sodium nitrite (1.6 g) is dissolved in deionized water (5 mL) and then is added dropwise into the solution of anthranilic acid at a rate that maintains the internal temperature range in the mixture of 0-5° C. Once diazotization is complete, the solution is stirred an additional 0.5 hr. A second solution is prepared for the coupling component, by charging deionized water (30 mL) and sodium hydroxide (2.8 g) into a 250-mL vessel, stirring to dissolution, then adding 5-(acetoacetamido)-2-benzimidazolone (5.25 g, available from TCI America, Portland, Oreg.) into this solution while vigorously stirring. A warm solution of stearamide (1.6 g, available from Sigma-Aldrich, Milwaukee, Wis.) dissolved in tetrahydrofuran (20 mL) is added into the mixture. A separate solution containing glacial acetic acid (7.5 mL), 5M NaOH solution (15 mL) and deionized water (80 mL) is then added dropwise into the alkaline solution of coupling component while stirring vigorously, after which the coupling component is precipitated as a suspension of white particles and is weakly acidic. The cold diazotization mixture is slowly added dropwise into the suspension of coupling component, while stirring vigorously, to produce a dark yellow slurry of pigment solids, which is stirred at room temperature for another 2 hours, after which time the pigment is a lighter yellow color. The pigment solids are collected by vacuum-filtration through a membrane cloth having small pore size (800 nm or smaller), rinsing with three volumes of deionized water (200 mL each), then methanol (50 mL), and a final rinse with deionized water (50 mL), and lastly is freeze-dried. Bright yellow granules of pigment are obtained, and TEM images show aggregates of small rod-shaped particles having low aspect ratio, with particle diameters ranging from about 40 nm to about 150 nm, with the majority of particles having long diameters of less than about 100 nm.

Example 5

Synthesis of Pigment Yellow 151 Nanoparticles by Method A (Consecutive Addition) in Presence of Steric Stabilizer 0.72 g of Anthranilic acid (5.25 mmol), 10 mL of deionized water, and 2.6 mL of 5 M hydrochloric acid are mixed in a 3-neck round bottom flask equipped with a thermometer. The resulting clear solution is cooled to 0° C. before 1 mL of ice cold aqueous 5.9 M $NaNO_2$ (5.93 mmol) is added at a rate to maintain an internal temperature below 0° C. The solution is allowed to stir for at least 30 min at 0° C., before the dropwise addition to an aqueous acidic suspension of the coupling component at room temperature, which was prepared in the following way:

0.21 g (0.25 mmol) of a steric stabilizer compound of Example 1 (10 wt % of theoretical pigment yield) is emulsified with 1.21 g (5.19 mmol) of 5-acetoacetylamino-benzimidazolone (obtained from TCI America), 7.2 mL of aqueous 5 M sodium hydroxide, and 76 mL of water with rapid mechanical agitation. Thereafter, 2.2 mL of concentrated glacial acetic acid is added to the mixture.

Following overnight stirring, the yellow pigment solids are collected by vacuum filtration through a Supor 0.8 μm filter membrane cloth (obtained from PALL Corp.). The pigment wetcake is reslurried twice into deionized water and is isolated by vacuum filtration before freeze-drying, affording a bright yellow powder (2.0 g). Electron microscopy analysis (SEM/STEM) of the sample showed predominantly short platelets of primary nanoparticles and also some rod-like particles having nanoscale widths. Dynamic Light Scattering (DLS) analysis of a colloidal solution of the sample (n-BuOH, 0.01 mg/mL) gave an average hydrodynamic diameter ($d_{50}$) of 101 nm (PDI=0.235).

Example 6

Synthesis of Pigment Yellow 151 Nanoparticles by Method A (Consecutive Addition)) in Presence of Steric Stabilizer Anthranilic acid (1.8 g, 13 mmol), deionized water (30 mL), and 5 M hydrochloric acid (6.5 mL) are mixed into a 3-neck round bottom flask equipped with a thermometer. The clear solution is cooled to below 0° C. before cold aqueous 5.7 M $NaNO_2$ solution (2.5 mL, 15.7 mmol) is added at such a rate to maintain an internal temperature below 0° C. The resulting cold diazo solution is added dropwise to an aqueous acidic suspension of the coupling component at room temperature, which is prepared in the following way:

Molten steric stabilizer described in Example 2 (0.5 g, 0.686 mmol) is emulsified with 5-acetoacetylamino-benzimidazolone (3.05 g, 13 mmol, obtained from TCI America), aqueous 5 M sodium hydroxide (18 mL), and deionized water (200 mL) under vigorous mechanical agitation. Thereafter, 5.5 mL of concentrated glacial acetic acid is added to the emulsion mixture.

Following overnight stirring, the yellow pigment solids are collected by vacuum filtration through a Supor 0.45 μm filter membrane cloth (obtained from PALL Corp.). The pigment wetcake is reslurried twice in deionized water and is isolated by vacuum filtration before freeze-drying, affording a bright yellow powder (4.80 g). Electron microscopy analysis (SEM/STEM) of the sample showed predominantly short platelets of primary nanoparticles in addition to a few aggregates of rod-like nanoparticles. Dynamic Light Scattering (DLS) analysis of a colloidal solution of the sample (n-BuOH, 0.01 mg/mL) gave an average hydrodynamic diameter ($d_{50}$) of 143 nm (PDI=0.186).

Example 7

Synthesis of Pigment Yellow 151 Nanoparticles by Method B (Simultaneous Addition) in Presence of Steric Stabilizer Anthranilic acid (0.72 g, 5.25 mmol), deionized water (10 mL), and 5 M hydrochloric acid (2.6 mL) are mixed into a 3-neck round bottom flask equipped with a thermometer. The resulting clear solution is cooled to below 0° C. before cold aqueous 5.8 M $NaNO_2$ solution, (1 mL, 5.76 mmol) is added at such a rate that maintains an internal temperature below 0° C. This diazo solution is allowed to stir for at least 30 min. below 0° C.

The coupling component mixture was prepared separately in the following manner: 5-acetoacetylamino-benzimidazolone (1.21 g, 5.19 mmol, obtained from TCI America) is dissolved in aqueous 5 M sodium hydroxide (3 mL) and deionized water (10 mL) under vigorous mechanical agitation. The steric stabilizer compounds described in Example 3 (0.18 g; 0.234 mmol) are dissolved in warm isopropanol (3 mL) and are added to 5 M NaOH (4.2 mL) and deionized water (66 mL) under vigorous mechanical agitation to give a good dispersion. 2.2 mL of concentrated glacial acetic acid is then added, and the dispersion is cooled to room temperature. The separate diazonium salt solution and coupler solution are then simultaneously added slowly and at the same addition rate to the above acidic dispersion containing steric stabilizers.

Following overnight stirring, the yellow pigment solids are collected by vacuum filtration through a Supor 0.8 μm filter membrane cloth (PALL Corp.). The pigment wetcake is reslurried twice with deionized water and is isolated by vacuum filtration before freeze-drying, affording a light greenish-yellow powder (1.72 g). Electron microscopy analysis (SEM/STEM) of the sample showed predominantly short platelets and rod-like nanoparticles. Dynamic Light Scattering (DLS) analysis of a colloidal solution of the sample (n-BuOH, 0.01 mg/mL) gave an average hydrodynamic diameter ($d_{50}$) of 128 nm (PDI=0.179).

Example 8

Synthesis of Pigment Yellow 151 Nanoparticles by Method B (Simultaneous Addition) in Presence of Steric Stabilizer Anthranilic acid (1.79 g, 13.1 mmol), deionized water (33 mL), and 5 M hydrochloric acid (7 mL) are mixed in a 3-neck round bottom flask equipped with a thermometer. The clear solution is cooled to below 0° C. before cold aqueous 2.9 M $NaNO_2$ (5 mL, 14.3 mmol) is added at such a rate that maintains an internal temperature below 0° C. This solution is allowed to stir for 30 min below 0° C.

The coupling component mixture was prepared in the following way: 5-acetoacetylamino-benzimidazolone (3.05 g, 13.1 mmol, obtained from TCI America) is dissolved in 8 mL of aqueous 5 M sodium hydroxide and 26 mL of deionized water with rapid mechanical agitation. Molten octadecanamide (0.246 g, 0.738 mmol; 85% wt purity obtained from Sigma-Aldrich, Milwaukee, Wis.) is emulsified in 150 mL of boiling deionized water under vigorous mixing. Sodium acetate (4.51 g) is added and the mixture is cooled to room temperature to give a colloidal solution. The separate diazonium salt solution and coupling component solution are then simultaneously added slowly and at the same addition rate into the colloidal mixture of steric stabilizer (octadecanamide).

Following overnight stirring, the pigment solids are collected by vacuum filtration through a Supor 0.8 μm filter membrane cloth (PALL Corp.). The pigment wetcake is reslurried twice in deionized water and is then isolated by vacuum filtration before freeze-drying, affording a light greenish-yellow powder (3.59 g). Electron microscopy analysis (SEM/STEM) of the sample showed predominantly rod-like nanoparticles. Dynamic Light Scattering (DLS) analysis of a colloidal solution of the sample (n-BuOH, 0.01 mg/mL) gave an average hydrodynamic diameter ($d_{50}$) of 170 nm (PDI=0.206).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing nanoscale particles of benzimidazolone pigments, comprising:

providing one or more organic pigment precursor to a benzimidazolone pigment, comprising a benzimidazolone moiety, providing a solution or suspension of a sterically bulky stabilizer compound that associates non-covalently with a benzimidazolone moiety on one of the pigment precursors, wherein the sterically bulky stabilizer compound is selected from the group consisting of substituted pyridine derivatives, alkylated benzimidazolone compounds, alkylated derivatives of aromatic acids, and mixtures thereof, and carrying out a coupling reaction to form a benzimidazolone pigment composition, whereby the pigment precursors are incorporated within the benzimidazolone pigment and one or more functional moieties on the benzimidazolone pigment is non-covalently associated with the sterically bulky stabilizer, so as to limit an extent of particle growth and aggregation and result in nanoscale-sized pigment particles.

2. The process of claim 1, wherein the benzimidazolone pigment comprises one or more diazo component group(s) and one or more nucleophilic coupling component group(s) that are linked together with one or more azo functional group(s), wherein at least one of the diazo component group and the nucleophilic coupling component group comprises the benzimidazolone moiety.

3. The process of claim 2, wherein the diazo component group is selected from the group consisting of $DC_1$ to $DC_7$:

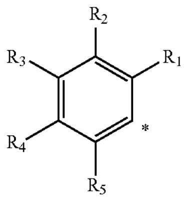

$DC_1$

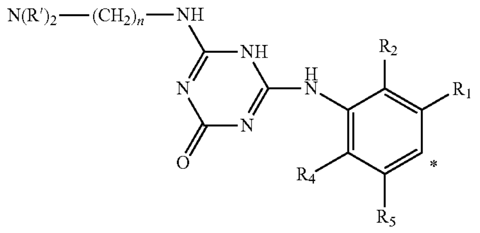

$DC_2$

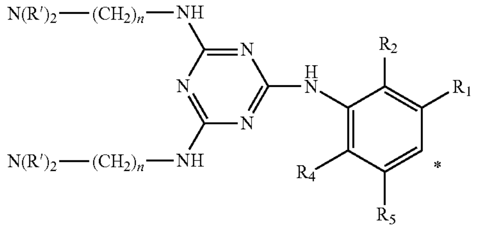

$DC_3$

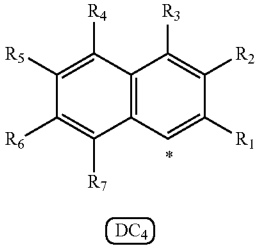

$DC_4$

-continued

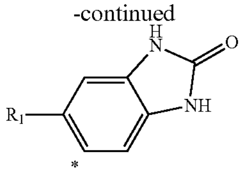

$DC_5$

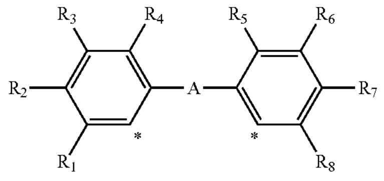

and $DC_6$

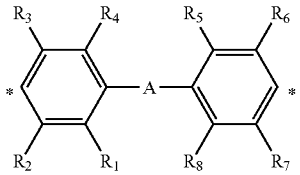

$DC_7$ wherein:

indicates a point of attachment to an amino group (—$NH_2$) in the diazo component precursor, and the point of attachment to the azo functional group (—N═N—) in the pigment, $R_1$ to $R_8$ independently represent H; halogens; $(CH_2)_nCH_3$ where n=0-6; OH; alkoxyl groups —OR' where R' represents H, $(CH_2)_nCH_3$, or $C_6H_5$, and n represents a number of from 1 to about 6; $CO_2H$; $CO_2CH_3$; $CO_2(CH_2)_nCH_3$ wherein n=0-5; $CONH_2$; (CO)R' wherein R' can independently represent H, $C_6H_5$, $(CH_2)_nCH_3$ wherein n=0-12, or $(CH_2)_nN(CH_3)_2$ wherein n=1-6; $OCH_3$; $OCH_2CH_2OH$; $NO_2$; $SO_3H$; or any of the following structural groups:

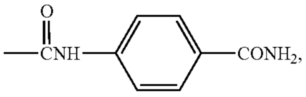

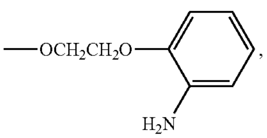

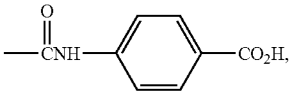

and

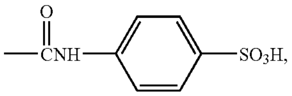

in $DC_2$ and $DC_3$, R' represents H, $(CH_2)_nCH_3$, or $C_6H_5$, and n represents a number of from 1 to about 6, and group A represents —$(CH_2)_n$— where n=0-6; —[O—$(CH_2)_n$—O]— where n=0-6; —[O—$CH_2CHR)_n$]— where n=0-6 and R═H or $CH_3$; —(C═O)—; O; S; —$(CH_2)_n$—(C═O)— where n=1-6; and —(C═O)—$(CH_2)_n$—(C═O)— where n=1-6.

4. The process of claim 2, wherein the nucleophilic coupling component group is selected from the group consisting of:

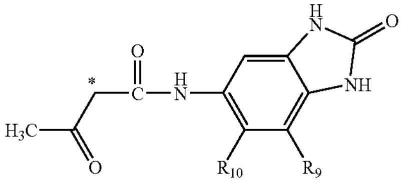

and

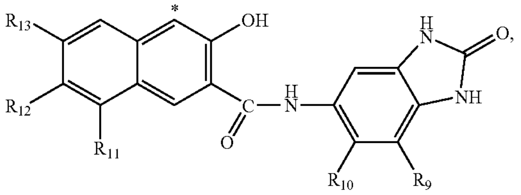

wherein:

* indicates a point of attachment to the azo functional group (—N=N—) in the pigment, and $R_9$, $R_{10}$, $R_{11}$, $R_{12}$, and $R_{13}$ are independently H, Br, Cl, I, F, $CH_3$, or $OCH_3$.

5. The process of claim 1, wherein the non-covalent association between the benzimidazolone pigment and the sterically bulky stabilizer compounds are predominantly intramolecular and inter-molecular hydrogen bonding, and aromatic pi-pi stacking interactions.

6. The process of claim 1, wherein the sterically bulky stabilizer compound is selected from the group consisting of compounds of the following formulas:

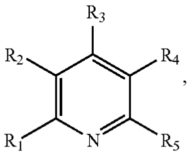

,

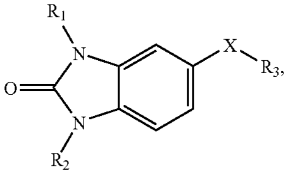

and

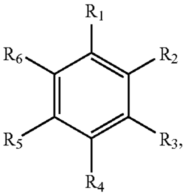

wherein $R_1$ to $R_5$ can be the same or different and represent H, —NH—(C=O)—R', —NH—R', —NH—(C=O)—NH—R', —NH—(C=O)—O—R', O—(C=O)—NH—R', —O—(C=O)—R', branched or linear alkyleneoxy chains, or —OR', wherein R' is predominantly a linear or branched alkyl or cycloaliphatic group that may contain heteroatoms within the alkyl groups.

7. The process of claim 1, wherein the sterically bulky stabilizer compound comprises a substituted pyridine derivative selected from the group consisting of the following compounds:

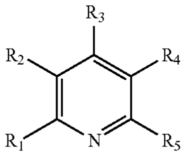

| $R_1$ | $R_2$ | $R_3$ | $R_4$ | $R_5$ |
|---|---|---|---|---|
| 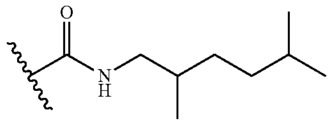 | H | H | H | H |
| 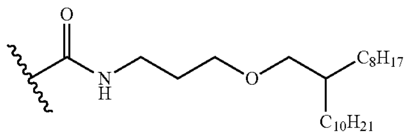 | H | H | H | H |
| 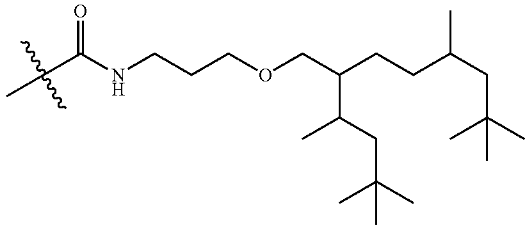 | H | H | H | H |

-continued
| | | | | |
|---|---|---|---|---|
| 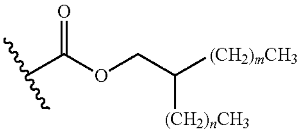<br>m = 3, n = 1<br>m = 3, n = 5<br>m = 7, n = 5<br>m = 11, n = 9 | H | H | H | H |
| 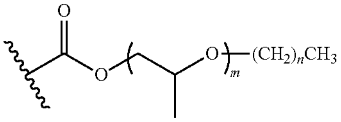<br>m = 2, n = 3<br>m = 3, n = 3 | H | H | H | H |
| 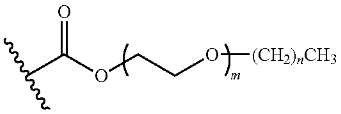<br>m = 1, n = 3<br>m = 2, n = 3 | H | H | H | H |
| 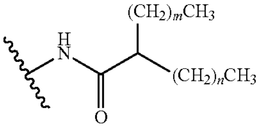<br>m = 11, n = 9<br>m = 7, n = 5<br>m = 5, n = 3 | H | H | H | H |
| 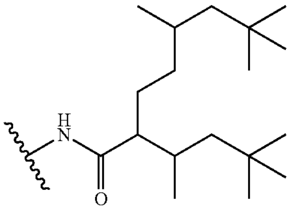 | H | H | H | H |
| 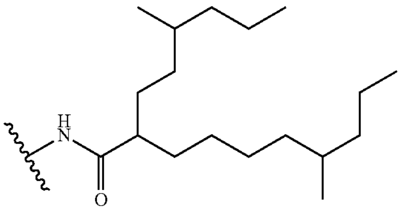 | H | H | H | H |
| 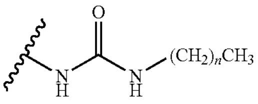<br>n = 17 | H | H | H | H |

-continued
| | | | | |
|---|---|---|---|---|
| 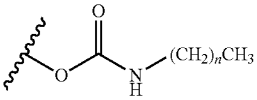<br>n = 17 | H | H | H | H |
| 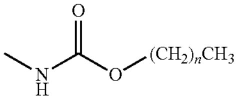<br>n = 17 | H | H | H | H |
| 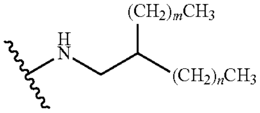<br>m = 9, n = 7 | H | H | H | H |
| 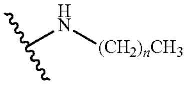<br>n = 12 | H | H | H | H |
| 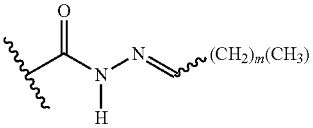<br>m = 17 | H | H | H | H |
| 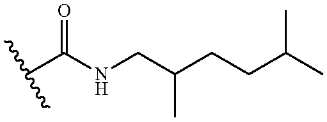 | H | H | H | 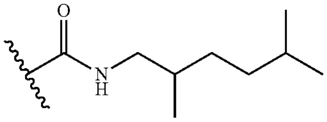 |
| 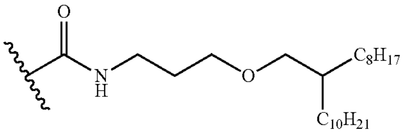 | H | H | H | 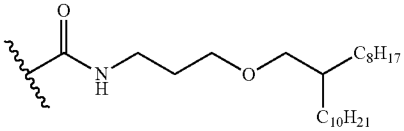 |
| 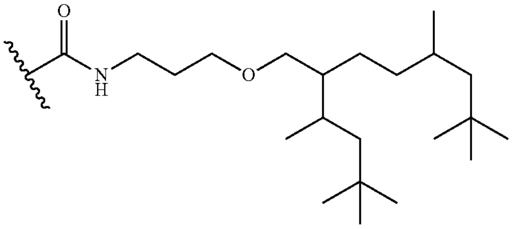 | H | H | H | 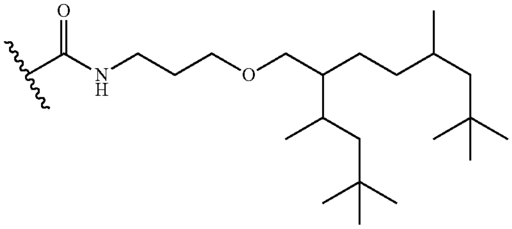 |
| 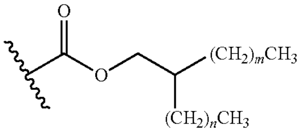<br>m = 3, n = 1<br>m = 3, n = 5<br>m = 7, n = 5<br>m = 11, n = 9 | H | H | H | 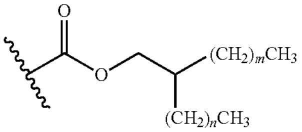<br>m = 3, n = 1<br>m = 3, n = 5<br>m = 7, n = 5<br>m = 11, n = 9 |

-continued
| | | | | |
|---|---|---|---|---|
| 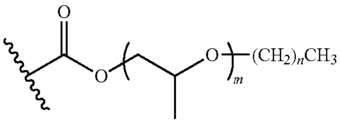<br>m = 2, n = 3<br>m = 3, n = 3 | H | H | H | 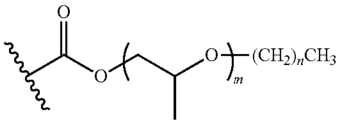<br>m = 2, n = 3<br>m = 3, n = 3 |
| 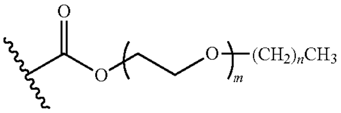<br>m = 1, n = 3<br>m = 2, n = 3 | H | H | H | 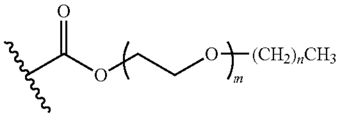<br>m = 1, n = 3<br>m = 2, n = 3 |
| 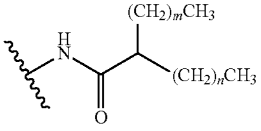<br>m = 11, n = 9<br>m = 7, n = 5<br>m = 5, n = 3 | H | H | H | 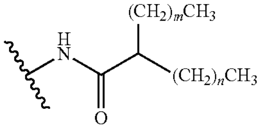<br>m = 11, n = 9<br>m = 7, n = 5<br>m = 5, n = 3 |
| 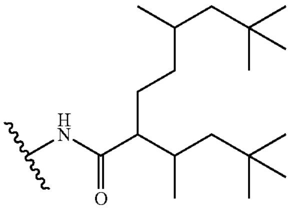 | H | H | H | 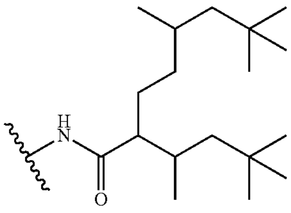 |
| 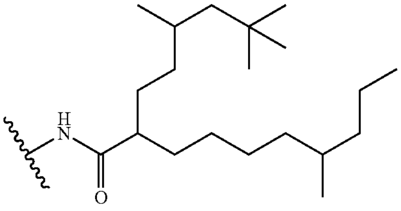 | H | H | H | 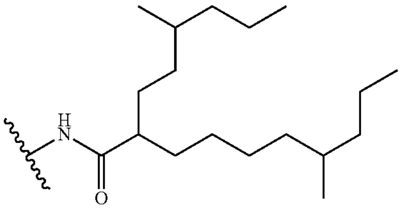 |
| 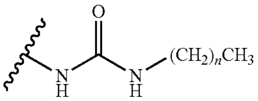<br>n = 17 | H | H | H | 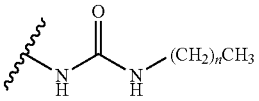<br>n = 17 |
| 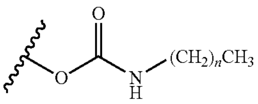<br>n = 17 | H | H | H | 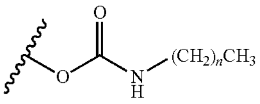<br>n = 17 |
| 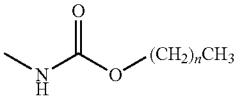<br>n = 17 | H | H | H | 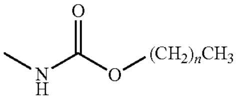<br>n = 17 |

-continued
| | | | | |
|---|---|---|---|---|
| 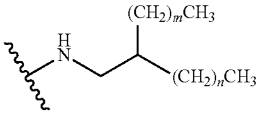 m = 9, n = 7 | H | H | H | 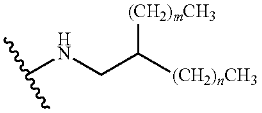 m = 9, n = 7 |
| 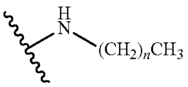 n = 12 | H | H | H | 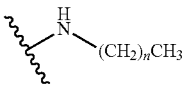 n = 12. |
8. The process of claim 1, wherein the sterically bulky stabilizer compound comprises an alkylated benzimidazolone selected from the group consisting of the following compounds:

| Position 5 functional moiety | X | Sterically Bulky Group(s) R$_1$ | R$_2$ | R$_3$ |
|---|---|---|---|---|
| | | 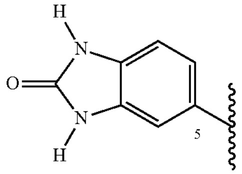 | | |
| 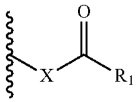 | NH | $(CH_2)_nCH_3$<br>n = 2, 11, 17 | — | — |
| 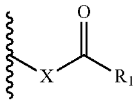 | NH | 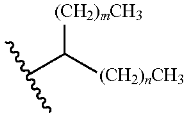<br>m = 5, n = 3<br>m = 7, n = 5<br>m = 11, n = 9 | — | — |

-continued
| Position 5 functional moiety | X | Sterically Bulky Group(s) R₁ | R₂ | R₃ |
|---|---|---|---|---|
| 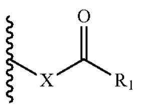 | NH | 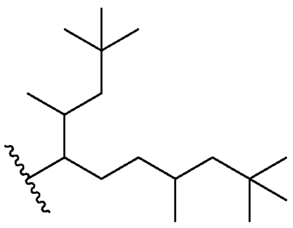 | — | — |
| 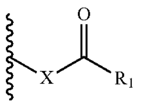 | NH | 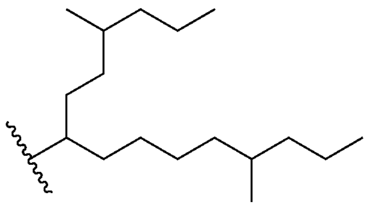 | — | — |
| 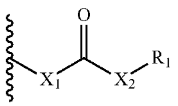 | $X_1 = X_2 = NH$ | $(CH_2)_nCH_3$ n = 11, 17 | — | — |

-continued
| Position 5 functional moiety | X | Sterically Bulky Group(s) R1 | R2 | R3 |
|---|---|---|---|---|
| 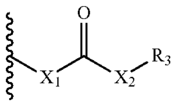 | $X_1 = X_2 = NH$ | — | — | 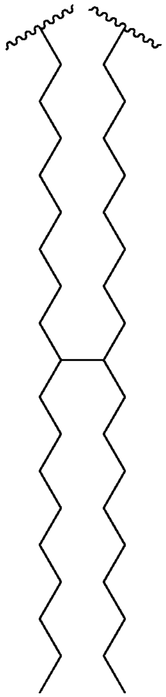 |
| 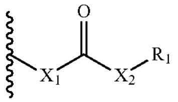 | $X_1 = O$<br>$X_2 = NH$ | $(CH_2)_nCH_3$<br>n = 11, 17 | — | — |

-continued
| Position 5 functional moiety | X | Sterically Bulky Group(s) R1 | R2 | R3 |
|---|---|---|---|---|
| 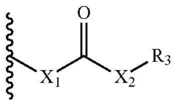 | $X_1 = O$<br>$X_2 = NH$ | — | — | 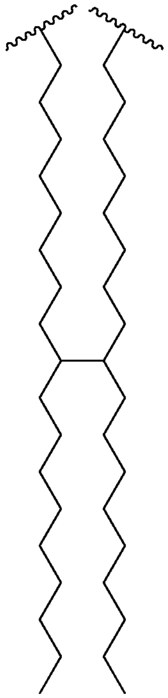 |
| 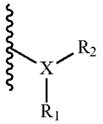 | N | H | $(CH_2)_nCH_3$<br>n = 11, 17 | — |

-continued
| Position 5 functional moiety | X | Sterically Bulky Group(s) R<sub></sub> | | |
|---|---|---|---|---|
| | | $R_1$ | $R_2$ | $R_3$ |
| 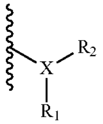 | N | H | 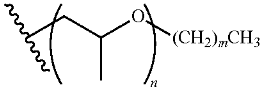<br>m = 3, n = 2<br>m = 3, n = 3 | — |
| 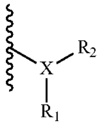 | N | $(CH_2)_nCH_3$<br>n = 3, 11, 17 | $(CH_2)_nCH_3$<br>n = 3, 11, 17 | — |
| 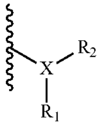 | N | 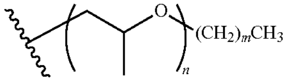<br>m = 3, n = 2<br>m = 3, n = 3 | 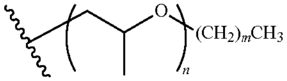<br>m = 3, n = 2<br>m = 3, n = 3 | — |
| 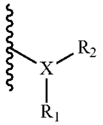 | N | 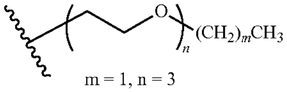<br>m = 1, n = 3 | 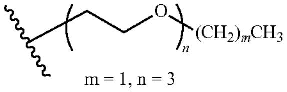<br>m = 1, n = 3 | — |
| 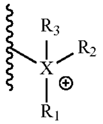 | N | $(CH_2)_nCH_3$<br>n = 1, 17 | $(CH_2)_nCH_3$<br>n = 1, 17 | $(CH_2)_nCH_3$<br>n = 1, 17 |
| 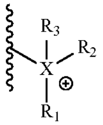 | N | 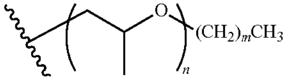<br>m = 3, n = 2<br>m = 3, n = 3 | 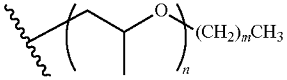<br>m = 3, n = 2<br>m = 3, n = 3 | 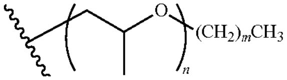<br>m = 3, n = 2<br>m = 3, n = 3 |

-continued
| Position 5 functional moiety | X | Sterically Bulky Group(s) R1 | R2 | R3 |
|---|---|---|---|---|
| 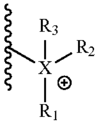 | N | 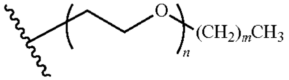 m = 1, n = 3 | 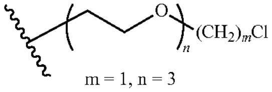 m = 1, n = 3 | 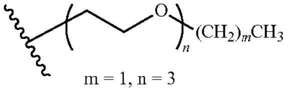 m = 1, n = 3 |
| and | | 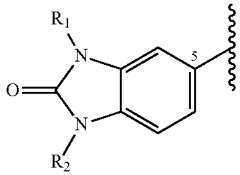 | | |
| 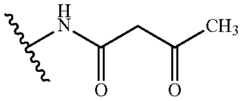 | — | H | —$(CH_2)_nCH_3$ n = 1, 17 | — |
| 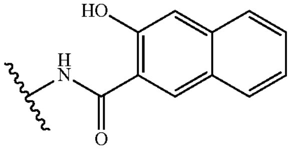 | — | —$(CH_2)_nCH_3$ n = 1, 17 | | |

-continued
| Position 5 functional moiety | X | Sterically Bulky Group(s) R$_1$ | R$_2$ | R$_3$ |
|---|---|---|---|---|
| 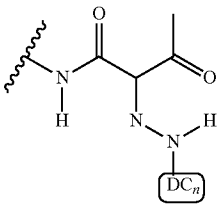 group $DC_n$ is n = 1-6 | — | H | H | — |
| 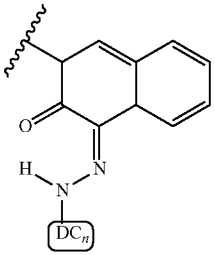 group $DC_n$ is n = 1-6 | — | H | H | — |

wherein $DC_n$ represents a diazo component group in the benzimidazolone pigment.

9. The process of claim 1, wherein the sterically bulky stabilizer compound comprises alkylated derivatives of an aromatic acid, selected from the group consisting of the following compounds:

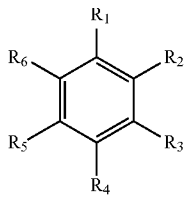
| $R_1$ | $R_2$ | $R_3$ | $R_5$ |
|---|---|---|---|
| —COOH | H | 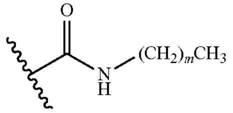 m = 17 | 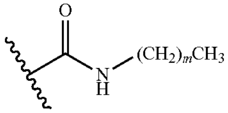 m = 17 |
| —COOH | H | 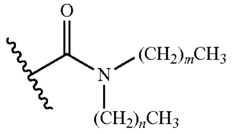 m = 11, n = 9 | 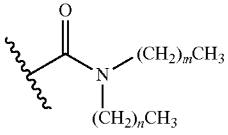 m = 11, n = 9 |
| —COOH | H | 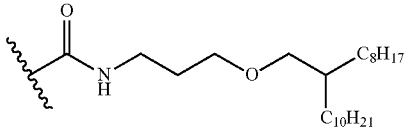 | 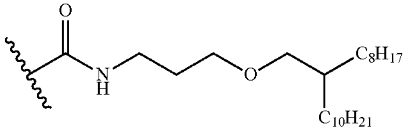 |
| —COOH | H | 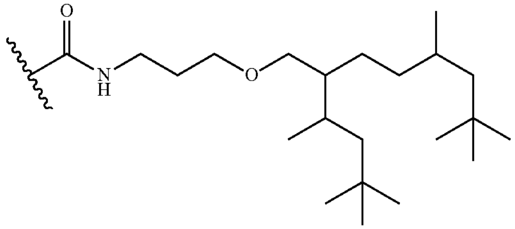 | 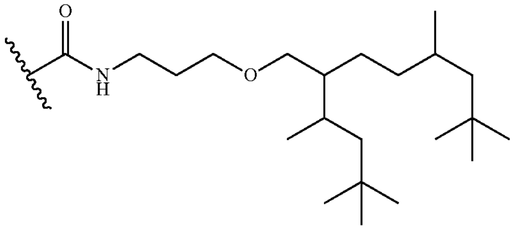 |

-continued
| | | | |
|---|---|---|---|
| —COOH | H | 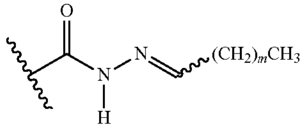<br>m = 17 | 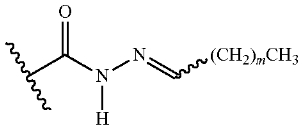<br>m = 17 |
| —COOH | H | 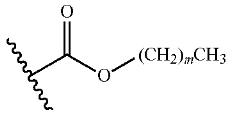<br>m = 17 | 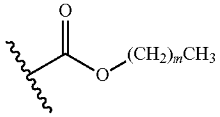<br>m = 17 |
| —COOH | H | 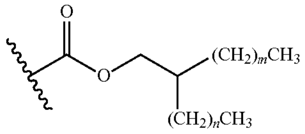<br>m = 9, n = 7 | 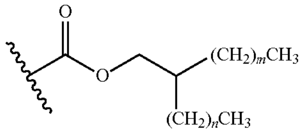<br>m = 9, n = 7 |
| —COOH | H | 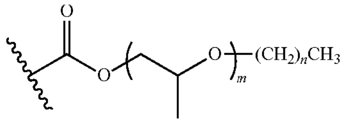<br>m = 2, n = 3<br>m = 3, n = 3 | 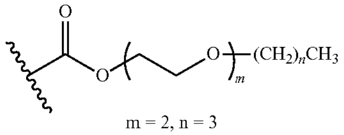<br>m = 2, n = 3<br>m = 3, n = 3 |
| —COOH | H | 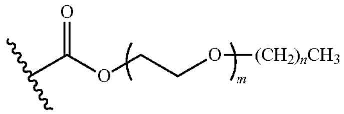<br>m = 1, n = 3<br>m = 2, n = 3 | 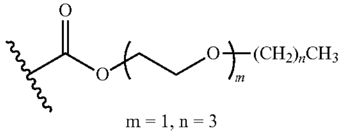<br>m = 1, n = 3<br>m = 2, n = 3 |

-continued
| | | | |
|---|---|---|---|
| —COOH | H | 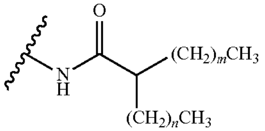<br>m = 11, n = 9<br>m = 7, n = 5<br>m = 5, n = 3 | 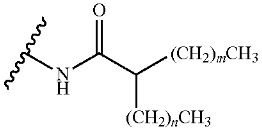<br>m = 11, n = 9<br>m = 7, n = 5<br>m = 5, n = 3 |
| —COOH | H | 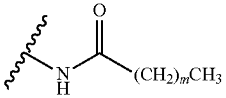<br>m = 17 | 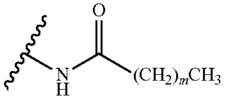<br>m = 17 |
| —COOH | H | 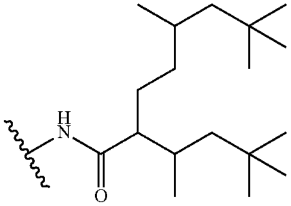 | 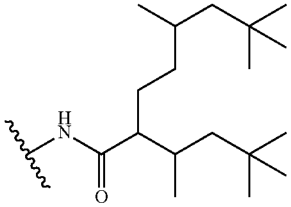 |
| —COOH | H | 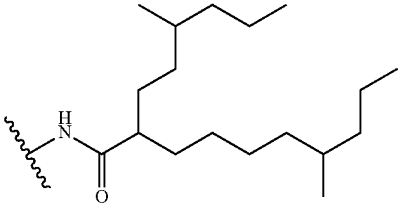 | 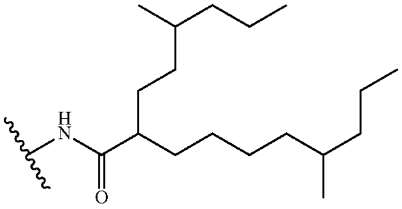 |
| —COOH | H | 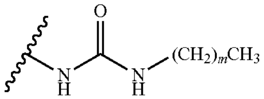<br>m = 17 | 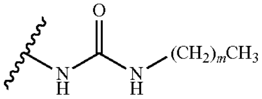<br>m = 17 |

-continued
| | | | |
|---|---|---|---|
| —COOH | H | 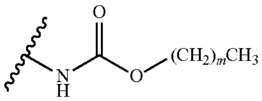 m = 17 | 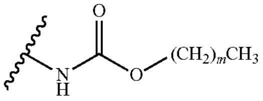 m = 17 |
| —COOH | H | 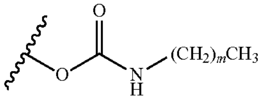 m = 17 | 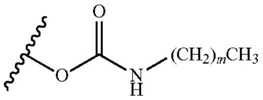 m = 17 |
| —COOH | H | 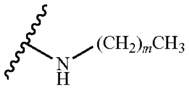 m = 17 | 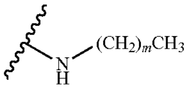 m = 17 |
| —COOH | H | 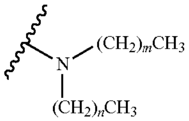 m = 17 | 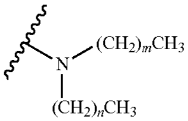 m = 17 |
| —COOH | H | 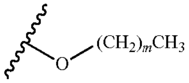 m = 17 | 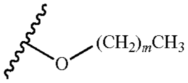 m = 17 |
| —COOH | H | 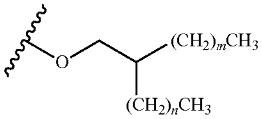 m = 9, n = 7 | 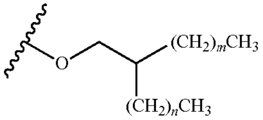 m = 9, n = 7 |
| —COOH | H | 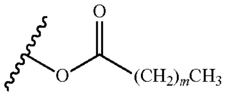 m = 17 | 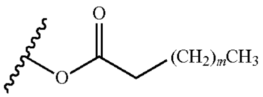 m = 17 |

-continued
| | | | |
|---|---|---|---|
| —COOH | H | 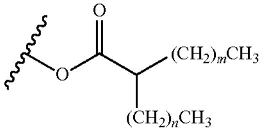<br>m = 11, n = 9<br>m = 7, n = 5<br>m = 5, n = 3 | 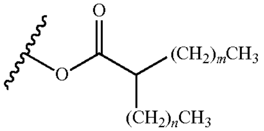<br>m = 11, n = 9<br>m = 7, n = 5<br>m = 5, n = 3 |
| —COOH | H | 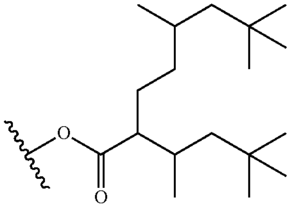 | 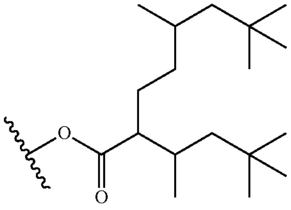 |
| —COOH | H | 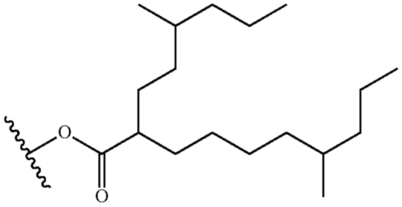 | 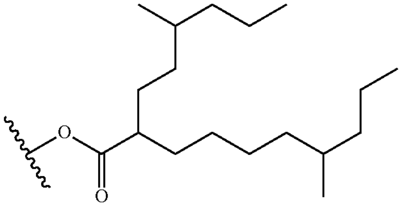 |
| —COOH | H | —COOH | 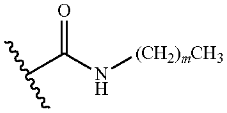<br>m = 17 |
| —COOH | H | —COOH | 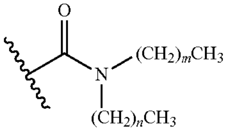<br>m = 11, n = 9 |

-continued
| | | | |
|---|---|---|---|
| —COOH | H | —COOH | 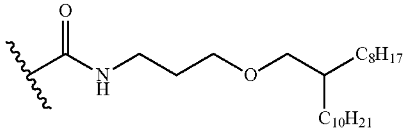 |
| —COOH | H | —COOH | 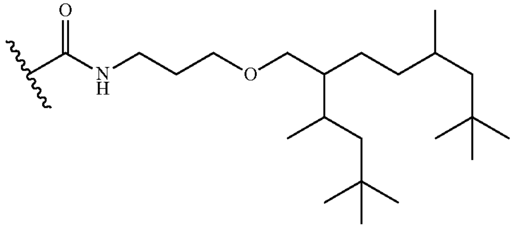 |
| —COOH | H | —COOH | 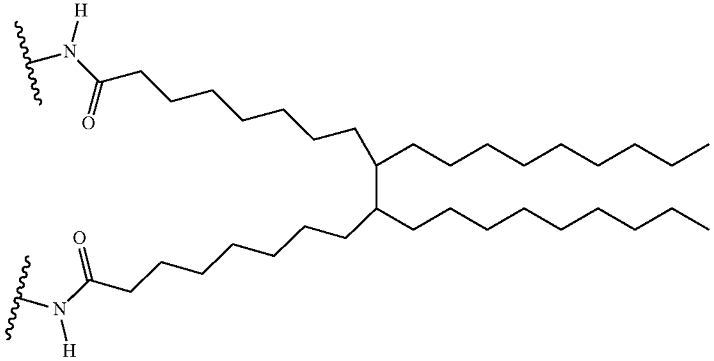 |
| —COOH | H | —COOH | 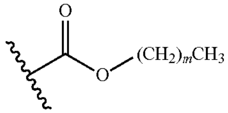 m = 15 |

-continued
| | | | |
|---|---|---|---|
| —COOH | H | —COOH | 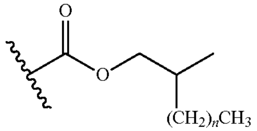<br>m = 9, n = 7 |
| —COOH | H | —COOH | 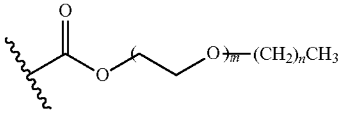<br>m = 2, n = 3<br>m = 3, n = 3 |
| —COOH | H | —COOH | 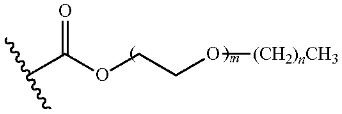<br>m = 1, n = 3<br>m = 2, n = 3 |
| —COOH | H | —COOH | 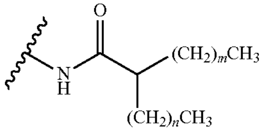<br>m = 11, n = 9<br>m = 7, n = 5<br>m = 5, n = 3 |
| —COOH | H | —COOH | 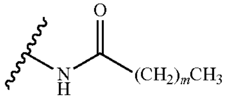<br>m = 15 |

-continued
| | | | |
|---|---|---|---|
| —COOH | H | —COOH | 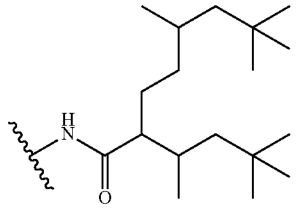 |
| —COOH | H | —COOH | 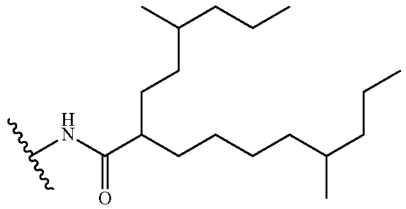 |
| —COOH | H | —COOH | 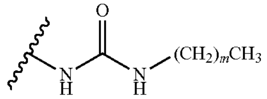<br>m = 17 |
| —COOH | H | —COOH | 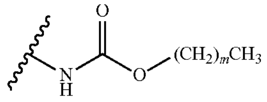<br>m = 17 |
| —COOH | H | —COOH | 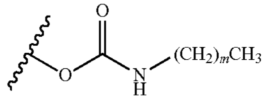<br>m = 17 |
| —COOH | H | —COOH | 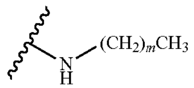<br>m = 17 |

-continued
| | | | |
|---|---|---|---|
| —COOH | H | —COOH | 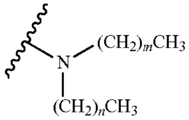 m = 17 |
| —COOH | H | —COOH | 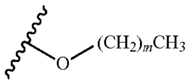 m = 17 |
| —COOH | H | —COOH | 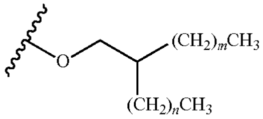 m = 9, n = 7 |
| —COOH | H | —COOH | 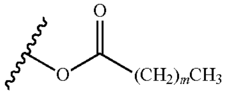 m = 17 |
| —COOH | H | —COOH | 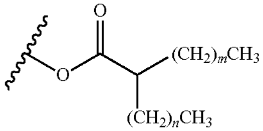 m = 11, n = 9<br>m = 7, n = 5<br>m = 5, n = 3 |
| —COOH | H | —COOH | 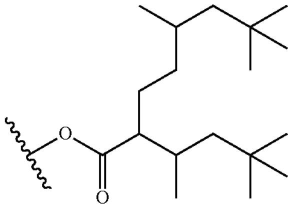 |

-continued
| | | | |
|---|---|---|---|
| —COOH | H | —COOH | 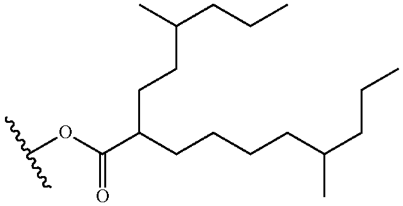 |
| —$CONH_2$ | H | 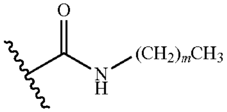 m = 17 | 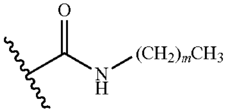 m = 17 |
| —$CONH_2$ | H | 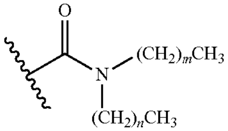 m = 11, n = 9 | 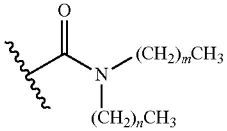 m = 11, n = 9 |
| —$CONH_2$ | H | 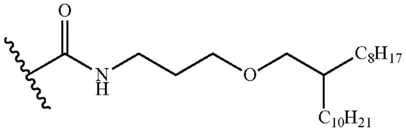 | 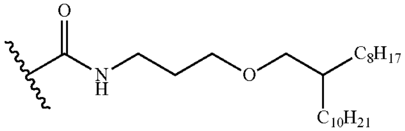 |
| —$CONH_2$ | H | 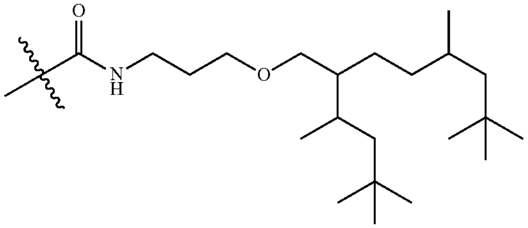 | 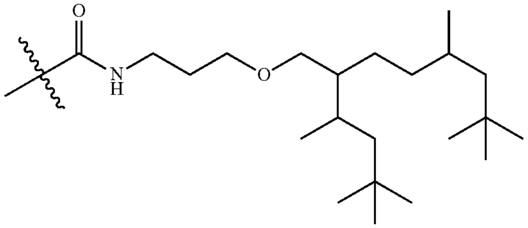 |

-continued
| | | | |
|---|---|---|---|
| —$CONH_2$ | H | 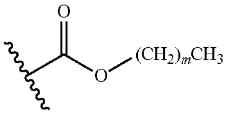<br>m = 17 | 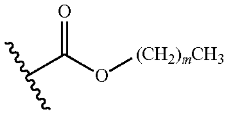<br>m = 17 |
| —$CONH_2$ | H | 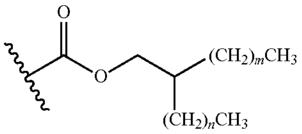<br>m = 9, n = 7 | 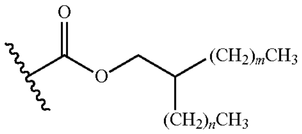<br>m = 9, n = 7 |
| —$CONH_2$ | H | 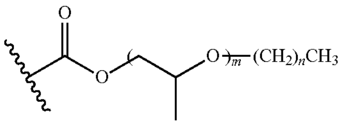<br>m = 2, n = 3<br>m = 3, n = 3 | 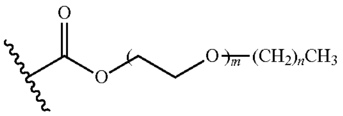<br>m = 2, n = 3<br>m = 3, n = 3 |
| —$CONH_2$ | H | 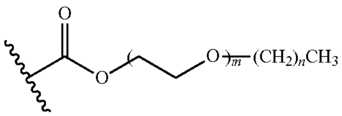<br>m = 1, n = 3<br>m = 2, n = 3 | 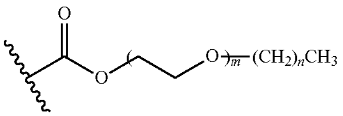<br>m = 1, n = 3<br>m = 2, n = 3 |
| —$CONH_2$ | H | 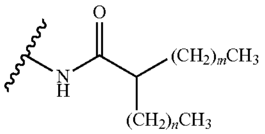<br>m = 11, n =9<br>m = 7, n = 5<br>m = 5, n = 3 | 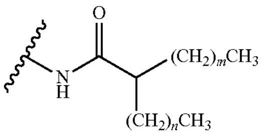<br>m = 11, n = 9<br>m = 7, n = 5<br>m = 5, n = 3 |

-continued
| | | | |
|---|---|---|---|
| —$CONH_2$ | H | 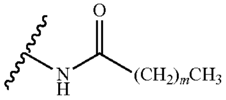<br>m = 16 | 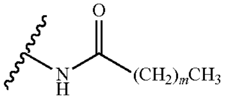<br>m = 17 |
| —$CONH_2$ | H | 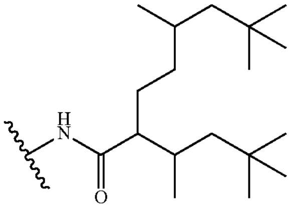 | 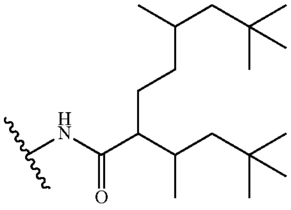 |
| —$CONH_2$ | H | 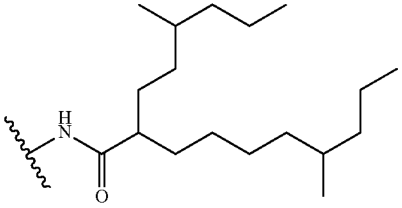 | 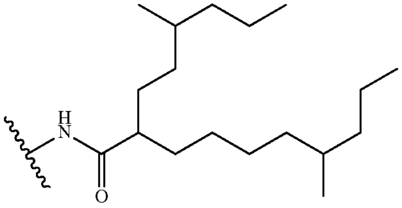 |
| —COOH | H | —COOH | 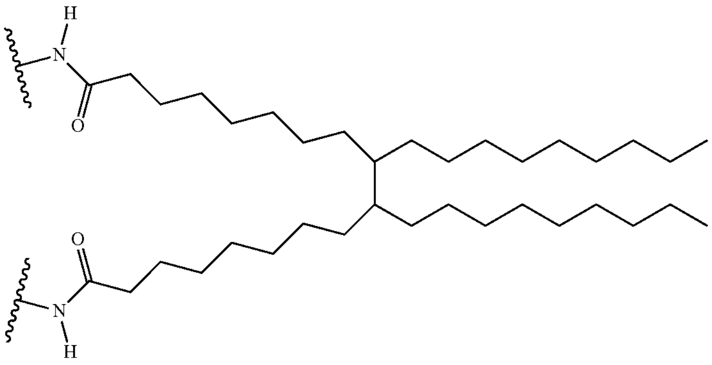 |

-continued
| | | | |
|---|---|---|---|
| —$CONH_2$ | H | 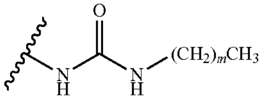<br>m = 17 | 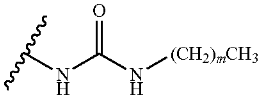<br>m = 17 |
| —$CONH_2$ | H | 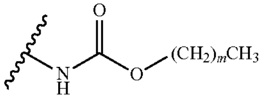<br>m = 17 | 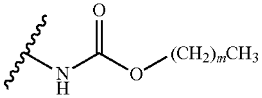<br>m = 17 |
| —$CONH_2$ | H | 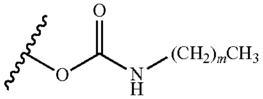<br>m = 17 | 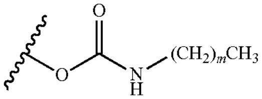<br>m = 17 |
| —$CONH_2$ | H | 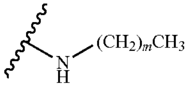<br>m = 17 | 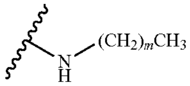<br>m = 17 |
| —$CONH_2$ | H | 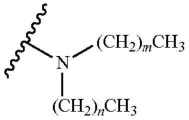<br>m = 17 | 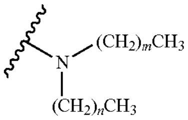<br>m = 17 |
| —$CONH_2$ | H | 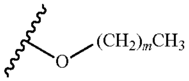<br>m = 17 | 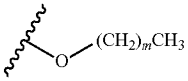<br>m = 17 |

-continued
| | | | |
|---|---|---|---|
| —$CONH_2$ | H | 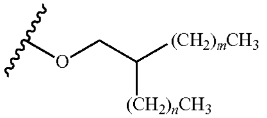<br>m = 9, n = 7 | 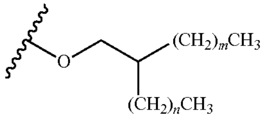<br>m = 9, n = 7 |
| —$CONH_2$ | H | 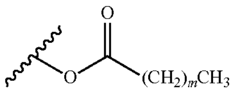<br>m = 17 | 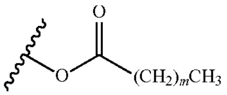<br>m = 17 |
| —$CONH_2$ | H | 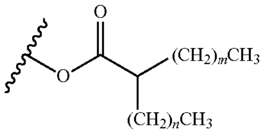<br>m = 11, n = 9<br>m = 7, n = 5<br>m = 5, n = 3 | 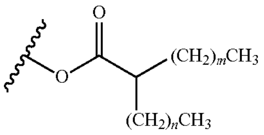<br>m = 11, n = 9<br>m = 7, n = 5<br>m = 5, n = 3 |
| —$CONH_2$ | H | 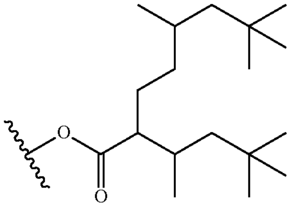 | 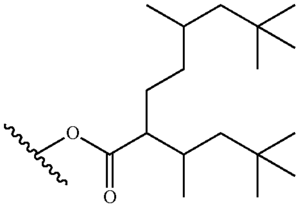 |
| —$CONH_2$ | H | 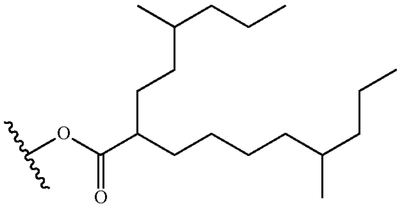 | 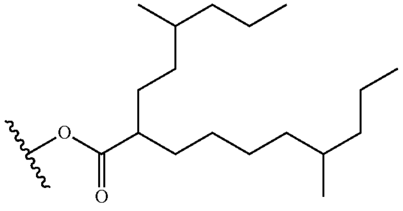 |

-continued
| | | | |
|---|---|---|---|
| —$CONH_2$ | H | —$CONH_2$ | 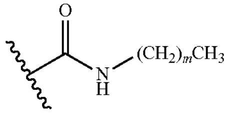 m = 17 |
| —$CONH_2$ | H | —$CONH_2$ | 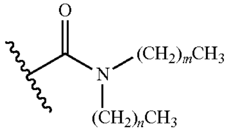 m = 11, n = 9 |
| —$CONH_2$ | H | —$CONH_2$ | 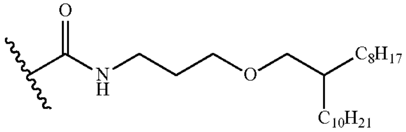 |
| —$CONH_2$ | H | —$CONH_2$ | 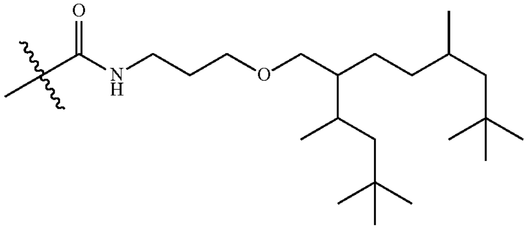 |
| —$CONH_2$ | H | —$CONH_2$ | 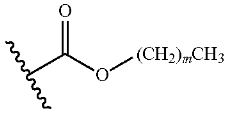 m = 15 |
| —$CONH_2$ | H | —$CONH_2$ | 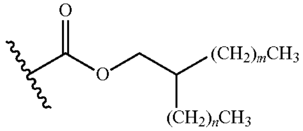 m = 9, n = 7 |

-continued
| | | | |
|---|---|---|---|
| —$CONH_2$ | H | —$CONH_2$ | 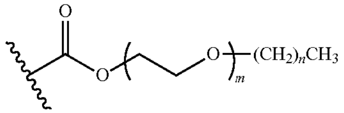 m = 2, n = 3<br>m = 3, n = 3 |
| —$CONH_2$ | H | —$CONH_2$ | 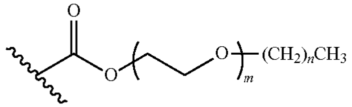 m = 1, n = 3<br>m = 2, n = 3 |
| —$CONH_2$ | H | —$CONH_2$ | 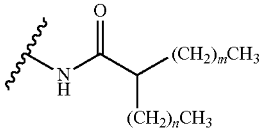 m = 11, n = 9<br>m = 7, n = 5<br>m = 5, n = 3 |
| —$CONH_2$ | H | —$CONH_2$ | 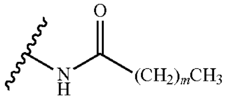 m = 15 |
| —$CONH_2$ | H | —$CONH_2$ | 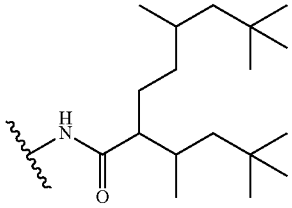 |

-continued
| | | | |
|---|---|---|---|
| $—CONH_2$ | H | $—CONH_2$ | 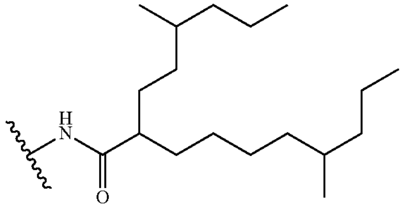 |
| $—CONH_2$ | H | $—CONH_2$ | 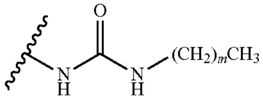 m = 17 |
| $—CONH_2$ | H | —COOH | 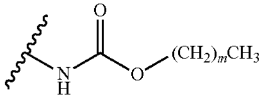 m = 17 |
| $—CONH_2$ | H | $—CONH_2$ | 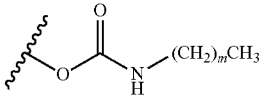 m = 17 |
| $—CONH_2$ | H | $—CONH_2$ | 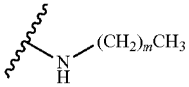 m = 17 |
| $—CONH_2$ | H | $—CONH_2$ | 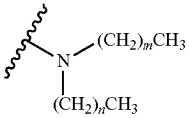 m = 17 |

-continued
| | | | |
|---|---|---|---|
| —$CONH_2$ | H | —$CONH_2$ | 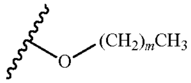 m = 17 |
| —$CONH_2$ | H | —$CONH_2$ | 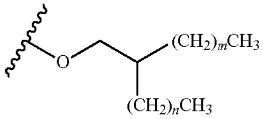 m = 9, n = 7 |
| —$CONH_2$ | H | —$CONH_2$ | 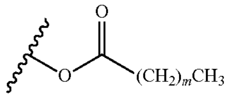 m = 17 |
| —$CONH_2$ | H | —$CONH_2$ | 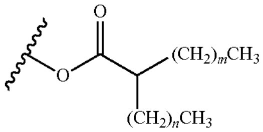 m = 11, n = 9<br>m = 7, n = 5<br>m = 5, n = 3 |
| —$CONH_2$ | H | —$CONH_2$ | 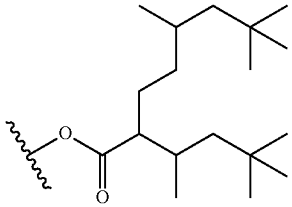 |

-continued
| | | | |
|---|---|---|---|
| —$CONH_2$ | H | —$CONH_2$ | 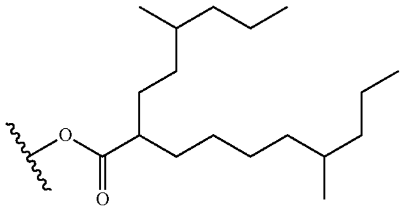 |
| —COOH | —COOH | 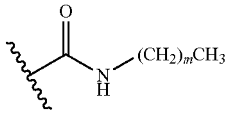 m = 17 | H |
| —COOH | —COOH | 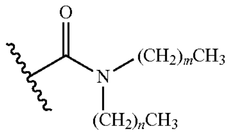 m = 11, n = 9 | H |
| —COOH | —COOH | 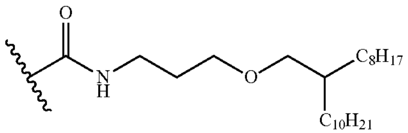 | H |
| —COOH | —COOH | 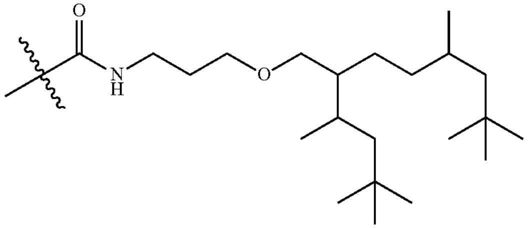 | H |

-continued
| | | | |
|---|---|---|---|
| —COOH | —COOH | 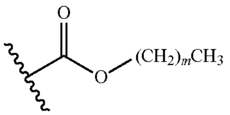 m = 15 | H |
| —COOH | —COOH | 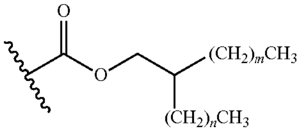 m = 9, n = 7 | H |
| —COOH | —COOH | 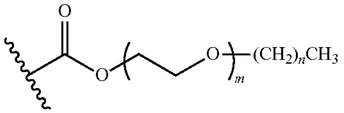 m = 2, n = 3<br>m = 3, n = 3 | H |
| —COOH | —COOH | 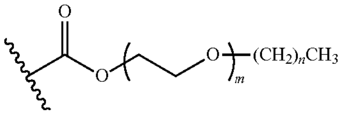 m = 1, n = 3<br>m = 2, n = 3 | H |

and $R_4$ and $R_6$=H.

10. The process of claim 1, further comprising adding a surfactant or a surface active agent selected from the group consisting of rosin natural products; long-chain or branched hydrocarbon alcohols; alcohol ethoxylates; acrylic-based polymers; styrene-based copolymers; copolymers of α-olefins; copolymers of vinyl pyridine, vinyl imidazole, and vinyl pyrrolidinone; polyester copolymers; polyamide copolymers; and copolymers of acetals and acetates.

11. The process of claim 1, wherein the nanoscale-sized particles have an average particle diameter as derived from transmission electron microscopy imaging, of less than about 150 nm.

12. The process of claim 1, wherein the solution or suspension of the sterically bulky stabilizer compound comprises the sterically bulky stabilizer compound dispersed or emulsified in a medium comprising water and optionally one or more organic solvents.

13. The process of claim 12, wherein the solution or suspension of the sterically bulky stabilizer compound further comprises the one or more organic solvents, and the one or more organic solvents are water-miscible.

14. The process of claim 1, wherein the coupling reaction is carried out in a liquid medium, and a concentration of the one or more organic pigment precursor to a benzimidazolone pigment in the liquid medium is less than 1 M.

15. The process of claim 1, wherein the coupling reaction is carried out at a temperature of about 10° C. to about 60° C.

16. The process of claim 1, wherein the coupling reaction is carried out a pH of about 2 to about 7.

17. The process of claim 1, wherein the coupling reaction is carried out while mixing and optionally in the presence of a viscosity-modifying surfactant or defoaming agent.

18. The process of claim 1, wherein the carrying out of the coupling reaction comprises:

mixing together a solution comprising a coupling component pigment precursor with a solution, dispersion or suspension of the sterically bulky stabilizer compound, to form a first medium;

optionally adjusting a pH of the first medium to an acidic pH;

adding a solution comprising a diazonium salt as a pigment precursor to the first medium; and causing or allowing a coupling reaction to occur between the coupling component and the diazonium salt in the presence of the sterically bulky stabilizer compound.

19. The process of claim 18, wherein the benzimidazolone pigment has only x azo groups, and the pigment precursor and the coupling component pigment precursor are provided in a molar ratio of 1:x to about 1.25:x, where x is an integer of 1 to 5.

20. The process of claim 18, wherein the first medium further comprises an alkaline base, an acid buffer, and an optional organic solvent.

21. The process of claim 20, wherein the alkaline base is present in a molar amount of about 2 to about 10 molar equivalent excess relative to the coupling component pigment precursor, and the acid buffer is present in an equal molar amount relative to the alkaline base component.

22. The process of claim 20, wherein the optional organic solvent is present in an amount of 0 to about 50 volume % based on total liquid volume of the first medium.

23. The process of claim 18, wherein the sterically bulky stabilizer compound is present in an amount of 0.01 to about 50 weight % based on a final mass of nanoscale-sized pigment particles to be produced.

24. The process of claim 18, wherein the first medium is formed by the steps comprising:

solubilizing the coupling component pigment precursor into an aqueous alkaline solution, solubilizing or dispersing the sterically bulky stabilizer compound into the same aqueous alkaline solution, into an organic solvent, or into a buffer solution, and if the sterically bulky stabilizer compound was not solubilized or dispersed together with the coupling component, then mixing the aqueous alkaline solution containing the coupling component pigment precursor together with the organic solvent or the buffer solution containing the sterically bulky stabilizer compound.

25. The process of claim 18, wherein the mixing of the solution comprising a coupling component pigment precursor and the solution, dispersion or suspension of the sterically bulky stabilizer compound, is conducted at a temperature of about 10° C. to about 100° C.

26. The process of claim 1, wherein the carrying out of the coupling reaction comprises:

adding (1) a solution comprising a coupling component pigment precursor, and (2) a solution comprising a diazonium salt as a pigment precursor, to the solution or suspension of the sterically bulky stabilizer compound; and causing or allowing a coupling reaction to occur between the coupling component and the diazonium salt in the presence of the sterically bulky stabilizer compound.

27. The process of claim 26, wherein the solutions (1) and (2) are each homogeneous solutions and have different pH.

28. The process of claim 26, wherein the benzimidazolone pigment has only x azo groups, and the diazo component pigment precursor and the coupling component pigment precursor are provided in a molar ratio of 1:x to about 1.25:x, where x is an integer of 1 to 5.

29. The process of claim 26, wherein the solutions (1) and (2) are added simultaneously to the solution or suspension of the sterically bulky stabilizer compound.

30. The process of claim 26, wherein the solution (1) further comprises an alkaline base, an acid buffer, and an optional organic solvent.

31. The process of claim 30, wherein the alkaline base is present in a molar amount of about 2 to about 10 molar equivalent excess relative to the coupling component pigment precursor, the acid buffer is present in an equal molar amount relative to the alkaline base component.

32. The process of claim 30, wherein the optional organic solvent is present in an amount of 0 to about 50 volume % based on total liquid volume of the first medium.

33. The process of claim 26, wherein the sterically bulky stabilizer compound is present in an amount of 0.01 to about 50 weight % based on a final mass of nanoscale-sized pigment particles to be produced.

34. The process of claim 1, wherein after the coupling reaction, formed, precipitated nanoscale pigment particles are isolated without further heating.

* * * * *